United States Patent
Tanaka et al.

[19]

[11] Patent Number: 6,122,034
[45] Date of Patent: *Sep. 19, 2000

[54] ANTIFERROELECTRIC LIQUID CRYSTAL DISPLAY DEVICE

[75] Inventors: Tomio Tanaka, Hachioji; Tetsushi Yoshida, Kanagawa-ken; Jun Ogura; Satoru Shimoda, both of Fussa, all of Japan

[73] Assignee: Casio Computer Co., Ltd., Tokyo, Japan

[*] Notice: This patent is subject to a terminal disclaimer.

[21] Appl. No.: 09/141,495

[22] Filed: Aug. 27, 1998

Related U.S. Application Data

[62] Division of application No. 08/657,017, May 28, 1996, Pat. No. 5,847,799.

[30] Foreign Application Priority Data

| May 31, 1995 | [JP] | Japan | 7-157113 |
| May 31, 1995 | [JP] | Japan | 7-157116 |
| May 31, 1995 | [JP] | Japan | 7-157120 |
| May 31, 1995 | [JP] | Japan | 7-157203 |
| May 31, 1995 | [JP] | Japan | 7-157215 |
| May 31, 1995 | [JP] | Japan | 7-157218 |
| May 31, 1995 | [JP] | Japan | 7-157227 |

[51] Int. Cl.$^7$ .............................. G02F 1/13; G02F 1/1335
[52] U.S. Cl. ........................... 349/174; 349/172; 349/184; 349/100
[58] Field of Search ................................. 349/172, 174, 349/184, 100

[56] References Cited

U.S. PATENT DOCUMENTS

| 4,765,720 | 8/1988 | Toyono et al. | 349/173 |
| 4,840,462 | 6/1989 | Hartmann | 349/173 |
| 5,151,804 | 9/1992 | Verhulst et al. | 359/56 |
| 5,214,523 | 5/1993 | Nito et al. | 359/100 |
| 5,559,620 | 9/1996 | Tanaka et al. | 359/78 |
| 5,631,752 | 5/1997 | Tanaka | 349/173 |

Primary Examiner—William L. Sikes
Assistant Examiner—Julie Ngo
Attorney, Agent, or Firm—Frishauf, Holtz, Goodman, Langer & Chick, P.C.

[57] ABSTRACT

An antiferroelectric liquid crystal display device includes: an active matrix type LC cell and an antiferroelectric liquid crystal sealed in the cell. Liquid crystal molecules aligned to one of a first aligning direction and a second aligning direction are aligned in the other aligning direction in accordance with an applied voltage, thus forming a plurality of regions of different alignment states in a range shorter than a wavelength of light in a visible light band, and directions of said directors are changed in accordance with a ratio of regions in a first alignment state to regions in a second alignment state. The liquid crystal molecules may behave along a predetermined cone by a phase transition precursor in accordance with an applied voltage. The liquid crystal molecules may behave so as to be inclined in a direction perpendicular to an electric field, in accordance with an applied voltage.

9 Claims, 40 Drawing Sheets

  
FIG. 9A  FIG. 9B  FIG. 9C
  
FIG. 9D  FIG. 9E  FIG. 9F
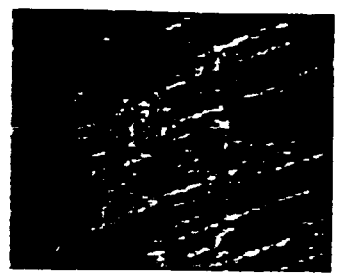  
FIG. 9G  FIG. 9H  FIG. 9I

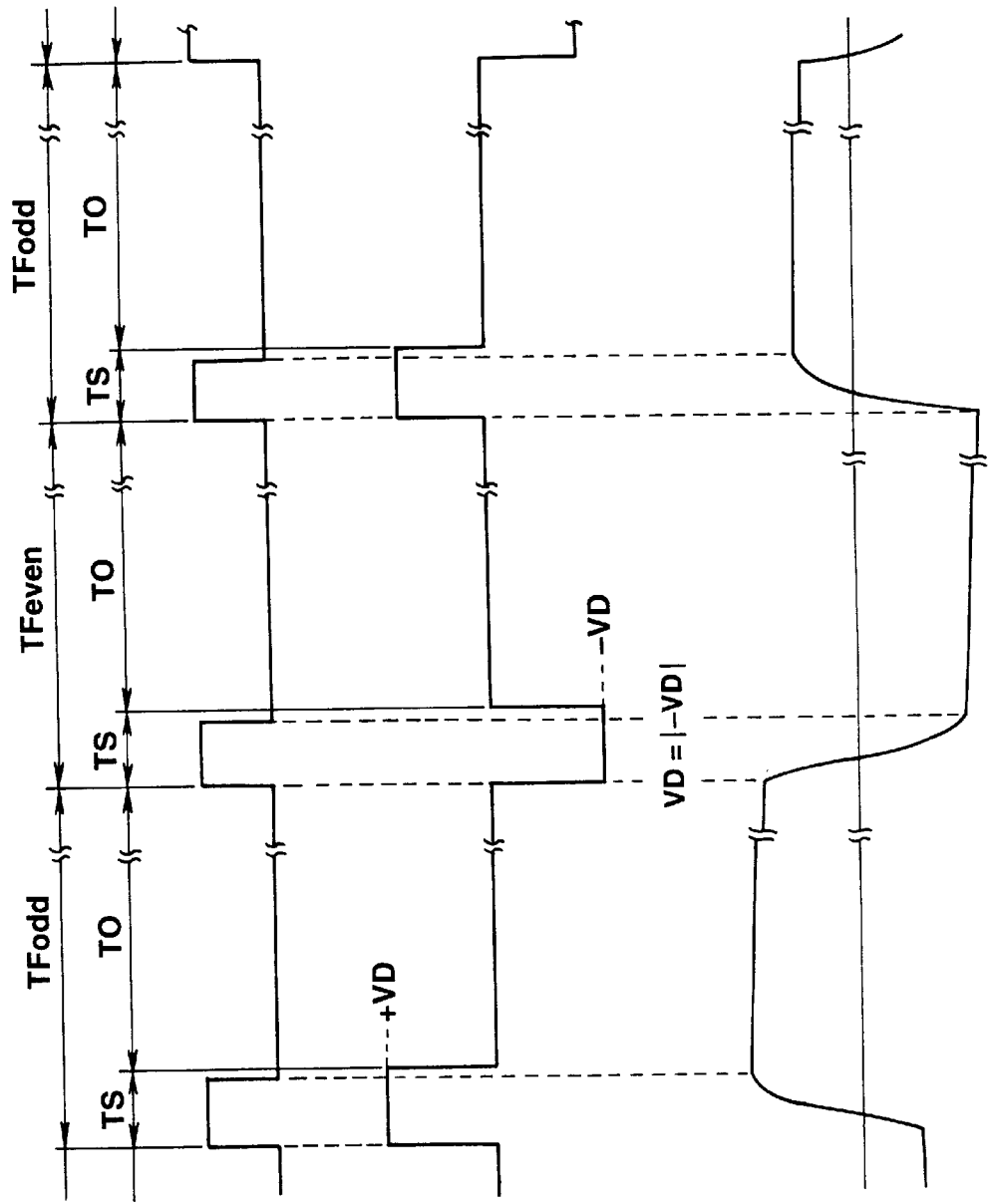

FIG. 20A     FIG. 20B     FIG. 20C
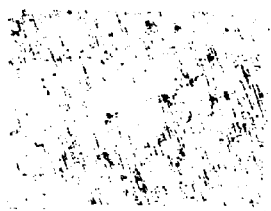 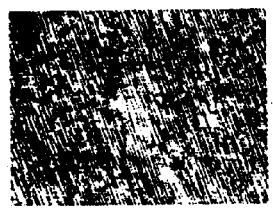 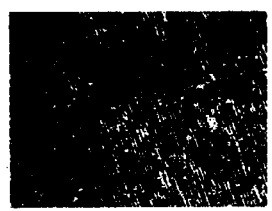
FIG. 20D     FIG. 20E     FIG. 20F
  
FIG. 20G     FIG. 20H     FIG. 20I

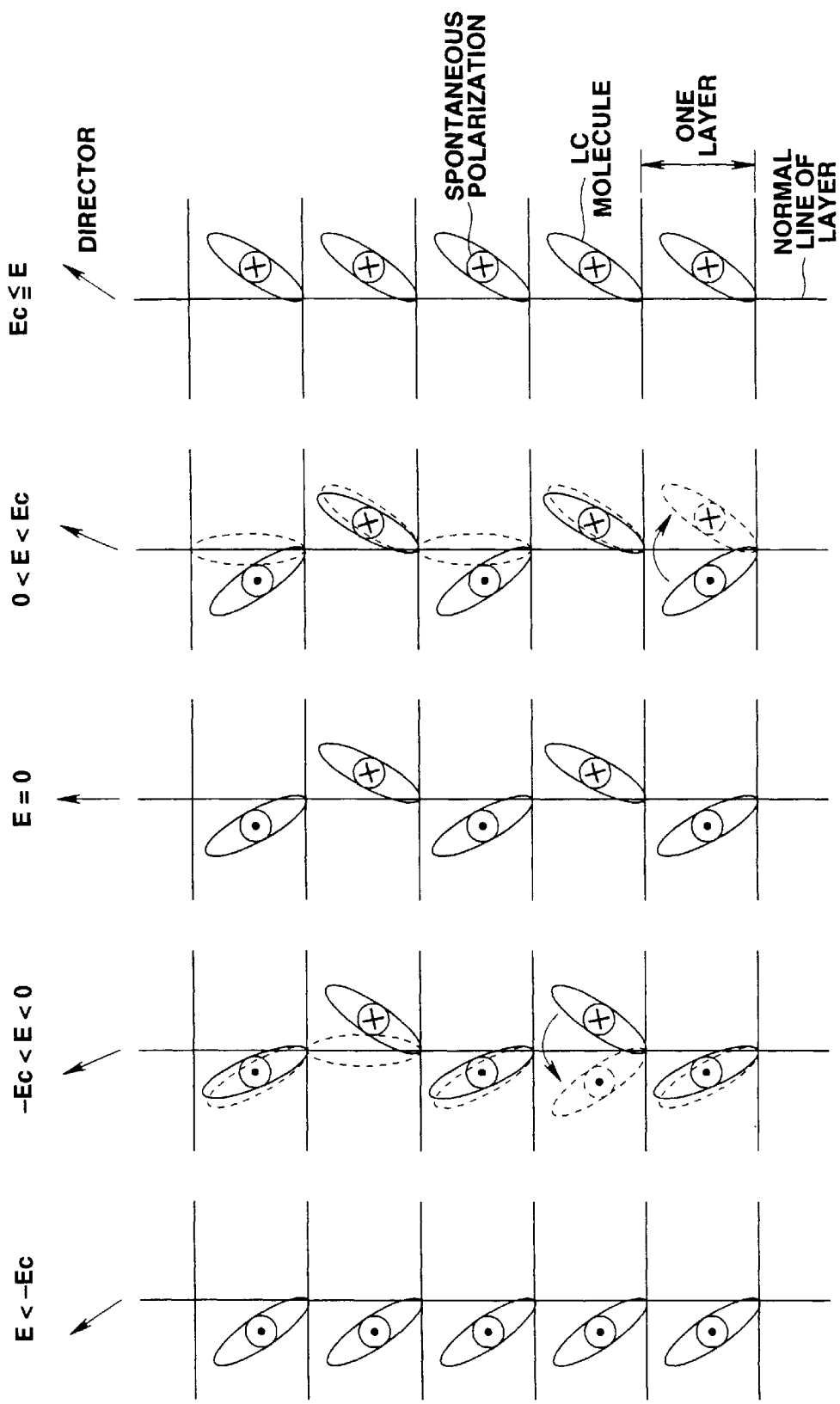

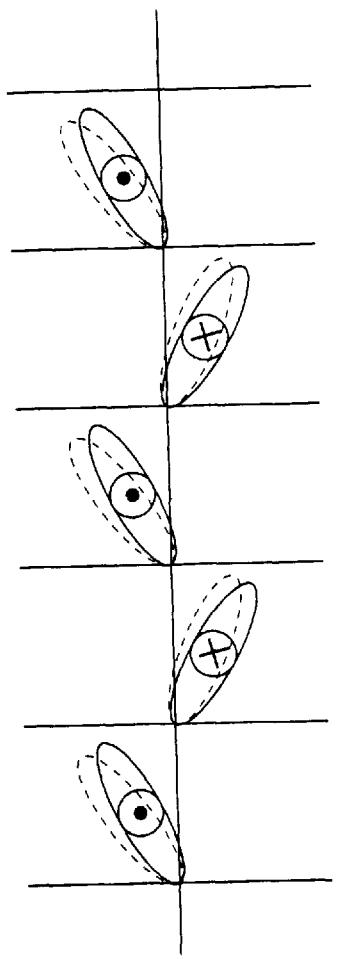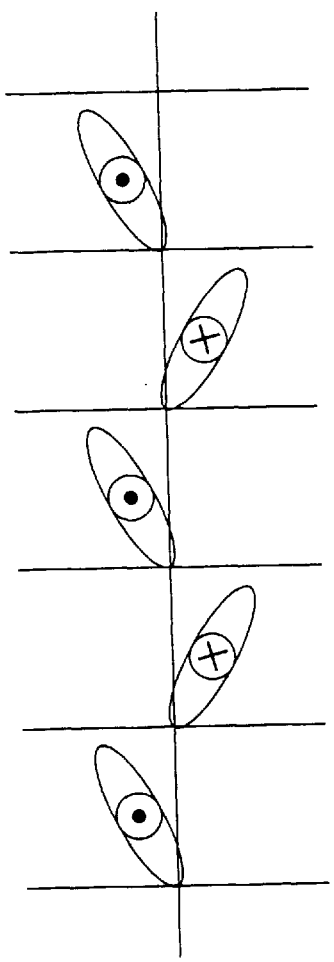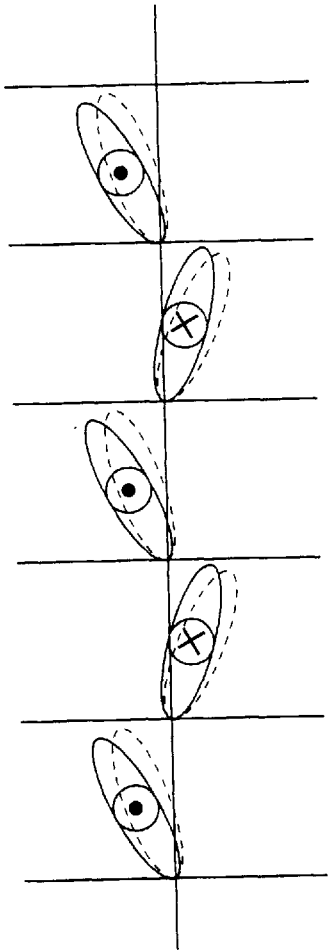
FIG.24C　　FIG.24A　　FIG.24B

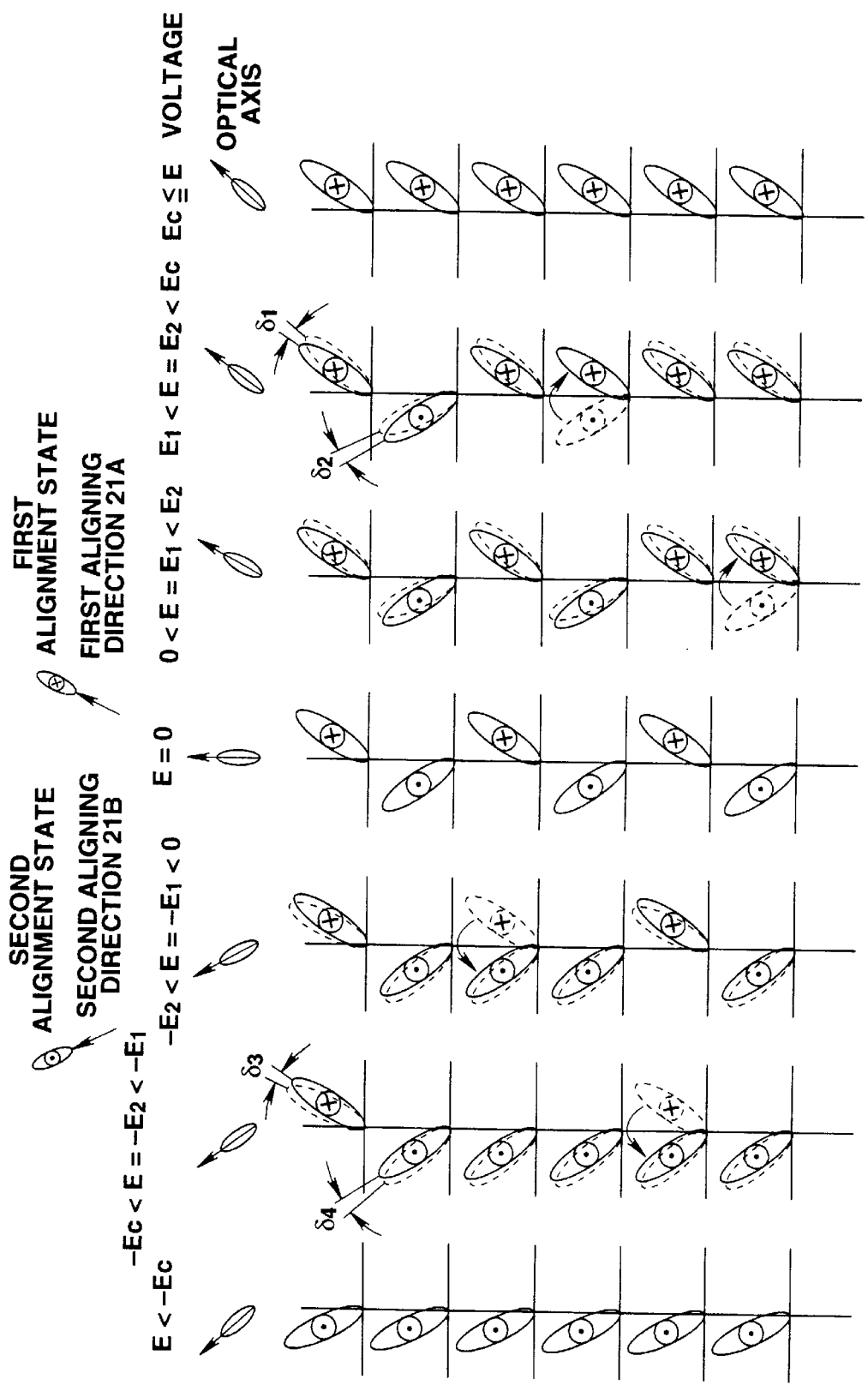

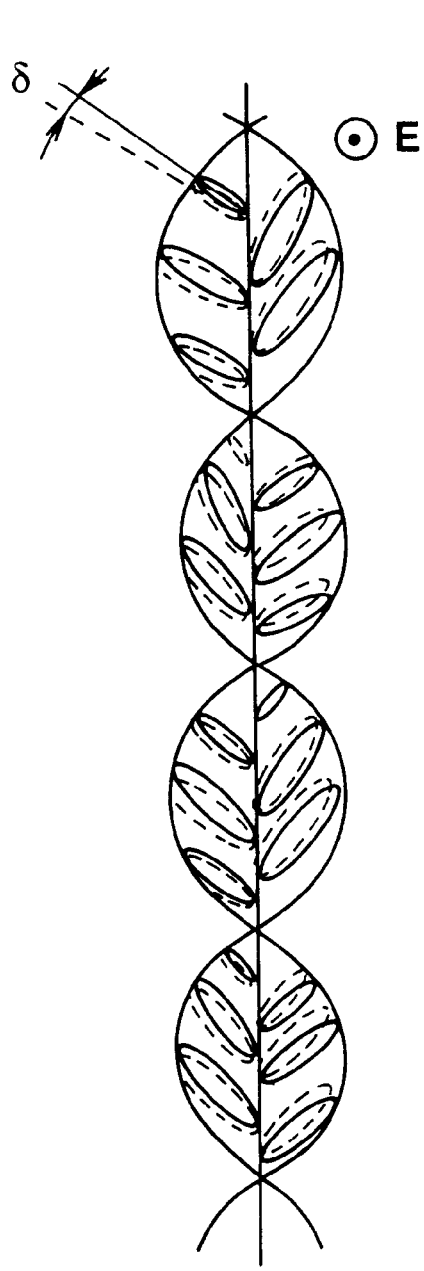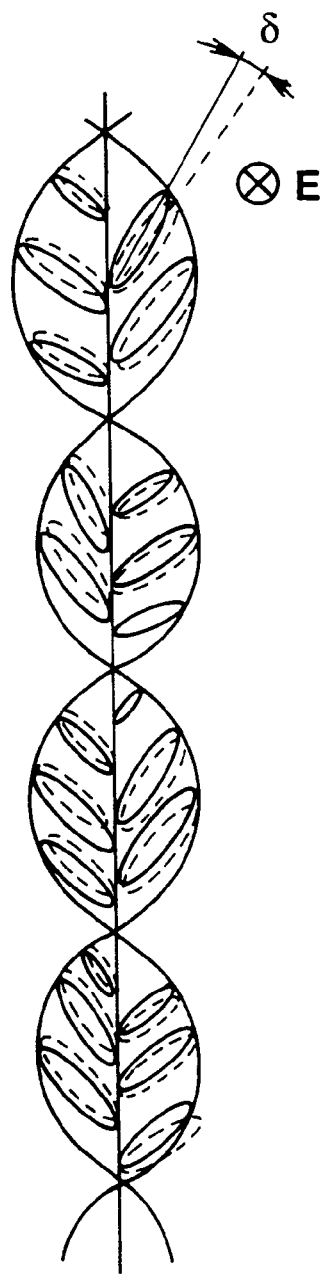
FIG.33A  FIG.33B

DIRECTION
OF VOLTAGE
APPLICATION

ANTIFERROELECTRIC LIQUID CRYSTAL DISPLAY DEVICE

This is a division of application Ser. No. 08/657,071 filed May 28, 1996 now U.S. Pat. No. 5,847,799.

BACKGROUND OF THE INVENTION

1. Field of the Invention

The present invention relates to a liquid crystal display device which uses an AFLC (AntiFerroelectric Liquid Crystal), and, more particularly, to an AFLC display device which can ensure gradation display.

2. Description of the Related Art

A ferroelectric liquid crystal (FLC) display device which uses a ferroelectric liquid crystal has a faster response and wider angle of visibility a compared with a TN liquid crystal display (LCD) device which uses a nematic liquid crystal.

Known FLC display devices include an FLC display device which uses an FLC and an AFLC display device which uses an AFLC.

The AFLC display device displays images using the stability of the alignment states an AFLC has.

This will be discussed more specifically. An AFLC has three stable alignment states of liquid crystal (LC) molecules. (1) When a voltage equal to or greater than a first threshold value is applied to the AFLC, the liquid crystal is set to a first ferroelectric phase where the LC molecules are aligned in a first direction or to a second ferroelectric phase where the LC molecules are aligned in a second direction according to the polarity of the applied voltage. (2) When a voltage equal to or smaller than a second threshold value lower than the first threshold value is applied to the AFLC, the liquid crystal is set to an antiferroelectric phase as an intermediate aligning state between the first and second ferroelectric phases. By setting the directions of the transmission axes of a pair of polarization plates located on both sides of the LCD device based on the optical axis in the antiferroelectric phase as a reference, it is possible to display images by controlling the transmittance of light in accordance with the applied voltage, as shown in FIG. 39.

The AFLC stays set to the first or second ferroelectric phase or the antiferroelectric phase even if the applied voltage changes as long as the variation lies between the first and second threshold values. That is, the AFLC has a memory property. The conventional AFLC display device is driven in a simple matrix mode using this memory property.

The memory property of the AFLC is determined by the difference between the voltage which causes the liquid crystal to change its phase to the antiferroelectric phase from the first or second ferroelectric phase and the voltage which causes the liquid crystal to change its phase to the first or second ferroelectric phase from the antiferroelectric phase. The greater this voltage difference becomes, the higher the memory property of the alignment state gets. That is, the memory property becomes greater as the hysteresis of the optical characteristic increases.

The conventional AFLC display device which is driven in a simple matrix mode therefore uses an AFLC whose voltage difference is large.

But, it is not possible to arbitrarily control the light transmittance of the conventional AFLC display device which uses an AFLC having a high memory property. That is, it is extremely difficult to control the display gradation so that multi-gradation display cannot be accomplished.

SUMMARY OF THE INVENTION

Accordingly, it is an object of the present invention to provide an AFLC display device capable of accomplishing clear gradation display.

To achieve this object, an AFLC display device according to the first aspect of this invention comprises:

a first substrate on which a plurality of pixel electrodes and a plurality of active elements connected to the pixel electrodes are arranged;

a second substrate on which a common electrode opposing the pixel electrodes is formed; and an antiferroelectric liquid crystal, sealed between the first and second substrates and having a first ferroelectric phase where LC molecules are substantially aligned in a first aligning direction, a second ferroelectric phase where LC molecules are substantially aligned in a second aligning direction and an antiferroelectric phase where there are LC molecules aligned in the first aligning direction and LC molecules aligned in the second aligning direction with an average direction of directors being substantially coincident with a direction of a normal line of a layer formed by a chiral smectic phase, whereby those LC molecules aligned to one of the first aligning direction and the second aligning direction are aligned in the other aligning direction in accordance with an applied voltage, thus forming a plurality of regions of different alignment states in a range shorter than a wavelength of light in a visible light band, and directions of the directors are changed in accordance with a ratio of regions in a first alignment state to regions in a second alignment state.

To achieve this object, an AFLC display device according to the second aspect of this invention comprises:

a first substrate;

a second substrate facing the first substrate;

an antiferroelectric liquid crystal, sealed between the first and second substrates and having a first ferroelectric phase where LC molecules are substantially aligned in a first aligning direction, a second ferroelectric phase where LC molecules are substantially aligned in a second aligning direction and an antiferroelectric phase where there are LC molecules aligned in the first aligning direction and LC molecules aligned in the second aligning direction with an average direction of directors being substantially coincident with a direction of a normal line of a layer formed by a chiral smectic phase, whereby those LC molecules aligned to one of the first aligning direction and the second aligning direction are aligned in the other aligning direction in accordance with an applied voltage, thus forming a plurality of regions of different alignment states in a range shorter than a wavelength of light in a visible light band, and directions of the directors are changed in accordance with a ratio of regions in a first alignment state to regions in a second alignment state; and control means for applying a voltage to the liquid crystal and changing the applied voltage to control the ratio of regions in the first and second alignment states, thereby setting the directions of the directors of the antiferroelectric liquid crystal to an arbitrary direction between the first and second aligning directions.

In the AFLC display devices according to the first and second aspects of this invention, the LC molecules of the antiferroelectric liquid crystal change their state from one of the first and second alignment states (stable states) to the other in accordance with the applied voltage and the ratio of the change is associated with the applied voltage. It is therefore possible to control the ratio of minute regions where the LC molecules are in the first stable state to minute regions where the LC molecules are in the second stable state by adjusting the applied voltage. The directions of the directors of the antiferroelectric liquid crystal vary in accordance with this ratio. Therefore, the directions of the directors can be controlled to an arbitrary direction between the first and second aligning directions.

An AFLC display device according to the third aspect of this invention comprises:

a first substrate on which a plurality of pixel electrodes and a plurality of active elements connected to the pixel electrodes are arranged;

a second substrate on which a common electrode opposing the pixel electrodes is formed; and an antiferroelectric liquid crystal, sealed between the first and second substrates and having first and second ferroelectric phases where alignment states of LC molecules differ from each other, and an antiferroelectric phase, the antiferroelectric liquid crystal having an intermediate alignment state which lies between the ferroelectric phases and the antiferroelectric phase and to which directors are changed by movement of the LC molecules caused by a phase transition precursor in accordance with an applied voltage.

An AFLC display device according to the fourth aspect of this invention comprises:

a first substrate;

a second substrate facing the first substrate;

an antiferroelectric liquid crystal, sealed between the first and second substrates and having first and second ferroelectric phases where alignment states of LC molecules differ from each other, and an antiferroelectric phase, the antiferroelectric liquid crystal having an intermediate alignment state which lies between the ferroelectric phases and the antiferroelectric phase and to which directors are changed by movement of the LC molecules caused by a phase transition precursor in accordance with an applied voltage; and control means for applying a voltage to the antiferroelectric liquid crystal and changing the applied voltage to control the phase transition precursor of the antiferroelectric liquid crystal, thereby setting the directions of the directors of the antiferroelectric liquid crystal to an arbitrary direction between the first and second aligning directions.

In the AFLC display devices according to the third and fourth aspects of this invention, the LC molecules of the antiferroelectric liquid crystal are inclined by the phase transition precursor in accordance with the applied voltage. The directions of the directors of the antiferroelectric liquid crystal change in accordance with this inclination. Therefore, the directions of the directors can be controlled to an arbitrary direction between the first and second aligning directions to alter the direction of the optical axis of the LC layer, thus controlling the display accordingly.

An AFLC display device according to the fifth aspect of this invention comprises:

a first substrate on which a plurality of pixel electrodes and a plurality of active elements connected to the pixel electrodes are arranged;

a second substrate on which a common electrode opposing the pixel electrodes is formed; and an antiferroelectric liquid crystal, sealed between the first and second substrates and having first and second ferroelectric phases where alignment states of LC molecules differ from each other, and an antiferroelectric phase, the antiferroelectric liquid crystal having an intermediate alignment state which lies between the ferroelectric phases and the antiferroelectric phase and to which directors are changed by inclination of the LC molecules in a direction perpendicular to an electric field in accordance with an applied voltage.

An AFLC display device according to the sixth aspect of this invention comprises:

a first substrate;

a second substrate facing the first substrate;

an antiferroelectric liquid crystal, sealed between the first and second substrates and having first and second ferroelectric phases where alignment states of LC molecules differ from each other, and an antiferroelectric phase, the antiferroelectric liquid crystal having an intermediate alignment state which lies between the ferroelectric phases and the antiferroelectric phase and to which directors are changed by inclination of the LC molecules in a direction perpendicular to an electric field in accordance with an applied voltage; and control means for applying a voltage to the antiferroelectric liquid crystal and changing the applied voltage to control an amount of inclination of individual LC molecules of the antiferroelectric liquid crystal in the direction perpendicular to the electric field, thereby setting the directions of the directors of the antiferroelectric liquid crystal to an arbitrary direction between the first and second aligning directions.

In the AFLC display devices according to the fifth and sixth aspects of this invention, the LC molecules of the antiferroelectric liquid crystal are inclined in a direction perpendicular to an electric field in accordance with the applied voltage. The directions of the directors of the antiferroelectric liquid crystal change in accordance with this inclination. Therefore, the directions of the directors can be controlled to an arbitrary direction between the first and second aligning directions to thereby control the display.

An AFLC display device according to the seventh aspect of this invention comprises:

a first substrate on which a plurality of pixel electrodes and a plurality of active elements connected to the pixel electrodes are arranged;

a second substrate on which a common electrode opposing the pixel electrodes is formed; and an antiferroelectric liquid crystal, sealed between the first and second substrates and having first and second ferroelectric phases where alignment states of LC molecules differ from each other, and an antiferroelectric phase where the LC molecules are aligned with a double helical structure of a smectic CA* phase, the antiferroelectric liquid crystal having an intermediate alignment state which lies between the ferroelectric phases and the antiferroelectric phase and to which directors are changed by deformation of the double helical structure caused in accordance with an applied voltage.

An AFLC display device according to the eighth aspect of this invention comprises:

a first substrate on which a plurality of pixel electrodes and a plurality of active elements connected to the pixel electrodes are arranged;

a second substrate on which a common electrode opposing the pixel electrodes is formed;

an antiferroelectric liquid crystal, sealed between the first and second substrates and having first and second ferroelectric phases where alignment states of LC molecules differ from each other, and an antiferroelectric phase where the LC molecules are aligned with a double helical structure of a smectic CA* phase, the antiferroelectric liquid crystal having an intermediate alignment state which lies between the ferroelectric phases and the antiferroelectric phase and to which directors are changed by deformation of the double helical structure caused in accordance with an applied voltage; and control means for applying a voltage to the antiferroelectric liquid crystal and changing the applied voltage to control deformation of the double helical structure of the antiferroelectric liquid crystal, thereby setting the directions of the directors of the antiferroelectric liquid crystal to an arbitrary direction between the first and second aligning directions.

In the AFLC display devices according to the seventh and eighth aspects of this invention, the double helical structure traced by the LC molecules of the antiferroelectric liquid crystal are deformed in accordance with the applied voltage. The directions of the directors of the antiferroelectric liquid crystal change in accordance with this deformation. Therefore, the directions of the directors can be controlled to an arbitrary direction between the first and second aligning directions to alter the direction of the optical axis of the LC layer, thus controlling the display accordingly.

The LCD devices according to the first and second aspects, the LCD devices according to the third and fourth aspects, the LCD devices according to the fifth and sixth aspects, and the LCD devices according to the seventh and eighth aspects use liquid crystals which present an intermediate alignment state by different behaviors of the LC molecules with respect to the applied voltages. It is also possible to use an antiferroelectric liquid crystal which can provide an intermediate alignment state due to combined causes as a plurality of phenomena occur simultaneously or occur continuously in accordance with the applied voltage. This is possible as long as all of or at least some of the factors which provide the intermediate alignment state are caused by the aforementioned behaviors of the LC molecules.

BRIEF DESCRIPTION OF THE DRAWINGS

FIGS. 6A through 6G illustrate the relationship between the applied voltage to an AFLC display device according to the first embodiment and the alignment of the LC molecules, in which FIG. 6A is a diagram for explaining the alignment of the LC molecules when no voltage is applied, FIGS. 6B and 6C are diagrams for explaining the alignment of the LC molecules when a positive intermediate voltage is applied, FIG. 6D is a diagram for explaining the alignment of the LC molecules when a positive and sufficiently large voltage is applied, FIGS. 6E and 6F are diagrams for explaining the alignment of the LC molecules when a negative intermediate voltage is applied, and FIG. 6G is a diagram for explaining the alignment of the LC molecules when a negative and sufficiently large voltage is applied;

FIGS. 9A through 9I are diagrams presenting a plurality of polarization-microscopic photographs of the AFLC display device of the first embodiment, with the applied voltage rising in the order of FIG. 9A to FIG. 9I;

FIGS. 10A through 10C are timing charts for explaining how to drive the AFLC display device embodying this invention, in which FIG. 10A shows a gate signal, FIG. 10B shows a data signal and FIG. 10C shows a voltage to be retained in each pixel;

FIGS. 13A through 13E illustrate the relationship between the applied voltage to an AFLC display device according to the second embodiment of this invention and the alignment of the LC molecules, in which FIG. 13A is a diagram for explaining the alignment of the LC molecules when no voltage is applied, FIG. 13B is a diagram for explaining the alignment of the LC molecules when a positive intermediate voltage is applied, FIG. 13C is a diagram for explaining the alignment of the LC molecules when a positive and sufficiently large voltage is applied, FIG. 13D is a diagram for explaining the alignment of the LC molecules when a negative intermediate voltage is applied, and FIG. 13E is a diagram for explaining the alignment of the LC molecules when a negative and sufficiently large voltage is applied;

FIGS. 16A through 16E illustrate the relationship between the applied voltage to an AFLC display device according to the third embodiment of this invention and the alignment of the LC molecules, in which FIG. 16A is a diagram for explaining the alignment of the LC molecules when no voltage is applied, FIG. 16B is a diagram for explaining the alignment of the LC molecules when a positive intermediate voltage is applied, FIG. 16C is a diagram for explaining the alignment of the LC molecules when a positive and sufficiently large voltage is applied, FIG. 16D is a diagram for explaining the alignment of the LC molecules when a negative intermediate voltage is applied, and FIG. 16E is a diagram for explaining the alignment of the LC molecules when a negative and sufficiently large voltage is applied;

FIGS. 18A through 18E illustrate the relationship between the applied voltage to an AFLC display device according to the fourth embodiment and the alignment of the LC molecules, in which FIG. 18A is a diagram for explaining the alignment of the LC molecules when no voltage is applied, FIGS. 18B and 18C are diagrams for explaining the alignment of the LC molecules when a positive intermediate voltage is applied, FIG. 18D is a diagram for explaining the alignment of the LC molecules when a positive and sufficiently large voltage is applied, FIGS. 18E and 18F are diagrams for explaining the alignment of the LC molecules when a negative intermediate voltage is applied, and FIG. 18G is a diagram for explaining the alignment of the LC molecules when a negative and sufficiently large voltage is applied;

FIGS. 20A through 20I are diagrams showing a plurality of polarization-microscopic photographs of the AFLC display device of the fourth embodiment, with the applied voltage rising in the order of FIG. 20A to FIG. 20I;

FIGS. 21A through 21E illustrate the relationship between the applied voltage to an AFLC display device according to the fifth embodiment of this invention and the alignment of the LC molecules, in which FIG. 21A is a diagram for explaining the alignment of the LC molecules when no voltage is applied, FIG. 21B is a diagram for explaining the alignment of the LC molecules when a positive intermediate voltage is applied, FIG. 21C is a diagram for explaining the alignment of the LC molecules when a positive and sufficiently large voltage is applied, FIG. 21D is a diagram for explaining the alignment of the LC molecules when a negative intermediate voltage is applied, and FIG. 21E is a diagram for explaining the alignment of the LC molecules when a negative and sufficiently large voltage is applied;

FIGS. 24A through 24C illustrate the relationship between the applied voltage to an AFLC display device according to the sixth embodiment of this invention and the alignment of the LC molecules, in which FIG. 24A is a diagram for explaining the alignment of the LC molecules when no voltage is applied, FIG. 24B is a diagram for explaining the alignment of the LC molecules when a positive intermediate voltage is applied, and FIG. 24C is a diagram for explaining the alignment of the LC molecules when a negative intermediate voltage is applied;

FIGS. 25A through 25G illustrate the relationship between the applied voltage to an AFLC display device according to the seventh embodiment and the alignment of the LC molecules, in which FIG. 25A is a diagram for explaining the alignment of the LC molecules when no voltage is applied, FIGS. 25B and 25C are diagrams for explaining the alignment of the LC molecules when a positive intermediate voltage is applied, FIG. 25D is a diagram for explaining the alignment of the LC molecules when a positive and sufficiently large voltage is applied, FIGS. 25E and 25F are diagrams for explaining the alignment of the LC molecules when a negative intermediate voltage is applied, and FIG. 25G is a diagram for explaining the alignment of the LC molecules when a negative and sufficiently large voltage is applied;

FIGS. 30A through 30E illustrate the relationship between the applied voltage to an AFLC display device according to the eighth embodiment of this invention and the alignment of the LC molecules, in which FIG. 30A is a diagram for explaining the alignment of the LC molecules when no voltage is applied, FIG. 30B is a diagram for explaining the alignment of the LC molecules when a positive intermediate voltage is applied, FIG. 30C is a diagram for explaining the alignment of the LC molecules when a positive and sufficiently large voltage is applied, FIG. 30D is a diagram for explaining the alignment of the LC molecules when a negative intermediate voltage is applied, and FIG. 30E is a diagram for explaining the alignment of the LC molecules when a negative and sufficiently large voltage is applied;

FIGS. 33A and 33B illustrate the relationship between the applied voltage to an AFLC display device according to the ninth embodiment of this invention and the alignment of the LC molecules, in which FIG. 33A is a diagram used for explaining the alignment of the LC molecules when no voltage is applied in comparison with the alignment of the LC molecules when a positive voltage is applied, and FIG. 33B is a diagram used for explaining the alignment of the LC molecules with no voltage applied in comparison with the alignment of the LC molecules when a negative voltage is applied;

FIGS. 36A through 36D present conoscope images of the AFLC display device according to the ninth embodiment, in which FIG. 36A shows a conoscope image when no voltage is applied, FIGS. 36B and 36C show conoscope images when a positive intermediate voltage is applied, and FIG. 36D shows a conoscope image when a positive and sufficiently large voltage is applied;

FIGS. 38A through 38C present conoscope images of the AFLC display device according to the tenth embodiment, in which FIG. 38A shows a conoscope image when a positive intermediate voltage is applied, FIG. 38B shows a conoscope image when no voltage is applied, and FIG. 38C shows a conoscope image when a negative intermediate voltage is applied.

DETAILED DESCRIPTION OF THE PREFERRED EMBODIMENTS

Preferred embodiments of the present invention as adapted to an antiferroelectric liquid crystal (hereinafter referred to as "AFLC") capable of providing an arbitrary intermediate alignment state and an AFLC display device of an active matrix type, which uses this AFLC, will now be described with reference to the accompanying drawings.

First Embodiment

Figure 1:
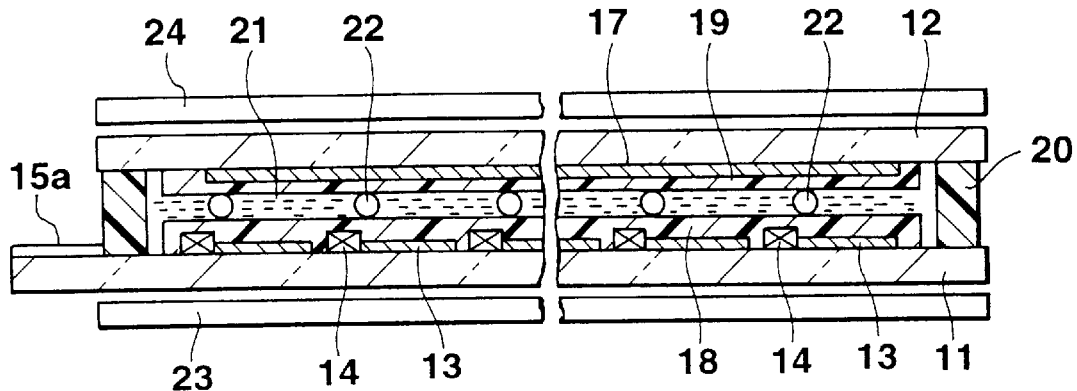
FIG. 1 is a cross-sectional view showing the structure of an LCD device according to one embodiment of this invention.

To begin with, the structure of an AFLC display device according to the first embodiment of this invention will be discussed. FIG. 1 is a cross-sectional view of the AFLC display device, and FIG. 2 is a plan view of a substrate on which pixel electrodes and active elements are formed.

This AFLC display device is of an active matrix type, and has a pair of transparent substrates (e.g., glass substrates) 11 and 12. In FIG. 1, transparent pixel electrodes 13, and active elements 14 connected to the pixel electrodes 13 are arranged on the lower transparent substrate (hereinafter called lower substrate) 11 in a matrix form.

The active elements 14 are constituted of, for example, thin film transistors (hereinafter referred to as "TFTs"). Each TFT 14 comprises a gate electrode formed on the lower substrate 11, a gate insulating film covering the gate electrode, a semiconductor layer formed on the gate insulating film, a source electrode formed on the semiconductor layer, and a drain electrode.

Figure 2:
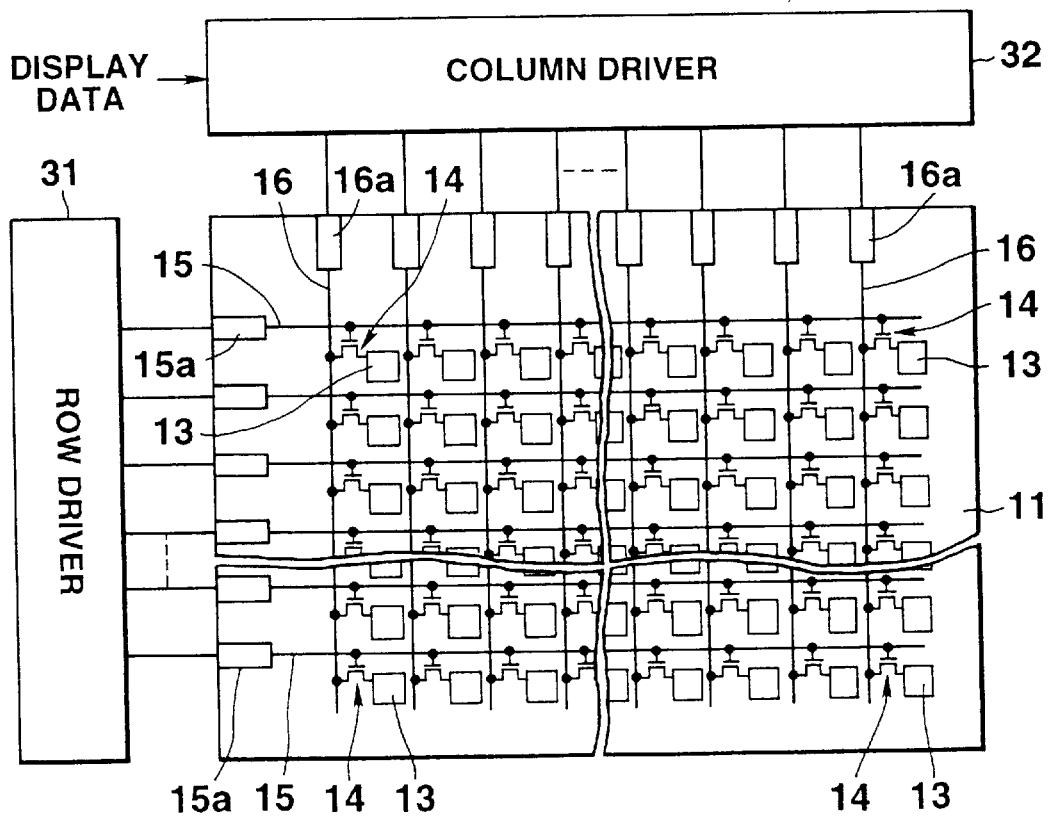
FIG. 2 is a plan view showing the structure of a lower substrate of the LCD device shown in FIG. 1.

As shown in FIG. 2, gate lines (scan lines) 15 are laid between the rows of pixel electrodes 13 and data lines (gradation signal lines) 16 are laid between the columns of pixel electrodes 13. The gate electrodes of the individual TFTs 14 are connected to the associated gate lines 15, and the drain electrodes of the TFTs 14 are connected to the associated data lines 16.

The gate lines 15 are connected via end portions 15a to a row driver 31, and the data lines 16 are connected via end portions 16a to a column driver 32. The row driver 31 applies a gate signal (which will be described later) to the gate lines 15 to scan the gate lines 15. The column driver 32 applies a data signal corresponding to display data to the data lines 16 upon reception of the display data (gradation data).

The gate lines 15 are covered by a gate insulating film (transparent film)of the TFTs 14 excluding the end portions 15a, and the data lines 16 are formed on this gate insulating film. The pixel electrodes 13, made of ITO or the like, are formed on the gate insulating film and are connected at their one end portions to the source electrodes of the associated TFTs 14.

In FIG. 1, a transparent common electrode 17, which opposes the individual pixel electrodes 13 of the lower substrate 11, is formed on the upper transparent substrate (hereinafter called upper substrate) 12. The common electrode 17 is made of ITO or the like and is comprised of a single electrode whose region covers the entire display region, and is applied with a reference voltage V0. The pixel electrodes 13 and the common electrode 17 serve to apply a voltage to an liquid crystal 21 sandwiched therebetween to control the aligning direction or the like of the liquid crystal (LC) molecules, to control the directors of the LC molecules, and eventually to control the optical axis of the LC layer. The display gradation is controlled in this manner.

Aligning films 18 and 19 are provided on the electrode-forming surfaces of the lower substrate 11 and the upper substrate 12. The aligning films 18 and 19 are homogeneous aligning films formed of an organic high molecular compound, such as polyimide, and their opposing surfaces have undergone an aligning treatment, "rubbing," in the same direction (direction 21C which will be discussed later).

The lower substrate 11 and the upper substrate 12 are adhered at their peripheral edge portions via a frame-shaped seal member 20. The aforementioned liquid crystal 21 is sealed in an region surrounded by a seal member 20 between the substrates 11 and 12.

The liquid crystal 21 is constituted of an AFLC having a smectic CA* phase. The thickness of the layer of the liquid crystal 21 is restricted by transparent or black spacer members 22, which are located here and there in the LC-sealed region.

Figure 3:
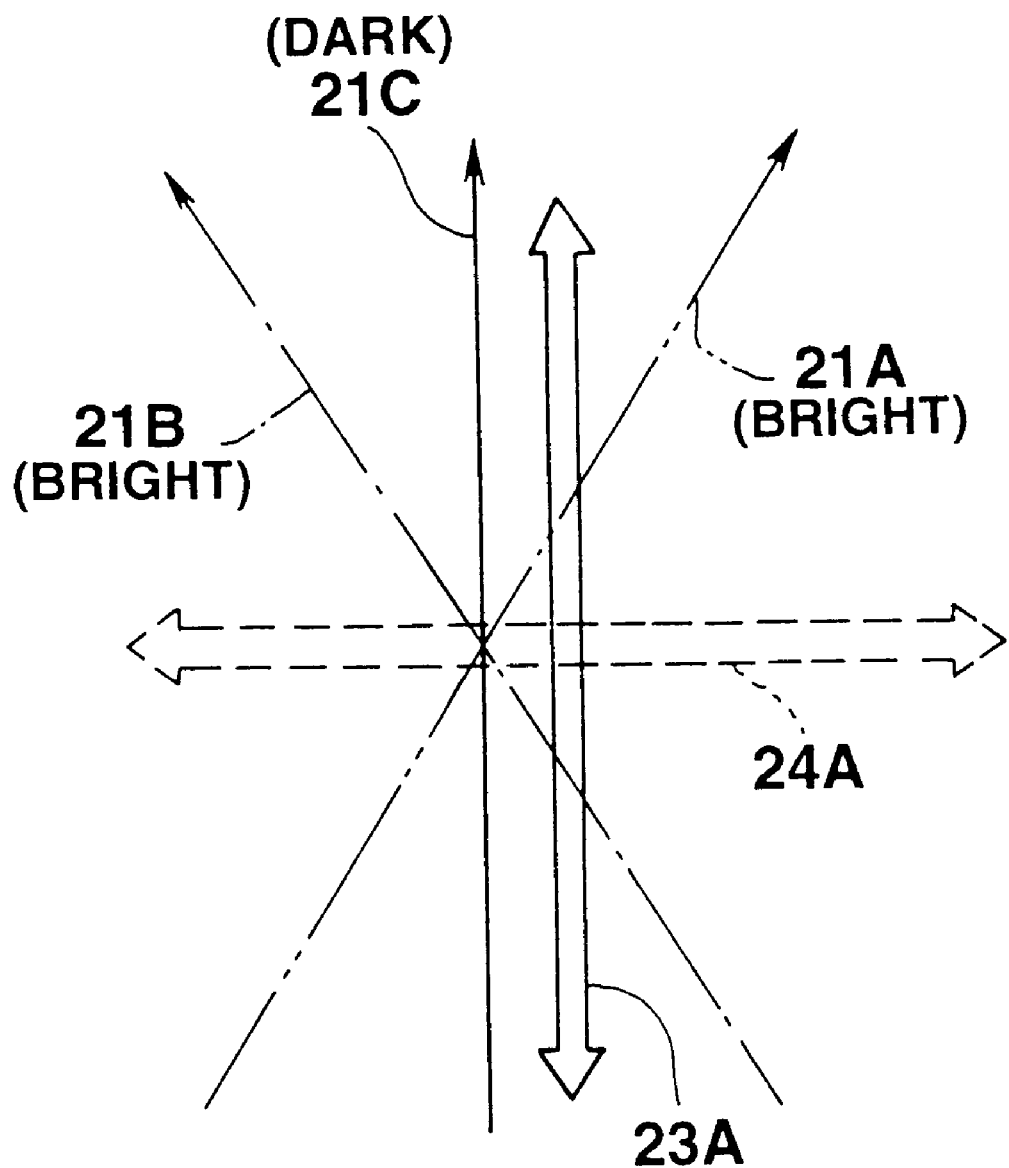
FIG. 3 is a diagram illustrating the relationship between the transmission axis of a polarization plate and the aligning direction of LC molecules.

The AFLC 21, when applied with a sufficiently high voltage, is set to a first ferroelectric phase where the LC molecules are aligned to a first aligning direction 21A shown in FIG. 3 or to a second ferroelectric phase where the LC molecules are aligned to a second aligning direction 21B different from the first aligning direction 21A, in accordance with the polarity of the applied voltage.

When no voltage is applied, the director (the average direction of the long axes of the LC molecules) of the AFLC 21 is set to an antiferroelectric phase where the normal line of the layer formed by SmCA* phase is substantially aligned to a direction 21C of the aligning treatment. When an intermediate voltage is applied to the AFLC 21, the AFLC 21 has multiple intermediate states.

A pair of polarization plates 23 and 24 are arranged at the top and bottom of the LCD device. As shown in FIG. 3, the optical axis (hereinafter called "transmission axis"), 23A, of the lower polarization plate 23 is set in substantially parallel to the direction of the normal line of the smectic layer which is substantially coincident with the direction 21C of the aligning treatment. The optical axis (transmission axis), 24A, of the upper polarization plate 24 is set substantially perpendicular to the transmission axis 23A of the lower polarization plate 23.

The AFLC display device whose polarization plates 23 and 24 have their transmission axes 23A and 24A set as shown in FIG. 3 has substantially the maximum transmittance (brightest display) in the ferroelectric phase where the director of the AFLC 21 is substantially aligned to the first or second aligning direction 21A or 21B. The transmittance becomes substantially the minimum (darkest display) in the antiferroelectric phase where the director of the AFLC 21 is substantially aligned to the third direction 21C.

More specifically, when the LC molecules are aligned to the first or second direction 21A or 21B, the linearly polarized light which has passed the transmission axis 23A of the incident-side polarization plate 23 becomes non-linearly polarized light by the birifringence effect of the AFLC 21. This non-linearly polarized light hits the outgoing-side polarization plate 24, and the component of the non-linearly polarized light which is parallel to the transmission axis 24A of the outgoing-side polarization plate 24 goes out, making the display brighter.

When the director is aligned to the third direction 21C, the linearly polarized light which has passed the incident-side polarization plate 23 is hardly affected by the birifringence effect of the AFLC 21. Accordingly, the linearly polarized light which has passed the incident-side polarization plate 23 passes through the AFLC 21 as the linearly polarized light and is mostly absorbed by the outgoing-side polarization plate 24, making the display darker.

When the AFLC 21 is optically in an intermediate state, the gradation according to the direction of the director is acquired.

The details of the AFLC 21 will now be discussed.

Figure 4:
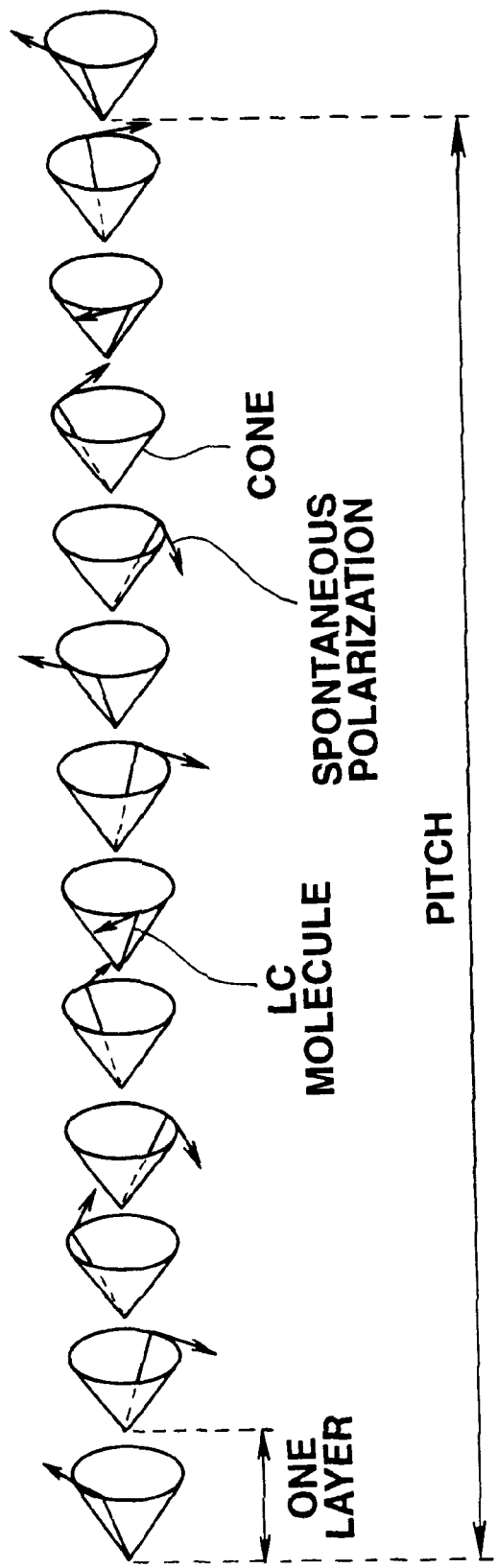
FIG. 4 is a diagram for explaining the double helical structure traced by the LC molecules of an antiferroelectric liquid crystal (AFLC)

The AFLC 21 is comprised of a liquid crystal which has a large cone angle of 30 degrees to 45 degrees (desirably 35 degrees or greater) and has a smectic CA* phase that changes in the sequence of isotropic, SmA and SmCA*. The AFLC 21, in a bulk state, has a layer structure of aligned molecules and a helical structure as shown in FIG. 4. The adjoining LC molecules of the AFLC 21, unlike those of the ordinary ferroelectric liquid crystal (FLC), has a double helical structure which is acquired by the LC molecules shifting nearly 180 degrees of a cone for each layer. The AFLC 21 has a strong antiferroelectric interaction (the action that inverts the aligning direction of the LC molecules for each layer) and a strong ferroelectric interaction (the action that causes the individual LC molecules to be aligned in parallel in one direction to be apt to be in a ferroelectric phase). It is to be noted that the antiferroelectric interaction is the strongest.

The AFLC 21 is obtained by mixing liquid crystals having essential structures as shown in (I) to (III) in Table 1 at the mixing ratio of, for example, 5 to 50 weight % of (I) and (II) and the remainder for (III).

where

Rf: $C_1$ or $C_2$ fluoroalkyl group,

R1: $C_3$–$C_{20}$ linear or branched alkyl group,

R2, R3, R4: independent hydrogen groups, $C_1$–$C_{15}$ linear or branched alkyl groups, $C_2$–$C_{10}$ linear or branched alkenyl groups, or $C_7$–$C_{10}$ linear or branched aralkyl groups, X1: carboxyl group, ether group or single bond, X2: carboxyl group, ether group, methoxy group or single bond, X3: carboxyl group, methoxy group, ether group or single bond, X4: ether group, carboxyl group or single bond, A, B: independent groups having a 6-membered ring, which may be substituted, n: 0 or 1, R6: $C_1$–$C_{15}$ alkyl group or alkoxy group, which may have a substituent, R7: $C_1$–$C_{15}$ alkyl group which may have a substituent, Q: ether group, carboxyl group, urethane group or single bond, and E: benzene ring or pyrimidine ring.

The thickness of the layer (cell gap) of the AFLC 21 is set smaller than one pitch (natural pitch) of the helical structure of the AFLC 21. The AFLC 21 is therefore sealed between the substrates 11 and 12 with the double helical structure nullified as shown in an explanatory fashion in FIG. 5. The double helical structure may be nullified by setting the cell gap greater than one pitch of the helical structure of the AFLC 21 and by the surface stabilizing effect produced by stabilizing the surfaces of the aligning films 18 and 19.

Figure 6:
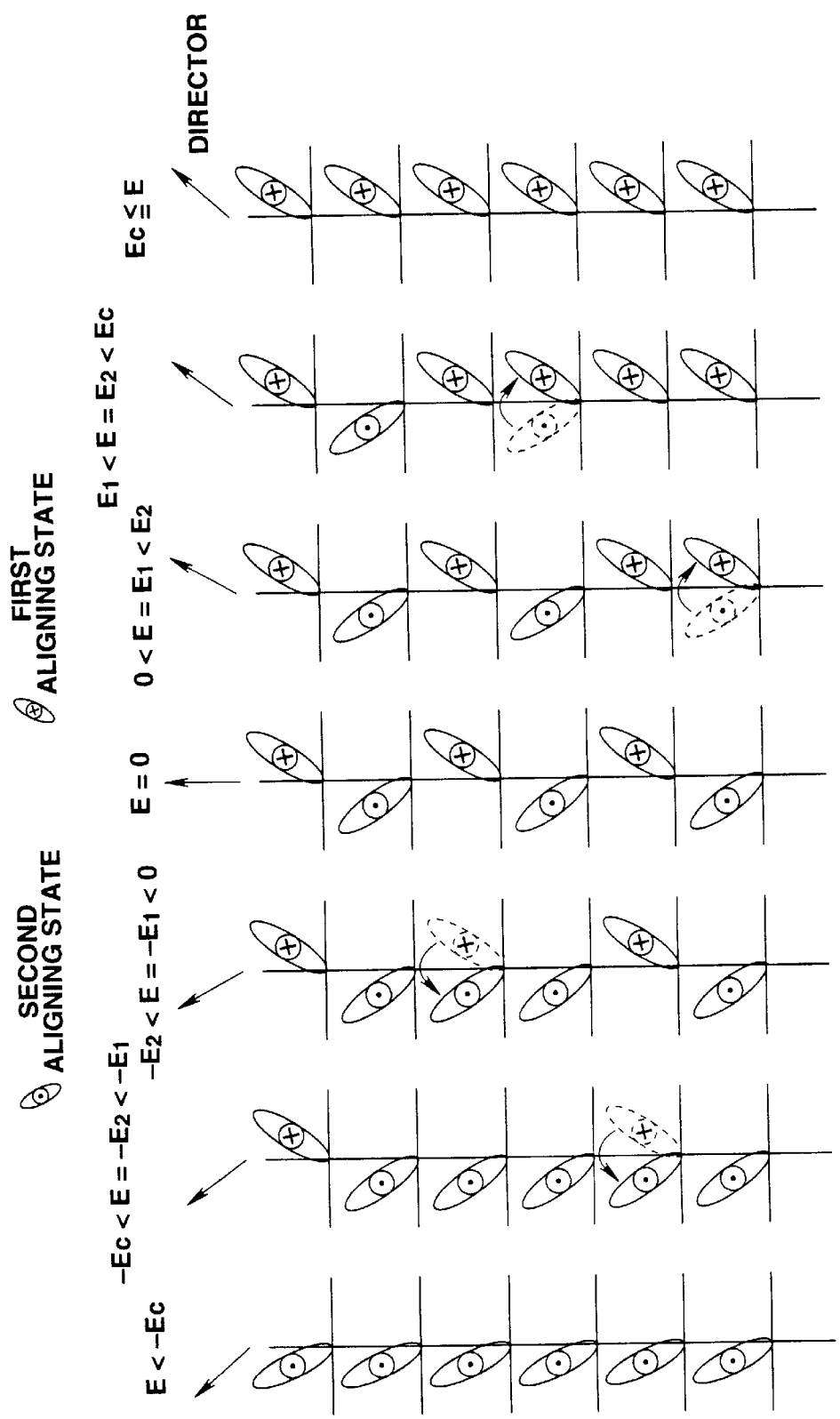

FIG. 6 is a diagram used for explaining the alignment of the LC molecules by an applied voltage.

Each LC molecule has two alignment states where the long axis of the molecules is aligned to the first aligning direction 21A and to the second aligning direction 21B (as shown in FIG. 3).

With no voltage applied, the LC molecules are alternately aligned to the first and second aligning directions 21A and

TABLE 1

(I)

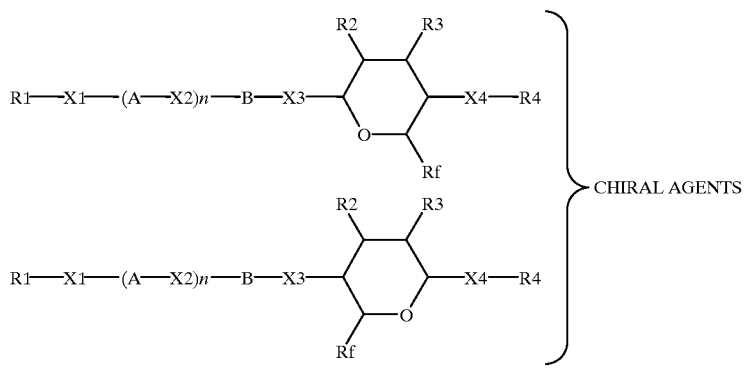

(II)
(III)

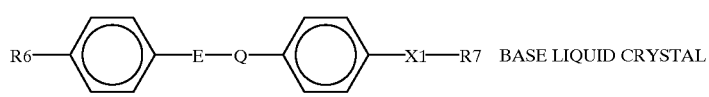

21B, as shown in FIG. 6A. That is, the first alignment state and the second alignment state are repeated layer by layer. Under this situation, spontaneous polarization occurs in each layer but the permanent dipoles of adjoining layers face in the opposite directions so that the dipole moments are canceled out. As a result, from the systematic point of view, no spontaneous polarization exists so that the antiferroelectric phase is set. The optical axis of the AFLC 21, which is spatially averaged, is substantially coincident to the director (the normal line direction 21C, as shown in FIG. 3, of the smectic layer (the layer formed by the smectic phase)).

As a voltage (saturated voltage) equal to or greater than a given absolute value Ec is applied to the AFLC 21, the LC molecules are set to the first or second alignment state in accordance with the polarity of the applied voltage as shown in FIGS. 6D and 6G. Under this circumstance, the permanent dipoles of nearly all the LC molecules are aligned to the same direction, causing spontaneous polarization, and the AFLC 21 becomes the first or second ferroelectric phase.

As mentioned earlier, the AFLC 21 has a strong ferroelectric interaction. That is, the behavior of the LC molecules to be aligned to either the first alignment state or the second alignment state is strong. When a positive voltage E (where $E=E_1$ or $E_2$, and $E_1<E_2$) smaller than the saturated voltage Ec is applied, some of the LC molecules in the second alignment state are changed to the first alignment state in accordance with the level of the applied voltage E, as shown in FIGS. 6B and 6C. The number (ratio) of molecules whose alignment state is changed increases as the applied voltage E becomes greater. As the applied voltage increases, therefore, the director (average direction of the long axis of the molecules) of the AFLC 21 continuously changes toward the first aligning direction 21A.

When a negative voltage E (where $E=-E_1$ or $-E_2$, and $-E_1>-E_2$) smaller than the saturated voltage $^-Ec$ is applied, some of the LC molecules in the first alignment state are changed to the second alignment state in accordance with the level of the applied voltage E, as shown in FIGS. 6E and 6F. The number (ratio) of molecules whose alignment state is changed increases as the applied voltage E becomes greater. As the absolute value of the applied voltage increases, therefore, the average direction of the directors of the LC molecules continuously changes toward the second aligning direction 21B.

Figure 7:
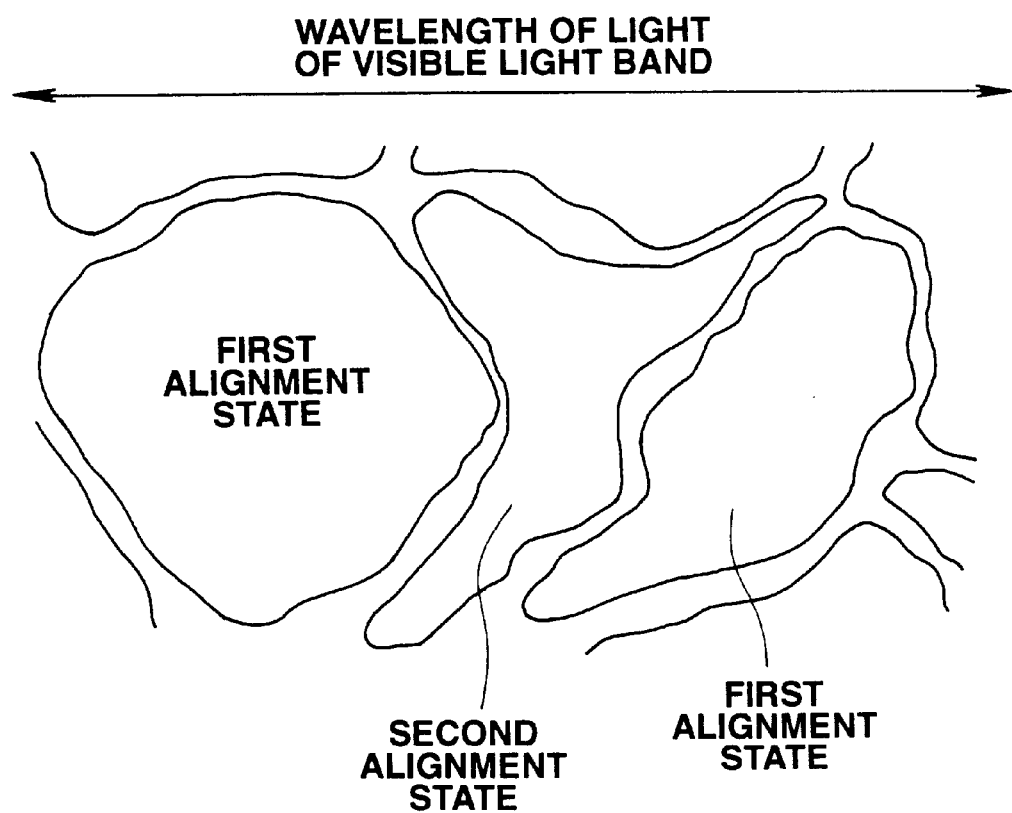
FIG. 7 is an exemplary diagram showing a plurality of minute regions in different alignment states being formed within a distance shorter than the wavelength of light in a visible light band.

In other words, when a voltage is applied to the AFLC 21, multiple minute regions where the LC molecules are aligned to the first alignment state and multiple minute regions where the LC molecules are aligned to the second alignment state are formed within a distance shorter than the wavelength of light in the visible light band, as explanatorily shown in FIG. 7. The ratio of the area or the number of those minute regions varies in accordance with the applied voltage. Because the size of each minute region is smaller than the wavelength of light in the visible light band, the optical characteristics of a plurality of minute regions are optically averaged so that the average direction of the directors of the AFLC 21 at a plurality of minute regions becomes the substantial optical axis of the AFLC 21. This optical axis continuously changes in accordance with a change in the alignment of the LC molecules caused by a change in the applied voltage, i.e., in accordance with a change in the ratio of the LC molecules in the first alignment state to those in the second alignment state.

Therefore, the optical characteristic of the AFLC display device with the above structure has no flat portion in the vicinity of the applied voltage of 0 V, and continuously and smoothly changes as the absolute value of the applied voltage increases. Further, the curves of the transmittances become symmetrical with respect to the polarity of the applied voltage. When an absolute value of the applied voltage is equal to or greater than the saturated voltage Ec, the transmittance is saturated. Furthermore, the hysteresis is very small.

Figure 8:
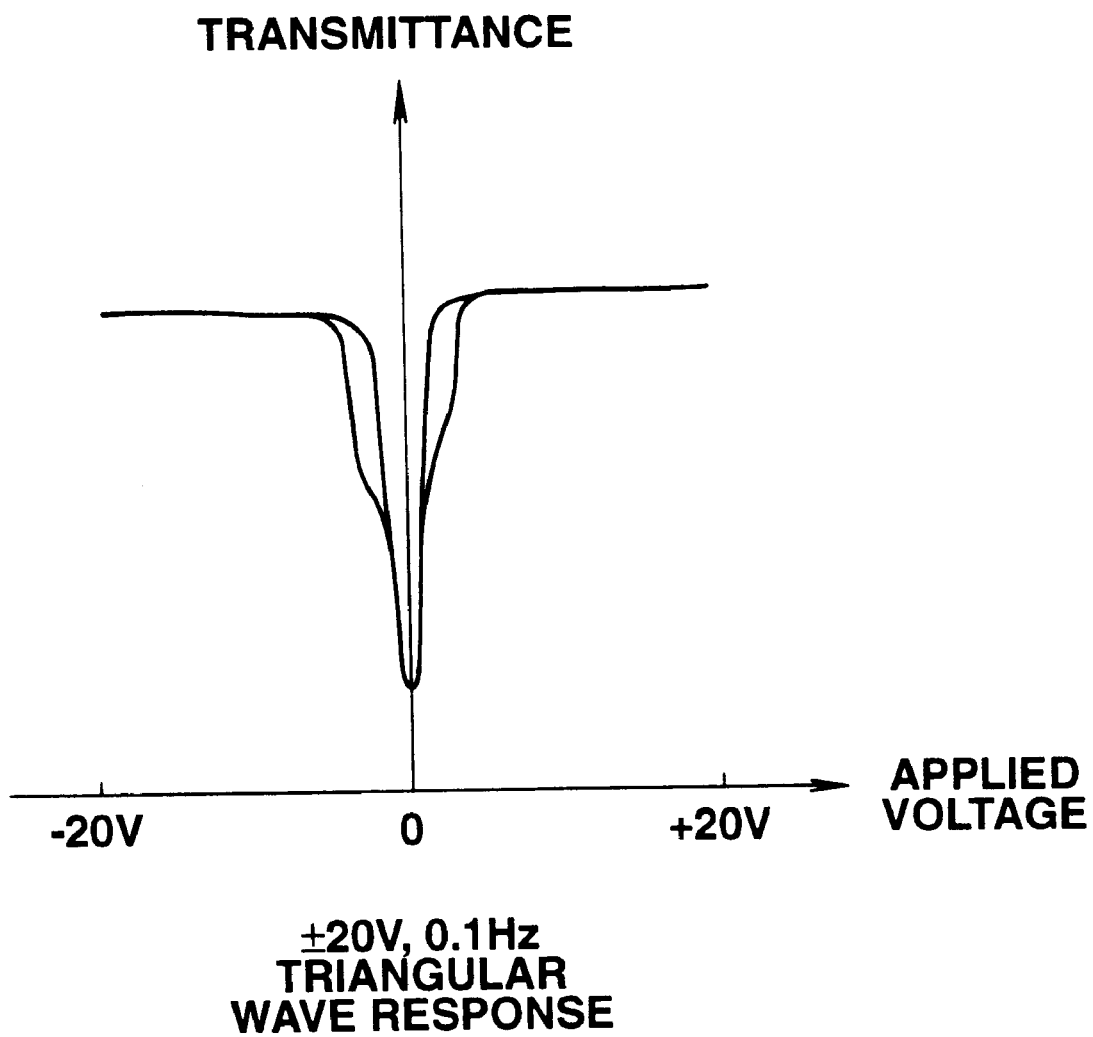
FIG. 8 is a graph showing an applied voltage v.s. transmittance characteristic when a triangular-wave voltage of a low frequency is applied to the AFLC display device of the first embodiment.

FIG. 8 shows the relationship between the transmittance and the voltage applied to the LCD device in the case where the liquid crystal material as shown in Table 1 is used to adjust a liquid crystal composition which has an I-SA transition temperature of 92° C., an SA-SC* transition temperature of 68° C., and spontaneous polarization of 130 nc/cm² and a cone angle of 54 degrees and this liquid crystal composition is used as the AFLC 21.

The characteristic in FIG. 8 is acquired by applying a triangular-wave voltage of ±20 V and 0.1 Hz between the opposing electrodes 17 and 13. It is apparent from the diagram that intermediate gradation can be displayed stably.

It can be seen from the enlarged views of the display surface shown in, for example, FIGS. 9A to 9I that the LC molecules in this LCD device behave as discussed above in accordance with the applied voltage. FIGS. 9I–9A illustrate changes in the display surface, in this order, from the state where no voltage is applied to the state where a sufficiently high voltage is applied.

With no voltage applied, as shown in FIG. 9I, most of the surface is "black." That is, the LCD device in the first alignment state and the LC molecules in the second alignment state exist almost evenly, and the director of the AFLC 21 (average aligning direction of the LC molecules) is approximately aligned to the intermediate direction 21C between the first aligning direction 21A and the second aligning direction 21B.

As the applied voltage increase, the area of "white" regions increases while the area of "black" regions decreases, as shown in FIGS. 9I–9B. The transmittances of the individual "white" and "black" regions have not changed. This means that the LC molecules of the "black" regions in the first or second alignment state have changed to the second or first alignment state, minute region by minute region. That is, the liquid crystal in some minute regions has changed its phase to the ferroelectric phase.

As the applied voltage is increased further, the surface mostly becomes "white" as shown in FIG. 9A, i.e., the AFLC 21 becomes the ferroelectric phase where most of the LC molecules are aligned to one of the first and second aligning directions and most of the LC molecules are aligned to one direction.

As is discussed above, the LC molecules of the AFLC 21 according to this embodiment are sequentially inverted by 180 degrees along the cone to become the second or the first alignment state from the first or the second alignment state in accordance with the applied voltage. The average aligning direction of the AFLC 21 continuously varies in accordance with the applied voltage. So does the transmittance. It is therefore possible to display any gradation.

A description will now be given of the practical driving method for allowing the AFLC display device with the above-described structure to present gradation display.

FIG. 10A shows the waveform of a gate signal to be applied by the row driver 31 to the gate line 15 connected to the first row of TFTs 14, FIG. 10B shows the waveform of a data signal to be applied by the column driver 32 to the data lines 16, and FIG. 10C shows a voltage to be retained in each pixel. For easier understanding of this invention, FIG. 10B shows only the data signal for the first row of pixels, and shows no data signals for the other rows.

In FIGS. 10A to 10C, TF indicates one frame period, TS indicates the selection period of the first row of pixels, and TO indicates a non-selection period. Each selection period TS is approximately 60 $\mu$s, for example.

As shown in FIG. 10B, drive pulses (write pulses) which have voltage values VD and −VD having the opposite polarities but the same absolute value are applied to the data line 16 in the selection periods TS for consecutive two frames in accordance with the display gradation. That is, two drive pulses, one having the positive voltage value +VD and the other the negative voltage value −VD, are respectively applied in the selection periods TS for two consecutive frames.

The polarities and the voltage values of the drive pulses are the same as those of the data signal with respect to the reference voltage VO, which is the same voltage as applied to the common electrode 17.

The write voltage VD is set slightly lower than the saturated voltage Ec at which the transmittance is saturated, and is controlled within the range of VO to $V_{max}$.

When the AFLC display device is driven by using the gate signal and data signal having the waveforms as shown in FIGS. 10A and 10B, the write voltage VD is applied to the pixel electrodes 13 via the TFTs 14 which are turned on by the gate signal in each selection period TS.

When the gate signal is disabled and the period becomes the non-selection period TO, the associated TFT 14 is turned off and the write voltage VD is retained in the capacitor (pixel capacitor) formed by the associated pixel electrode 13, the common electrode 17, and the AFLC 21 between both electrodes, as shown in FIG. 10C. The transmittance of that pixel is therefore kept at the value corresponding to the voltage retained in the pixel capacitor in the non-selection period TO as shown in FIG. 10C.

The applied voltage v.s. optical characteristic of the LCD device according to this embodiment is such that there is no specific threshold value and the transmittance with respect to the absolute value of the write voltage VD is determined almost specifically. Therefore, clear gradation display can be accomplished by controlling the transmittance by changing the absolute value of the write voltage VD.

Figure 11:
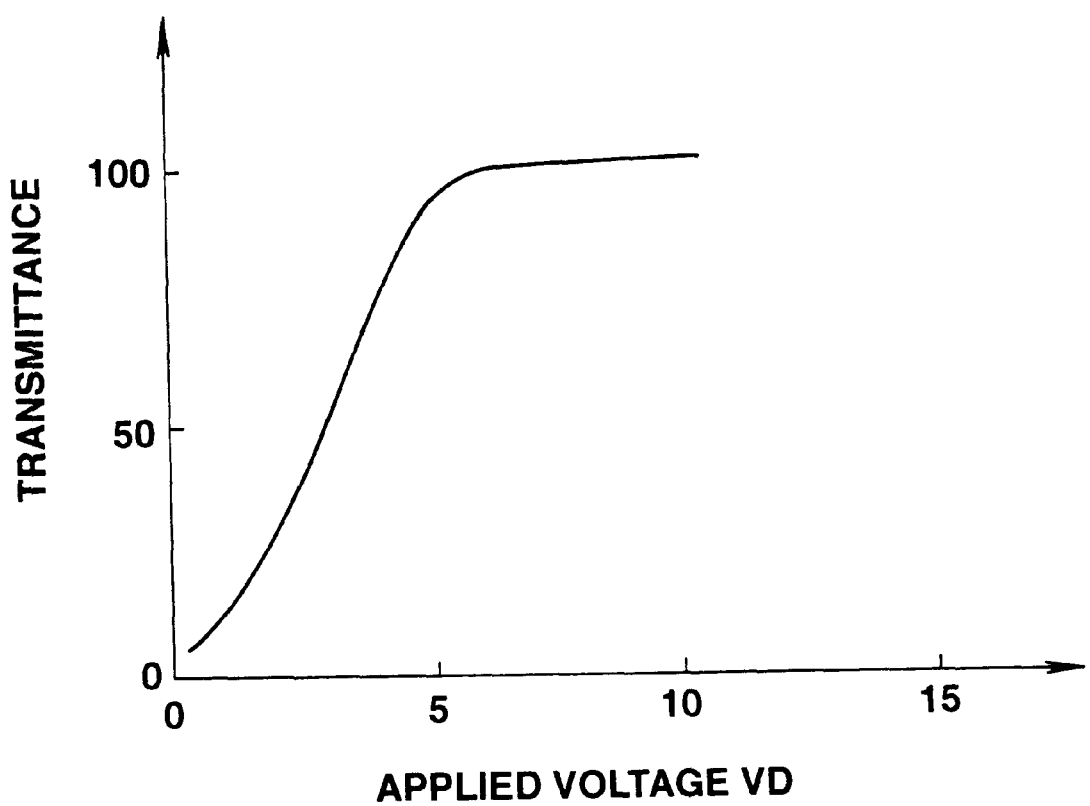
FIG. 11 is a diagram showing an applied voltage v.s. transmittance characteristic when the LCD device of the first embodiment is driven by the method illustrated in FIGS. 10A–10C.

FIG. 11 shows the relationship between the applied voltage VD and the transmittance when the LCD device having the optical characteristic shown in FIG. 8 is driven with TS=60 $\mu$m using the drive pulse waveforms shown in FIGS. 10A and 10B. It is apparent from this graph that this driving method continuously changes the transmittance by altering the write voltage VD and allows the display gradation to be specifically determined in accordance with the write voltage VD, thus ensuring gradation display.

According to this driving method, the voltages +VD and −VD for a single piece of pixel data are applied to the AFLC 21 in the consecutive two frames. Even if the optical characteristic with respect to a positive applied voltage slightly differs from the optical characteristic with respect to a negative applied voltage, therefore, the average of those optical characteristics is observed. Even if the optical characteristics for positive and negative voltages differ from each other, clear gradation display can be presented.

As the write voltages +VD and −VD for a single piece of pixel data are applied to the AFLC 21 in the consecutive two frames, the DC voltage component is prevented from being concentrically applied to the AFLC 21. Thus, display burning (display image still remaining even when a voltage is no longer applied to the AFLC 21) or the degradation of the AFLC 21 do not occur.

Second Embodiment

An AFLC display device according to the second embodiment of this invention will be described below.

The basic structure of the AFLC display device of this embodiment is substantially the same as that of the AFLC display device of the first embodiment illustrated in FIGS. 1 through 3.

The AFLC 21 of this embodiment is comprised of a liquid crystal which has a large cone angle of 30 degrees to 45 degrees (desirably 35 degrees or greater) and has an SmCA* phase that changes in the sequence of isotropic, SmA and SmCA*. The AFLC 21, in a bulk state, has a layer structure of aligned molecules and a double helical structure as shown in FIG. 4. The AFLC 21 is sealed between the substrates 11 and 12 in such a state where the double helical structure traced by its molecules is vanished (the state shown in FIG. 5). Those points are basically the same as those of the AFLC of the first embodiment.

It is to be noted that the AFLC 21 of this embodiment is characterized in that the interaction between the LC molecules of the adjoining smectic layers is weak. Because of this weak interaction, when an electric field E is applied to the AFLC 21, the molecules of the AFLC 21 start behaving along imaginary cones, which are traced by the LC molecules in the smectic phase, by the interaction between the permanent dipoles and the electric field, and shows an electrically unstable ferroelectric phase, as shown in FIG. 4. That is, this AFLC 21 shows the phase transition precursor of antiferroelectric and ferroelectric phase where the aligning direction of the LC molecules continuously varies in accordance with the external electric field.

Figure 12:
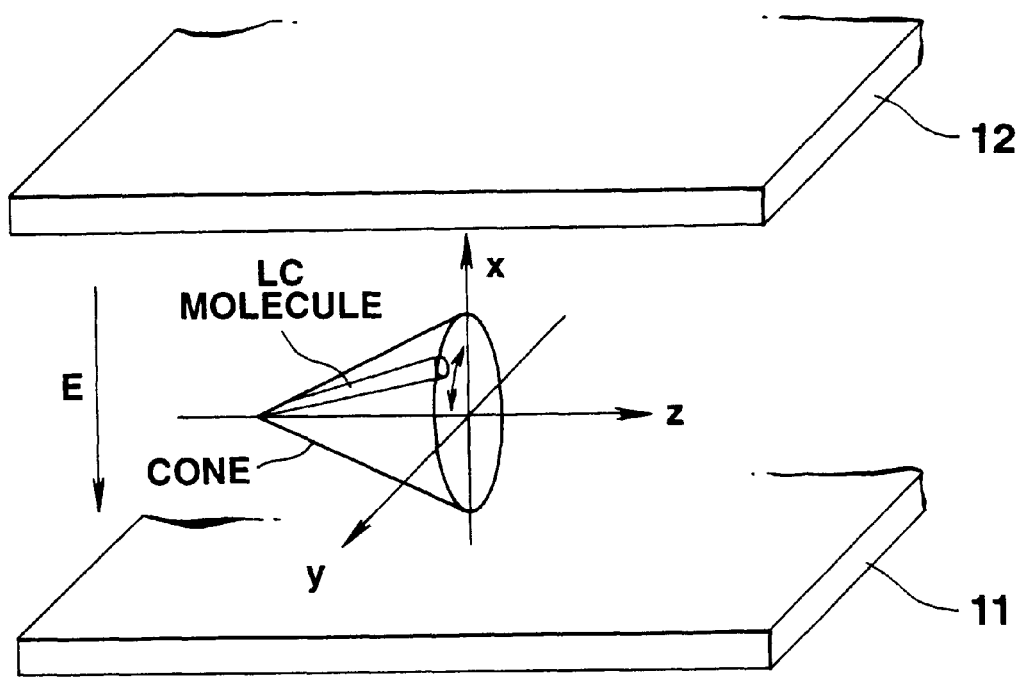
FIG. 12 is a diagram used for explaining the movement of the LC molecules.

In other words, the phase transition precursor of antiferroelectric and ferroelectric phase is the phenomenon such that when an electric field is applied to the AFLC in the antiferroelectric phase, the LC molecules continuously move on helical cones by the interaction of the permanent dipoles and the electric field. This phenomenon, as seen from the behavior of the LC molecules, is a change in the tilt angle of the LC molecules with respect to the substrate in accordance with the applied voltage, and can thus be considered as the precursor tilting as shown in FIG. 12.

Such an AFLC can be acquired by mixing an AFLC composition of a tetralin system, which has a tetralin bond in the essential structure of the LC molecule and an oxygen atom and fluorine atom on both sides thereof, with a liquid crystal composition which has an oxygen atom and fluorine atom at the substituents at the ends on both sides of the molecule, or a similar liquid crystal composition.

For example, the AFLC 21 can be obtained by mixing the liquid crystal compositions (I) and (II) shown in Table 2 at the mixing ratio of 60 weight % and 40 weight %, respectively.

TABLE 2

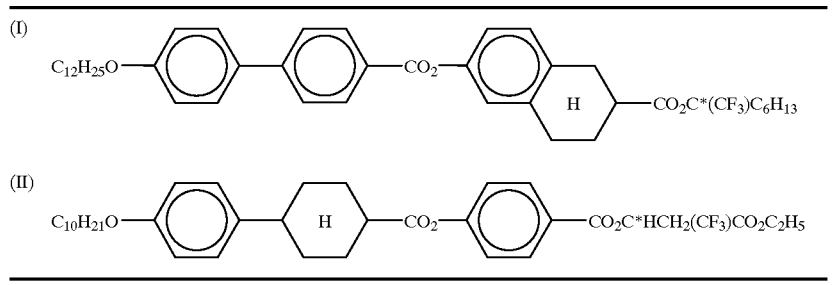

Those liquid crystal compositions contain an oxygen atom and a fluorine atom, which have a negative polarity, at the end substituents group of each molecule, sandwiching asymmetric carbon. Therefore, the interaction between molecules between the adjoining smectic layers. When an external electric field is applied, the LC molecules start behaving along the cones due to the phase transition precursor, and continuously varies in accordance with the external voltage. When the external voltage becomes sufficiently large, the LC molecules are rearranged to the complete ferroelectric phase. This AFLC has a small hysteresis expressed by the difference between the voltage for causing the transition phase the antiferroelectric phase to the ferroelectric phase and the voltage for causing the transition from the ferroelectric phase to the antiferroelectric phase, and can have a continuous intermediate gradation.

Figure 13:
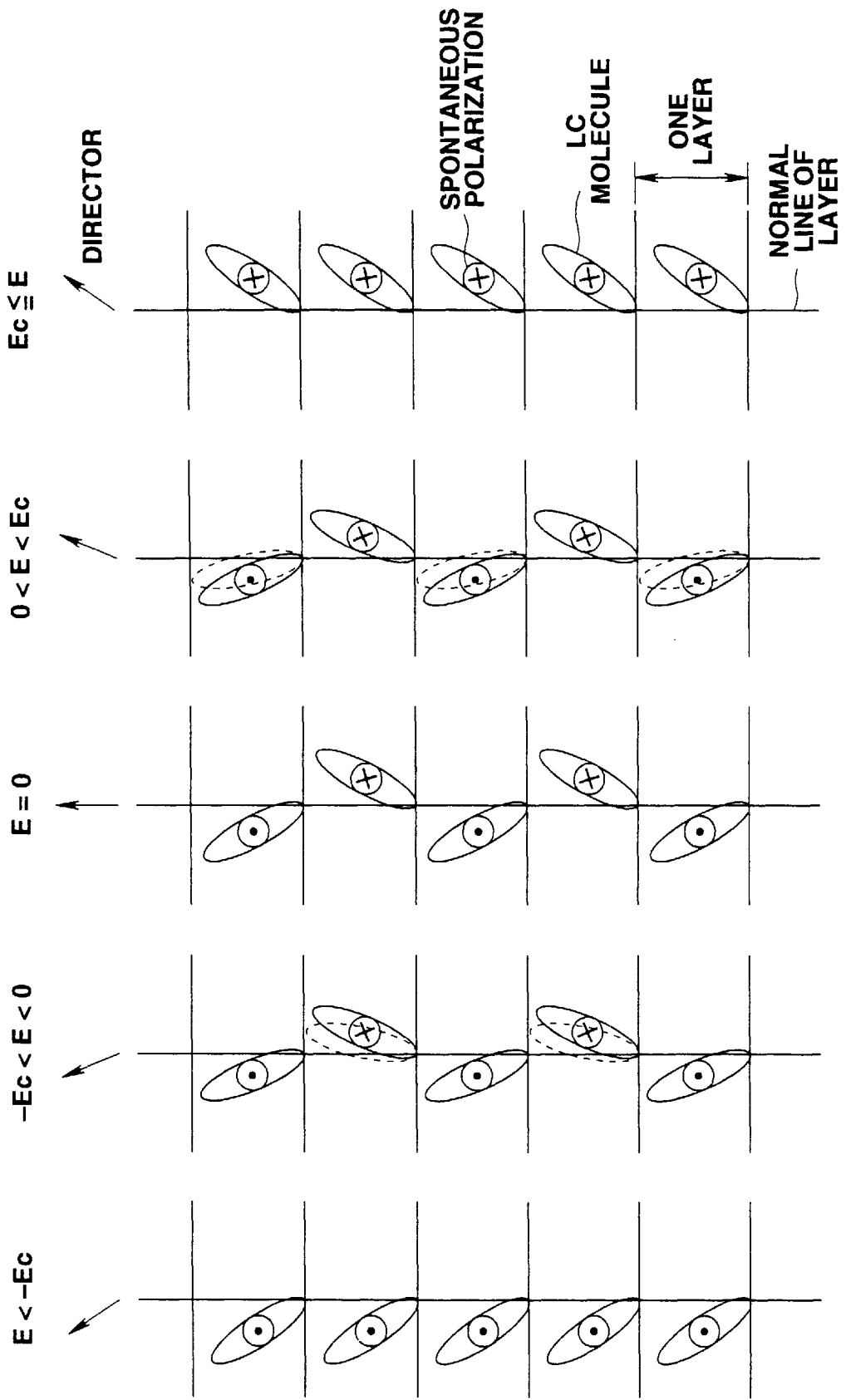

The behavior of the LC molecules with respect to the applied voltage will be described using a molecular arrangement model. When no voltage is applied, the LC molecules are alternately aligned to the first and second aligning directions 21A and 21B, as shown in FIG. 13A. Under this situation, spontaneous polarization occurs in each layer but the permanent dipoles of adjoining layers face in the opposite directions so that the dipole moments are canceled out. From the systematic point of view, therefore, no spontaneous polarization exists so that the antiferroelectric phase is set. The spatially-averaged optical axis of the AFLC 21 is directed in the normal line direction of the smectic layer, which is the average aligning direction of the LC molecules.

When a voltage equal to or greater than the saturated voltage Ec is applied to the AFLC 21, the LC molecules in the first or second alignment state move (behave or tilt) along the cones to be aligned to the second aligning direction 21B or the first aligning direction 21A to be set to the second or first alignment state. Under this situation, the permanent dipoles of the adjoining layers are directed in the same direction, causing spontaneous polarization, and the AFLC 21 becomes the first or second ferroelectric phase.

When a positive electric field E less than the saturated voltage Ec is applied in the direction perpendicular to the major surfaces of the substrates 11 and 12, the force created by the interaction with the electric field acts on the LC molecules whose molecular long axes are directed in the second aligning direction 21B, causing the LC molecules to move along the cones by a predetermined amount (predetermined angle). The amount of movement (angle of movement) corresponds to the value of the applied voltage. The LC molecules whose molecular long axes are directed in the first aligning direction 21A do not behave due to large force produced by the interaction with the spontaneous polarization. When the positive voltage E less than the saturated voltage Ec is applied to the AFLC 21 in the alignment state as indicated by the solid line in FIG. 13A, some of the molecules tilt as indicated by the broken line in FIG. 13B. The inclination angle of each molecule corresponds to the intensity of the applied electric field.

When a negative voltage E whose absolute value is less than the saturated voltage Ec is applied to the AFLC 21, the force created by the interaction with the electric field acts on the LC molecules whose molecular long axes are directed in the first aligning direction 21A, causing the LC molecules to move along the cones by a predetermined amount (predetermined angle). The amount of movement (angle of movement) corresponds to the value of the applied voltage. The LC molecules which have already been set to the second aligning direction 21B do not behave. When the voltage −E is applied to the AFLC 21 in the alignment state as indicated by the solid line in FIG. 13A, some of the molecules tilt as indicated by the broken line in FIG. 13D. The inclination angle of each molecule corresponds to the intensity of the applied electric field.

As apparent from the above, the molecules of the AFLC 21 of this embodiment behave along the cones in accordance with the applied voltage. By controlling the applied voltage, therefore, the average aligning direction of the LC molecules or the director can be changed continuously. Thus the optical axis of the AFLC 21 also continuously varies between the first aligning direction 21A and the third aligning direction 21C and between the second aligning direction 21A and the third aligning direction 21C.

Figure 14:
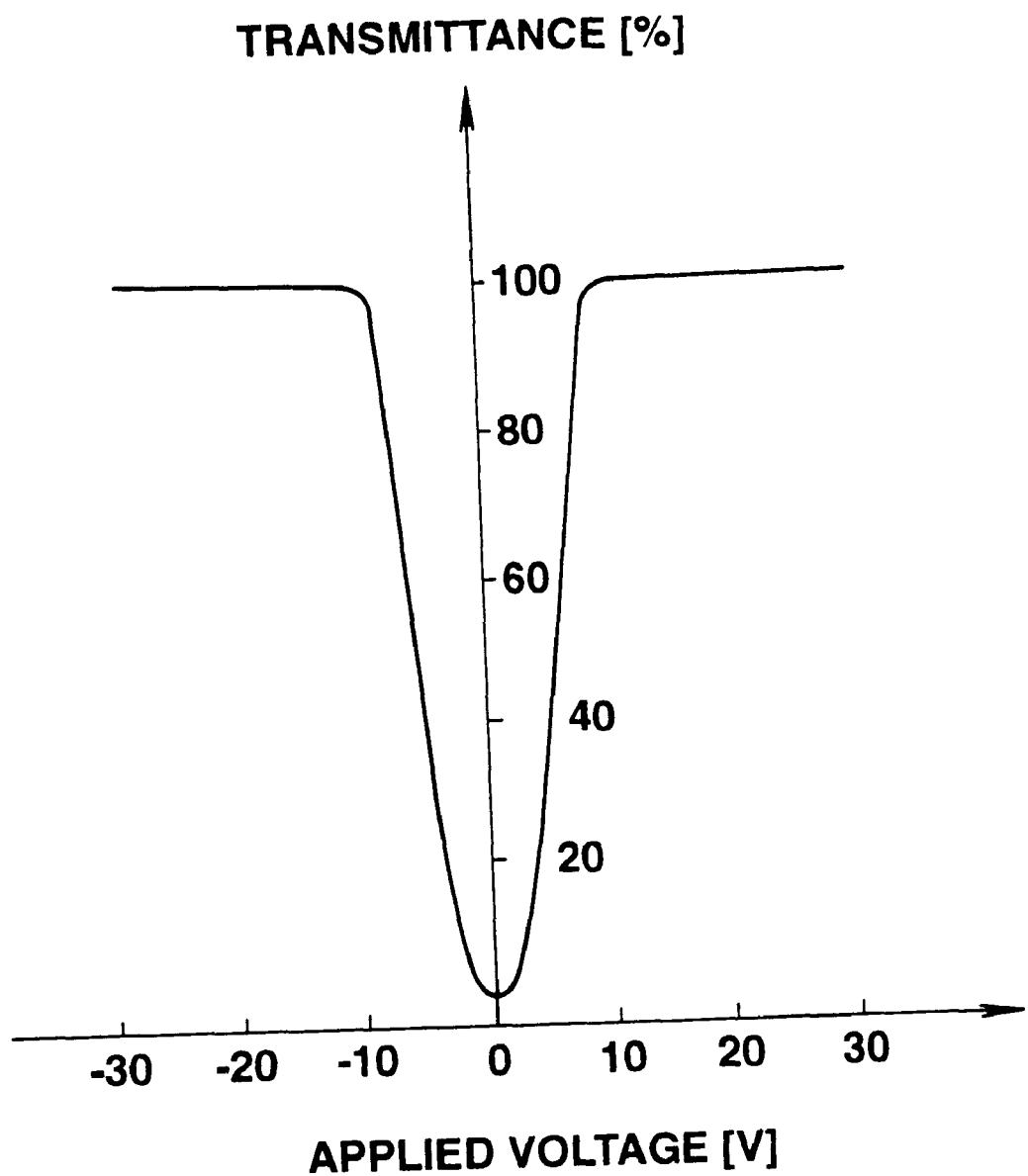
FIG. 14 is a graph showing an applied voltage v.s. transmittance characteristic when a triangular-wave voltage of a low frequency is applied to the AFLC display device of the second embodiment.
Figure 15:
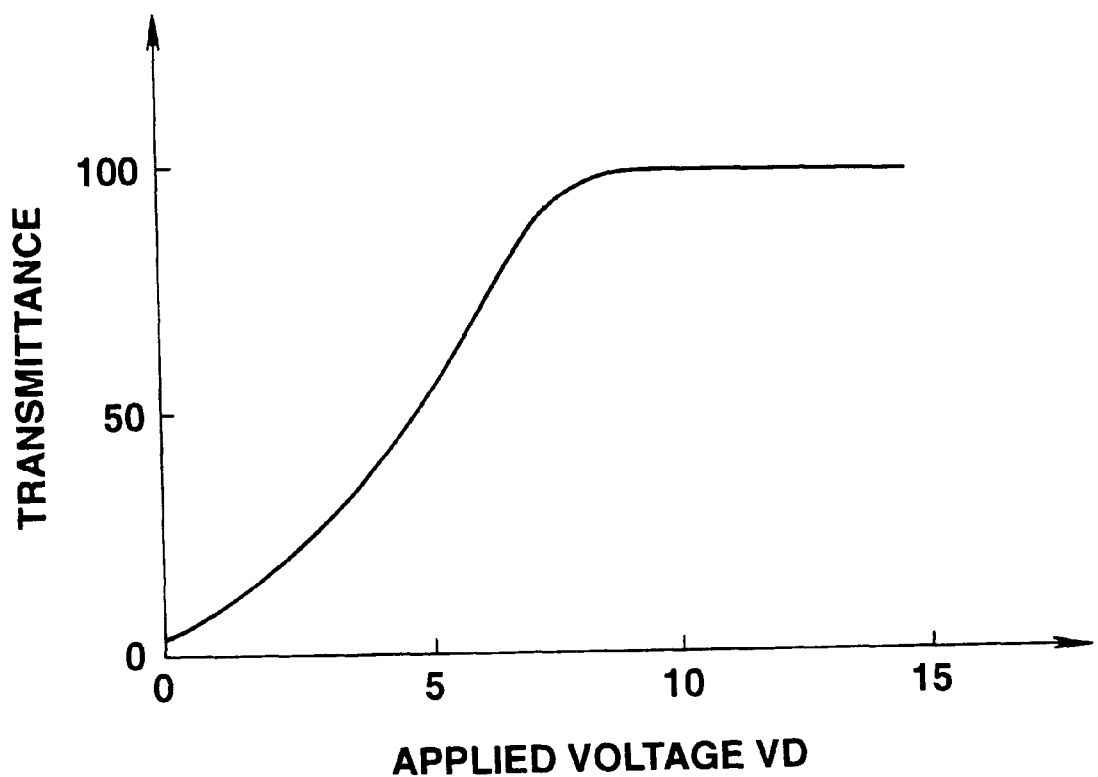
FIG. 15 is a diagram showing an applied voltage v.s. transmittance characteristic when the LCD device of the second embodiment is driven by the method illustrated in FIGS. 10A–10C.

As shown in FIG. 14, therefore, the optical characteristic of the AFLC display device of this embodiment, which can be acquired by applying a triangular-wave voltage with a sufficiently low frequency of about 0.1 Hz between the electrodes 13 and 17, has no flat portion in the vicinity of the applied voltage of 0 V, continuously changes as the absolute value of the applied voltage increases, and has no threshold value. Further, the curves of the transmittances become symmetrical with respect to the polarity of the applied voltage. When a voltage whose absolute value is equal to or greater than the saturated voltage Ec is applied, the transmittance is substantially saturated. Furthermore, the hysteresis is very small. The AFLC display device of this embodiment can be driven practically by the above-described driving method using the drive pulse waveforms shown in FIGS. 10A and 10B. FIG. 15 shows the relationship between the transmittance and the applied voltage in the case where the LCD device using, as the AFLC 21, an AFLC which has the above-discussed characteristics and has an I-SA transition temperature of 71° C., an SA-SC* transition temperature of 57° C., and spontaneous polarization of 176 nc/cm² and a cone angle of 63 degrees, is driven by the driving method illustrated in FIGS. 10A and 10B with the selection period TS set to 60 μs.

It is apparent from this graph that this LCD device and this driving method can continuously change the transmittance by altering the write voltage VD and further allows the display gradation to be specifically determined in accordance with the write voltage VD. The gradation display can thus be ensured by controlling the write voltage VD.

Third Embodiment

An AFLC display device according to the third embodiment of this invention will be described below.

The basic structure of the AFLC display device of this embodiment is substantially the same as that of the AFLC display device of the first embodiment illustrated in FIGS. 1 through 3.

The AFLC 21 of this embodiment is comprised of a liquid crystal which has a large cone angle of 30 degrees to 45 degrees (desirably 35 degrees or greater) and has an SmCA* phase in the sequence of isotropic, SmA and SmCA*. The AFLC 21, in a bulk state, has a layer structure of aligned molecules and a double helical structure as shown in FIG. 4. The AFLC 21 is sealed between the substrates 11 and 12 in such a state where the double helical structure traced by its molecules is vanished (the state shown in FIG. 5). Those points are basically the same as those of the AFLC of the first embodiment.

The AFLC 21 is characterized by its molecules whose rotational force about the molecular long axis is strong and whose rotation about the molecular long axis is suppressed by an electric field when applied, so that the LC molecules move off the cones to tilt (on the y-z plane in FIG. 12) in the direction perpendicular to the electric field.

Figure 16:
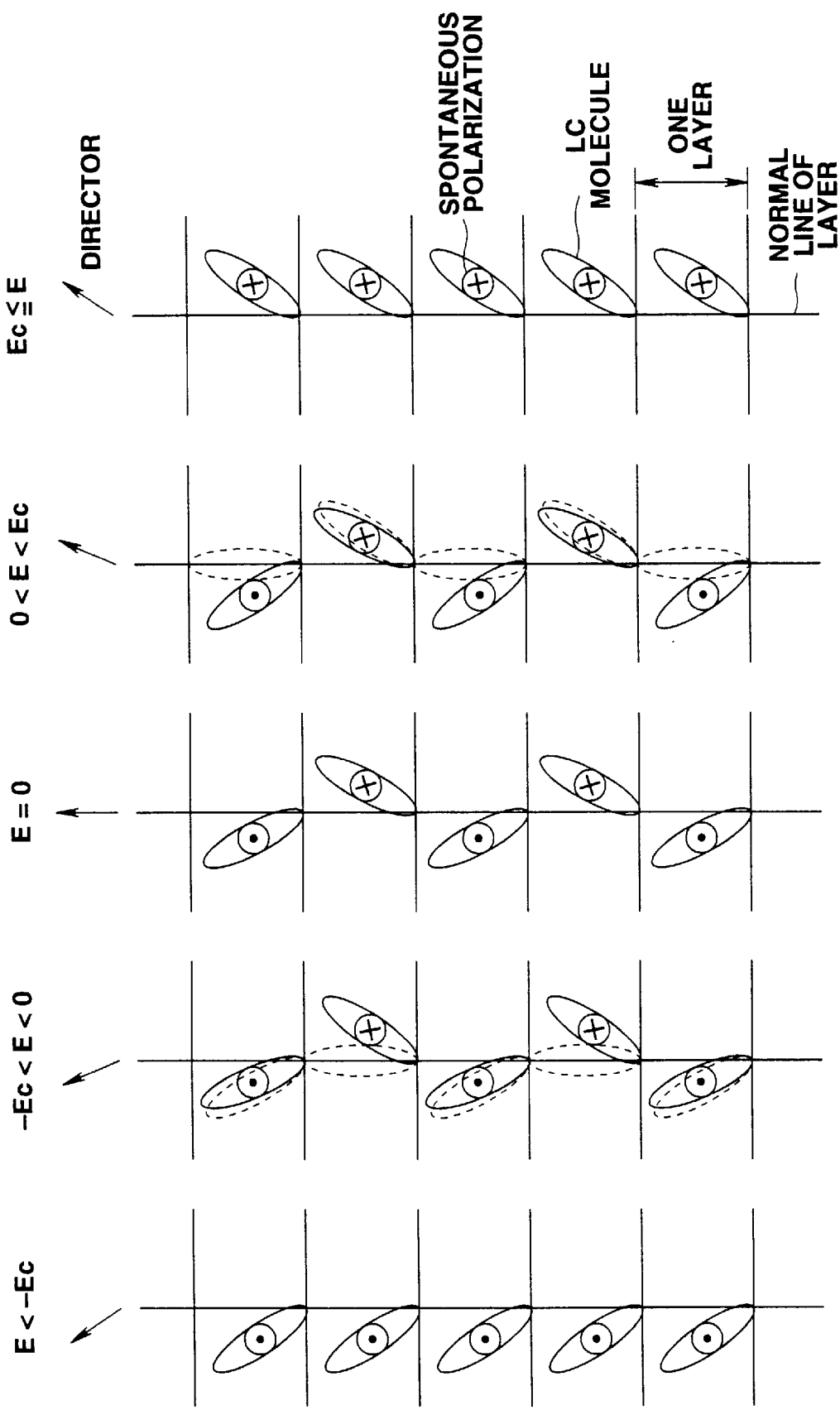

The behavior of the LC molecules with respect to the applied voltage will be described using models shown in FIGS. 16A to 16E. With no voltage applied, the antiferroelectric interaction (which tends to maintain the molecular arrangement of the antiferroelectric phase) causes the LC molecules to be alternately aligned to the first and second aligning directions 21A and 21B, as shown in FIG. 16A. Under this situation, spontaneous polarization occurs in each layer but the permanent dipoles of adjoining layers face in the opposite directions so that the dipole moment moments are canceled out. From the systematic point of view, therefore, no spontaneous polarization exists so that the antiferroelectric phase is set. The spatially-averaged optical axis of the AFLC 21 becomes substantially in parallel to the normal line direction 21C of the smectic layer, which is the average aligning direction of the LC molecules.

In this state, the LC molecules are rotating about their long axes while being restricted by the antiferroelectric interaction of the LC molecules.

When a positive voltage less than the saturated voltage Ec is applied to the direction perpendicular to the major surfaces of the substrates 11 and 12, the rotation about the long axes of the LC molecules is suppressed in accordance with the level of the applied voltage, causing polarization. The interaction between the polarization and the electric field causes the LC molecules to move off the cones to tilt in the direction perpendicular to the electric field as indicated by the broken line in FIG. 16B.

At this time, the inclination angle of the LC molecules aligned to the second aligning direction 21B is large while the inclination angle of the LC molecules aligned to the first aligning direction 21A is small. The average of the inclination angles however approximately corresponds to the applied voltage.

When a negative voltage E is applied to the AFLC 21, the molecules tilt in the opposite direction as indicated by the broken line in FIG. 16C. At this time, the inclination angle of the LC molecules aligned to the first aligning direction 21A is large while the inclination angle of the LC molecules aligned to the second aligning direction 21B is small. The average of the inclination angles however approximately corresponds to the applied voltage.

As a voltage equal to or greater than the saturated voltage Ec is applied to the AFLC 21, as shown in FIGS. 16C and 16E, the LC molecules are aligned to a direction inclined by a predetermined angle corresponding to the applied voltage from the first or second aligning direction 21A or 21B. Under this situation, the permanent dipoles of the adjoining smectic layers are directed in the same direction, causing spontaneous polarization, so that first or second ferroelectric phase is set. In this state, the rotation of the LC molecules is significantly suppressed by the applied electric field, so that large spontaneous polarization appear.

As apparent from the above, the rotation of the molecules the AFLC 21 of this embodiment is suppressed in accordance with the applied voltage E, so that the LC molecules tilt in the direction perpendicular to the electric field. By controlling the applied voltage, therefore, the director can be changed continuously in an intermediate state between the antiferroelectric phase and the ferroelectric phase. Thus, the average optical axis of the AFLC 21 also continuously varies substantially between the first aligning direction 21A and the second aligning direction 21B. The transmittances with respect to the applied voltages, which have different polarities but have the same absolute value, vary substantially in the same way.

Therefore, the optical characteristic of the AFLC display device of this embodiment, which can be acquired by applying a triangular-wave voltage with a sufficiently low frequency between the electrodes 13 and 17, has no flat portion in the vicinity of the applied voltage of 0 V, continuously and smoothly changes as the absolute value of the applied voltage increases, and has no threshold value. Further, the curves of the transmittances become symmetrical with respect to the polarity of the applied voltage. When a voltage equal to or greater than the saturated voltage Ec is applied, the transmittance is substantially saturated. Because of the suppression of the rotation of the LC molecules by the electric field, however, as the applied voltage increases, the alignment state slightly changes and the transmittance slightly increases. Furthermore, the hysteresis is very small.

According to the LCD device which has such optical characteristics, the display gradation is almost specifically determined with respect to the applied voltage E, and what is more, arbitrary gradation can be acquired. As discussed above, therefore, arbitrary gradation can be displayed by using an active matrix type LCD device and keeping the applied voltage substantially to a specific value corresponding to the display gradation in the non-selection period of each pixel.

The above-described driving method illustrated in FIGS. 10A and 10B can be used as a practically driving method for allowing the LCD device with the above-described structure to perform gradation display.

Figure 17:
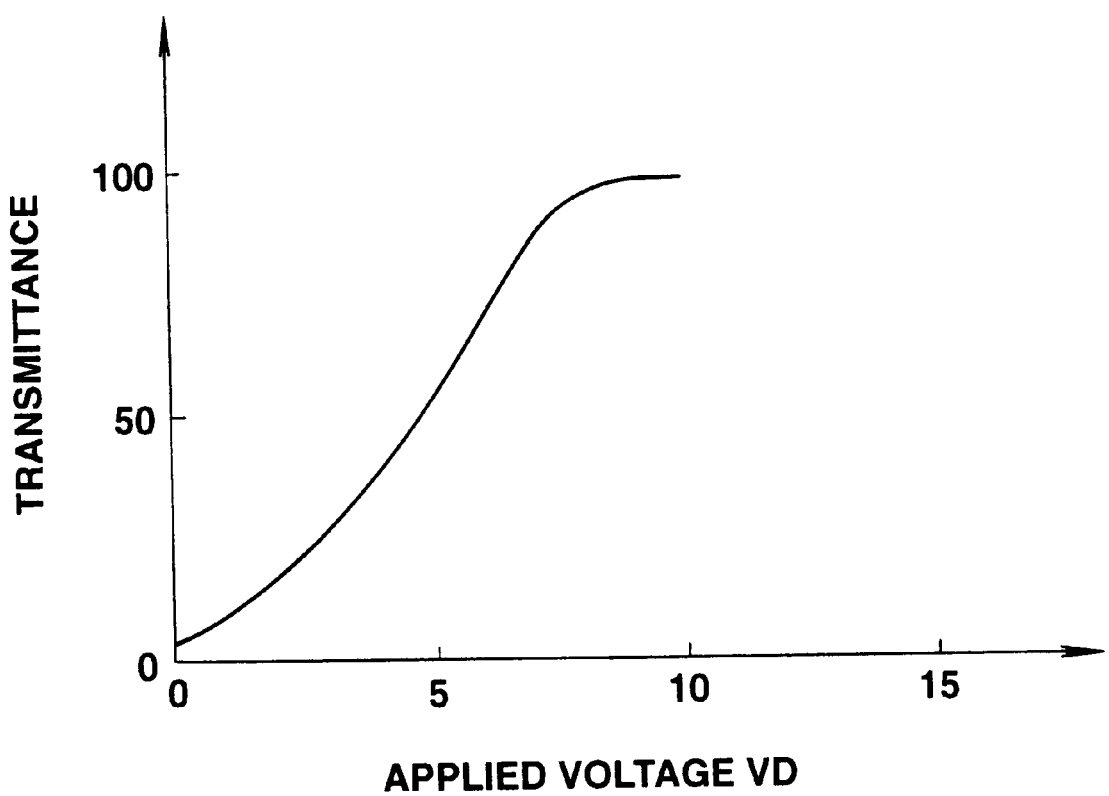
FIG. 17 is a diagram showing an applied voltage v.s. transmittance characteristic when the LCD device of the third embodiment is driven by the method illustrated in FIGS. 10A–10C.

FIG. 17 shows the relationship between the transmittance and the applied voltage in the case where the LCD device using, as the AFLC 21, an AFLC which has the above-discussed characteristics and has an I-SA transition temperature of 68° C., an SA-SCA* transition temperature of 54° C., and spontaneous polarization of 132 nc/cm$^2$ and a cone angle of 60.8 degrees, is driven by the driving method illustrated in FIGS. 10A and 10B with the selection period TS set to 60 μs.

It is apparent from this graph that this LCD device and this driving method can continuously change the transmittance by altering the write voltage and further allows the display gradation to be specifically determined in accordance with the write voltage. This can ensure the gradation display.

TABLE 3

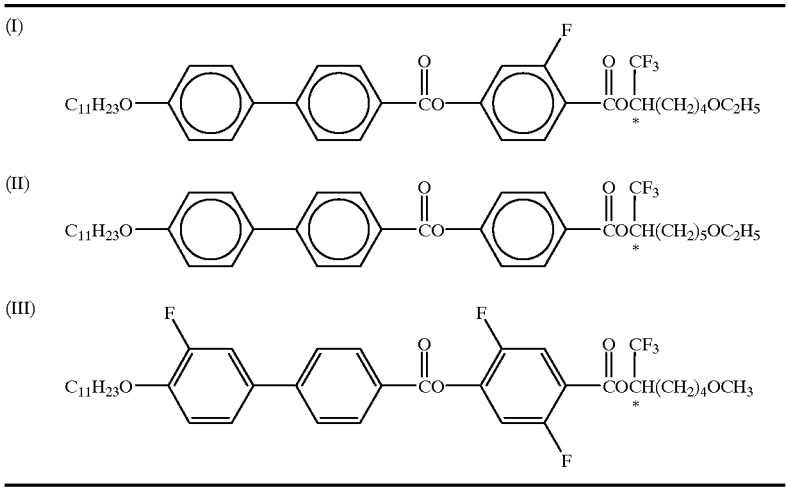

Fourth Embodiment

The foregoing description of the first to third embodiments has been given with reference to the AFLC display device which obtains an intermediate alignment state by (1) the transition of some of the LC molecules in the first or second alignment state to the second or first alignment state, (2) the behavior of the LC molecules along the cones by the phase transition precursor, or (3) the movement of the LC molecules off the cones to tilt in the direction perpendicular to the electric field in accordance with the applied voltage.

There is an AFLC display device which provides an intermediate alignment state by the occurrence of those phenomena in combination, not singly.

The following description will discuss an AFLC which presents an intermediate alignment state by the combination of (1) the transition of some of the LC molecules in the first or second alignment state to the second or first alignment state and (2) the behavior of the LC molecules along the cones by the phase transition precursor, and also an LCD device which uses this AFLC.

The structure of the LCD device according to this embodiment is the same as that illustrated in FIGS. 1 through 3.

The AFLC 21 according to this embodiment is comprised of a liquid crystal composition which has a relatively weak antiferroelectric interaction to keep the antiferroelectric phase and has a relatively strong ferroelectric interaction to be likely to be in the ferroelectric phase.

The AFLC 21 having such characteristics can be obtained by mixing liquid crystals essential structures as shown in (I) to (III) in Table 3 at the mixing ratio of 20 weight % of (I), 40 weight % of (II) and 40 weight % of the (III).

This AFLC 21 has a cone angle of approximately 30 degrees and an SmCA* phase that changes in the sequence of isotropic, SmA and SmCA*, and has a layer structure of aligned molecules and a helical structure in a bulk state.

Figures 18A, 18B, 18C, 18D, 18E, 18F, 18G:
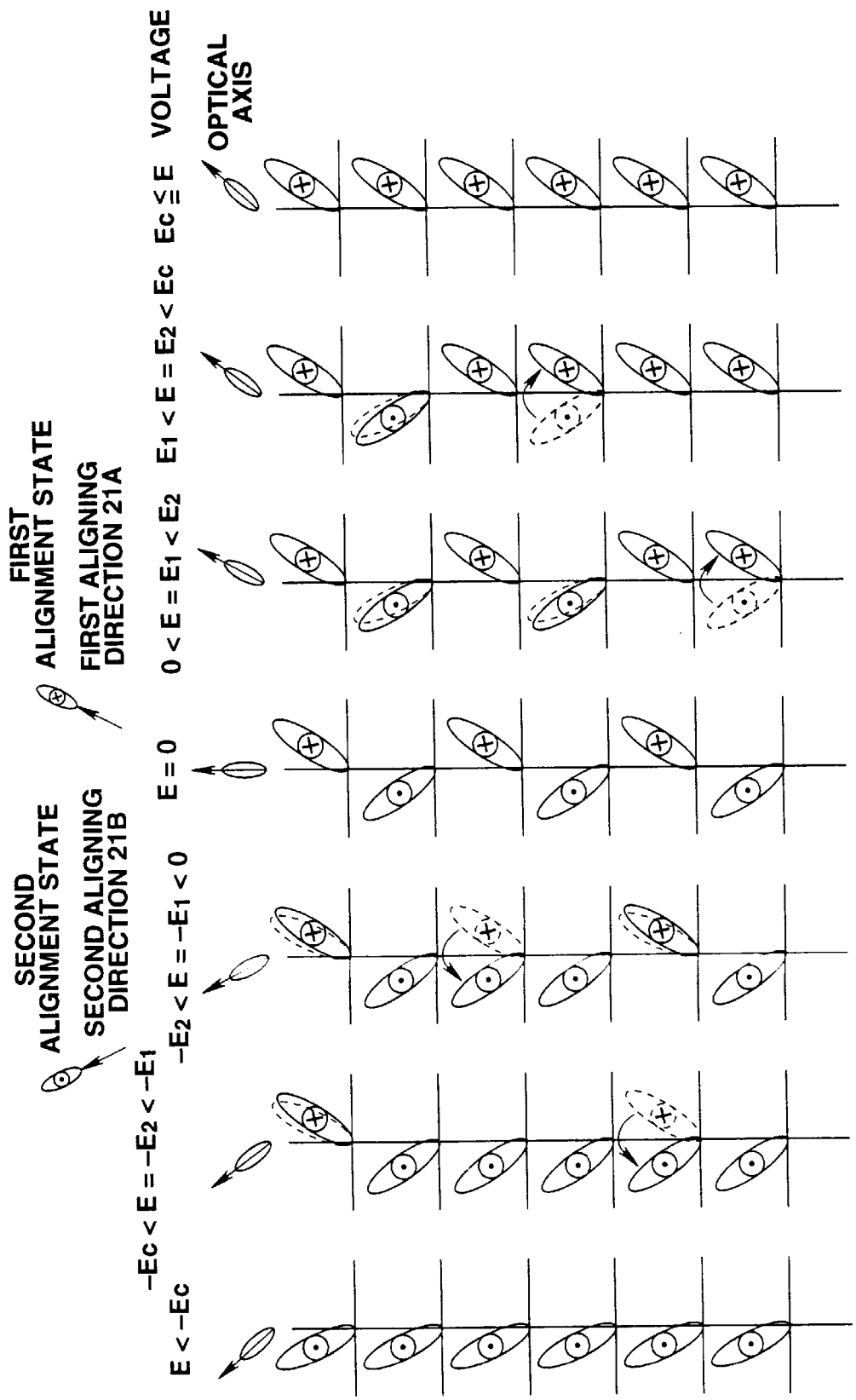

With this liquid crystal used as the AFLC 21, when no voltage is applied, the LC molecules are alternately aligned to the first and second aligning directions 21A and 21B, as shown in FIG. 18A. In this state, spontaneous polarization occurs in each layer but the permanent dipoles of adjoining layers face in the opposite directions. The dipole moments are therefore canceled out, so that no spontaneous polarization exists as a whole and the antiferroelectric phase is set. The spatially-averaged optical axis of the AFLC 21 is directed to the average aligning direction of the LC molecules, i.e., the normal line direction of the layer formed by the smectic phase which is the direction of the director substantially coincident to the director.

As mentioned earlier, the AFLC 21 of this embodiment has a strong ferroelectric interaction. That is, the LC molecules are apt to be aligned in parallel. When a positive voltage E smaller than the saturated voltage Ec is applied to the AFLC 21, therefore, some of the LC molecules in the second alignment state are changed to the first alignment state in accordance with the level of the applied voltage E, as shown in FIGS. 18B and 18C. The number (ratio) of molecules whose alignment state is changed increases as the applied voltage E becomes greater.

The interaction of the permanent dipoles of the LC molecules with the electric field causes the LC molecules in the second alignment state to tilt by a predetermined amount (predetermined angle) along the cones as indicated by the broken lines in FIGS. 18B and 18C. The inclination angle corresponds to the value of the applied voltage. The LC molecules which have already been set to the first aligning direction 21A do not move because of the large interaction with the spontaneous polarization.

As the positive applied voltage E increase, the number of the LC molecules in the first alignment state increases. So does the inclination of the LC molecules in the second alignment state. As the applied voltage increases, therefore, the director of the AFLC 21 continuously varies toward the first aligning direction 21A from the normal line direction 21C of the smectic layer.

When a negative voltage E smaller than the saturated voltage Ec is applied to the AFLC 21, some of the LC molecules in the first alignment state are changed to the second alignment state in accordance with the level of the applied voltage E, as shown in FIGS. 18E and 18F.

The LC molecules in the first alignment state tilt toward the second aligning direction 21B along the cones in accordance with the applied voltage. The LC molecules which have already been set to the first aligning direction 21A do not however move due to the large interaction with the spontaneous polarization.

As the negative applied voltage E increase, the ratio of the LC molecules in the second alignment state and the inclination of the LC molecules in the first alignment state increase. As the negative applied voltage E increases, therefore, the director of the AFLC 21 continuously varies toward the second aligning direction 21B.

When the voltage E equal to or greater than the saturated voltage Ec is applied to the AFLC 21, the LC molecules are set to either the first alignment state or the second alignment state in accordance with the polarity of the applied voltage E, as shown in FIGS. 18D and 18G. Under this situation, the permanent dipoles of the adjoining smectic layers are directed in the same direction, causing spontaneous polarization, so that first or second ferroelectric phase is set.

As shown in FIG. 7, the above-described phenomenon causes the AFLC 21 of this embodiment to form therein multiple minute regions where the LC molecules are aligned to the first alignment state and multiple minute regions where the LC molecules are aligned to the second alignment state, within a distance shorter than the wavelength of light in the visible light band. The area of those minute regions or the ratio of the number thereof varies in accordance with the applied voltage. The director of the AFLC 21 in each minute region tilts in accordance with the applied voltage.

Because the size of each minute region is smaller than the wavelength of light in the visible light band, the optical characteristics of those minute regions are averaged so that the average direction of the directors of the AFLC 21 becomes the substantial optical axis of the AFLC 21. This optical axis continuously changes between the first aligning direction and the second aligning direction in accordance with a change in the alignment of the LC molecules caused by a change in the applied voltage.

It is therefore possible to present gradation display using the AFLC display device of this embodiment.

Figure 19:
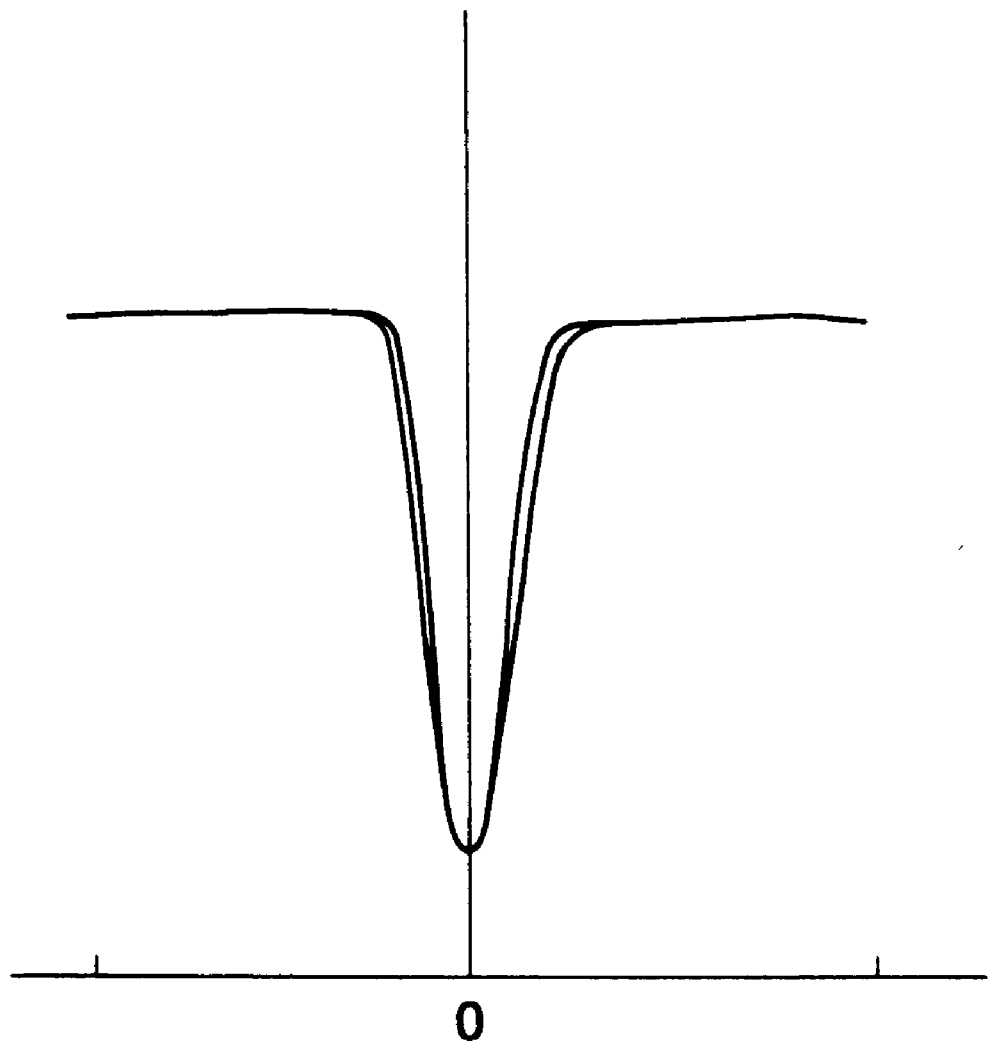
FIG. 19 is a graph showing an applied voltage v.s. transmittance characteristic when a triangular-wave voltage of a low frequency is applied to the AFLC display device of the fourth embodiment.

FIG. 19 shows a change in the transmittance when the AFLC display device, which uses, as the AFLC 21, the liquid crystal composition adjusted by using the liquid crystal compound as shown in Table 3, is driven by a triangular-wave voltage of 0.1 Hz. It can be seen from the views of the display surface of this AFLC display device shown in FIGS. 20A to 20I that the above-described molecular behavior occurs in the AFLC 21 of this embodiment.

FIGS. 20A–20I illustrate changes in the display surface from the state where no voltage is applied to the state where a sufficiently high voltage is applied.

With no voltage applied, as shown in FIG. 20I, most of the surface is "black" or is in the light-shielding state, and only a few "white" or light-transmitting regions merely exist in a studded form.

As the applied voltage increases gradually, as shown in FIGS. 20I to 20G, the whole area becomes brighter although the areas of the "black" regions and the "white" regions hardly change. This indicates that the LC molecules in the "black" regions move along the cones to change their alignment state by the interaction with the applied voltage.

As the applied voltage increase further, the area of "white" regions increases while the area of "black" regions decreases, as shown in FIGS. 20C to 20G. This indicates that the LC molecules of the "black" regions (assumed to be in the second alignment state) have changed to the first alignment state, minute region by minute region. That is, the liquid crystal in some minute regions has changed its phase to the ferroelectric phase. Further, the transmittance in the "black" regions becomes higher, which indicates that the LC molecules in the "black" regions are moving along the cones by the interaction with the applied voltage.

As the applied voltage is increased further, the area of "white" regions increases while the area of "black" regions decreases, as shown in FIGS. 20C to 20A. At this stage, the transmittance in the "black" regions has hardly changed. This indicates that the alignment states of the LC molecules are collectively changed in the units of minute regions.

According to the LCD device of this embodiment, as described above, an intermediate alignment state is obtained to display an arbitrary gradation by controlling the applied voltage to accomplish the combined control of (1) the transition of some of the LC molecules in the first or second alignment state to the second or first alignment state and (2) the behavior of the LC molecules along the cones by the phase transition precursor.

The driving method illustrated in FIGS. 10A and 10B can be used to drive this LCD device too.

Fifth Embodiment

A description will be given of an AFLC according to the fifth embodiment, which provides an intermediate alignment state by (1) the transition of some of the LC molecules in the first or second alignment state to the second or first alignment state and (3) the movement of the LC molecules off the cones to tilt in the direction perpendicular to the electric field in accordance with the applied voltage, and an AFLC display device which uses this AFLC.

The structure of the LCD device according to this embodiment is the same as that illustrated in FIGS. 1 through 3.

The AFLC 21 according to this embodiment will now be described.

Figure 5:
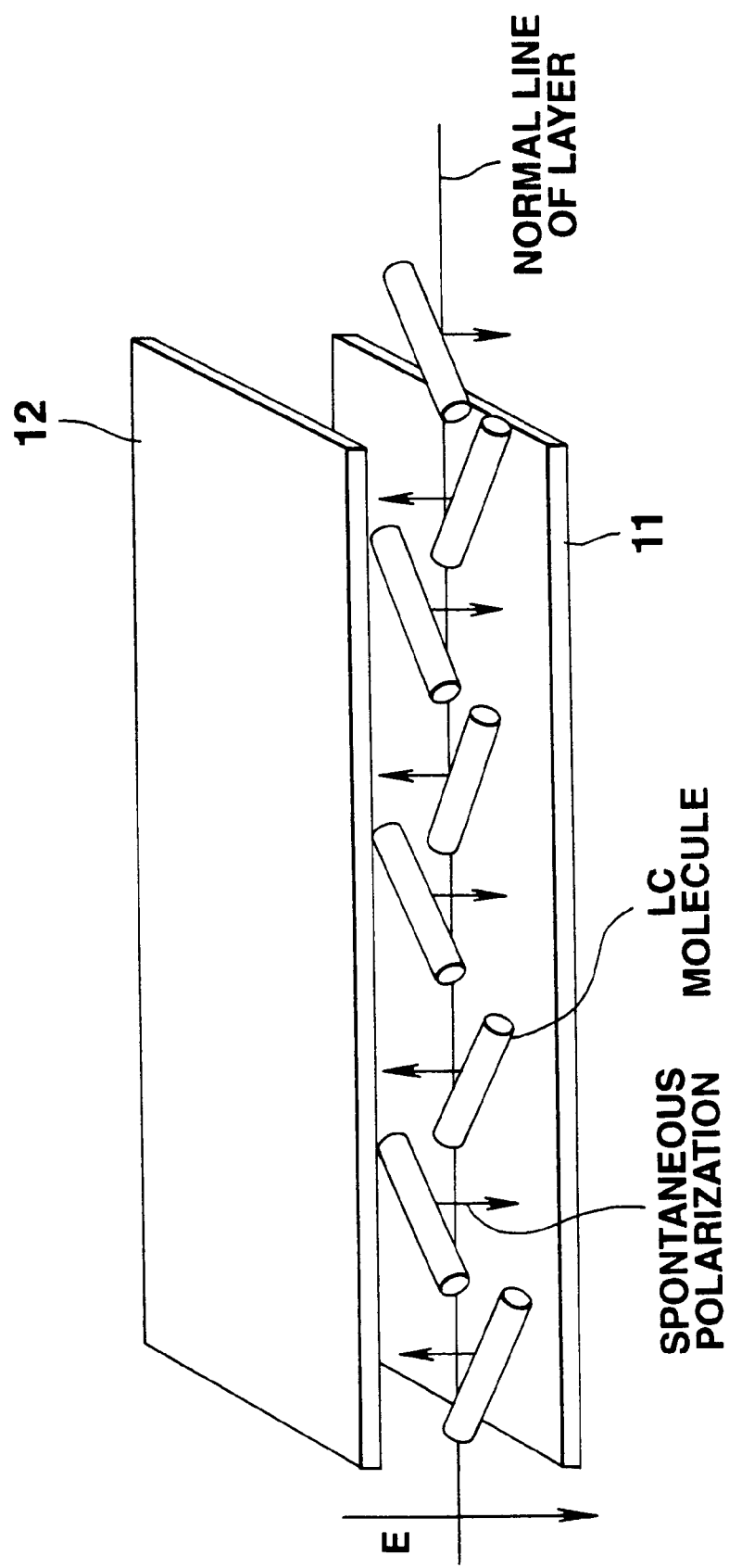
FIG. 5 is a diagram for explaining the alignment state of the LC molecules sealed between substrates.

This AFLC 21 is comprised of, for example, a liquid crystal which has a large cone angle of 30 degrees to 45 degrees (desirably 35 degrees or greater), and an SmCA* phase that changes in the sequence of isotropic, SmA and SmCA*. As shown in FIG. 4, the AFLC 21 has a layer structure of aligned molecules and a double helical structure in a bulk state. The AFLC 21 is sealed between the substrates 11 and 12 with the double helical structure nullified vanished, as shown in FIG. 5. Those points are basically the same as those of the AFLCs of the first to fourth embodiments.

The AFLC 21 according to this embodiment is comprised of a liquid crystal composition which has characteristics such as a relatively weak antiferroelectric interaction to keep the antiferroelectric phase and a relatively strong ferroelectric interaction to be likely to be in the ferroelectric phase. That is, the AFLC 21 consists of a liquid crystal composition which has such a strong tendency that the individual molecules are apt to be aligned in parallel. Further, the liquid crystal material has molecules whose free rotational force is strong.

With this type of liquid crystal used as the AFLC 21, when no voltage is applied, the LC molecules are alternately aligned to the first and second aligning directions 21A and 21B, as shown in FIG. 21A. In this state, spontaneous polarization occurs in each layer but the permanent dipoles of adjoining layers face in the opposite directions. The dipole moments are therefore canceled out, so that no spontaneous polarization exists as a whole and the antiferroelectric phase is set. The spatially-averaged optical axis of the AFLC 21 is directed to the normal line direction of the smectic layer (the layer having the smectic phase) or the average aligning direction of the LC molecules.

Under this situation, the LC molecules are rotating about their long axes while being suppressed by the antiferroelectric effect.

As mentioned earlier, the AFLC 21 of this embodiment has a strong ferroelectric interaction. That is, the interaction which cause the LC molecules of the adjoining layers to be aligned in parallel is strong. When a positive voltage E smaller than the saturated voltage Ec is applied to the AFLC 21, therefore, some of the LC molecules in the second alignment state are changed to the first alignment state in accordance with the level of the applied voltage E, as shown in FIG. 21B. The number (ratio) of molecules whose alignment state is changed increases as the applied voltage E becomes greater.

The rotation of the LC molecules about the long axes is suppressed in accordance with the level of the applied voltage, resulting in the appearance of spontaneous polarization. The interaction of the spontaneous polarization with the electric field causes the LC molecules to move off the cones as indicated by the broken line in FIG. 21B, and to tilt toward the first aligning direction 21A on the plane perpendicular to the electric field (y-z plane in FIG. 12). The inclination angle increases as the applied voltage E becomes larger.

As the applied voltage increase, the director of the AFLC 21 continuously changes toward the first aligning direction 21A by the combined effect of the increase in the LC molecules in the first alignment state caused by the increased applied voltage and the increase in the inclination of the LC molecules by the suppressed rotation.

When a positive voltage equal to or greater than the saturated voltage Ec is applied to the AFLC 21, as shown in FIG. 21C, nearly all the LC molecules become the first alignment state. With the effect of the inclination caused by the suppressed rotation, the individual LC molecules are aligned in a direction inclined by a predetermined angle from the first aligning direction 21A. In this state, the permanent dipoles of the adjoining layers face in the same direction, causing spontaneous polarization to appear, and the second ferroelectric phase is set. Under this situation, the rotation of the LC molecules is considerably suppressed by the applied electric field, so that large polarization appears.

When a negative voltage E smaller than the saturated voltage Ec is applied to the AFLC 21, some of the LC molecules in the first alignment state are changed to the second alignment state in accordance with the level of the applied voltage E, as shown in FIG. 21D. The number (ratio) of the molecules whose alignment state is changed increases as the applied voltage E becomes larger.

The rotation of the LC molecules about the long axes is suppressed in accordance with the level of the applied voltage, causing spontaneous polarization to appear. The interaction of the spontaneous polarization with the electric field tilt the LC molecules in a direction perpendicular to the electric field as indicated by the broken line in FIG. 21D.

As the applied voltage increase, the director of the AFLC 21 continuously changes toward the second aligning direction 21B by the combined effect of the increase in the LC molecules in the second alignment state caused by the increased negative applied voltage and the increase in the inclination of the LC molecules by the suppressed rotation.

When a negative voltage E equal to or greater than the saturated voltage Ec is applied to the AFLC 21, the LC molecules become the second alignment state as shown in FIG. 21E. With the effect of the inclination caused by the suppressed rotation, the individual LC molecules are aligned in a direction inclined by a predetermined angle from the second aligning direction 21B. In this state, the permanent dipoles of the adjoining layers face in the same direction, causing spontaneous polarization to appear, and the second ferroelectric phase is set. Under this situation, the rotation of the LC molecules is considerably suppressed by the applied electric field, so that large polarization appears.

Because some of the LC molecules of the AFLC 21 of this embodiment in the first or second alignment state are switched to the second or first alignment state in accordance with the applied voltage, the average alignment of the LC molecules in a shorter distance than the wavelength of light in the visible light band varies. That is, as exemplarily shown in FIG. 7, multiple minute regions where the LC molecules are aligned to the first alignment state and multiple minute regions where the LC molecules are aligned to the second alignment state, are formed in a shorter distance than the wavelength of light in the visible light band. The area of those minute regions or the ratio of the number thereof and the inclination angle of the LC molecules in the individual minute regions varies in accordance with the applied voltage.

Because the size of each minute region is smaller than the wavelength of light in the visible light band, the optical characteristics of those minute regions are optically averaged. The optical axis of the AFLC 21 therefore continuously changes in accordance with a change in the alignment of the LC molecules caused by a change in the applied voltage or in accordance with a change in the ratio of the LC molecules in the first alignment state to those in the second alignment state.

Figure 22:
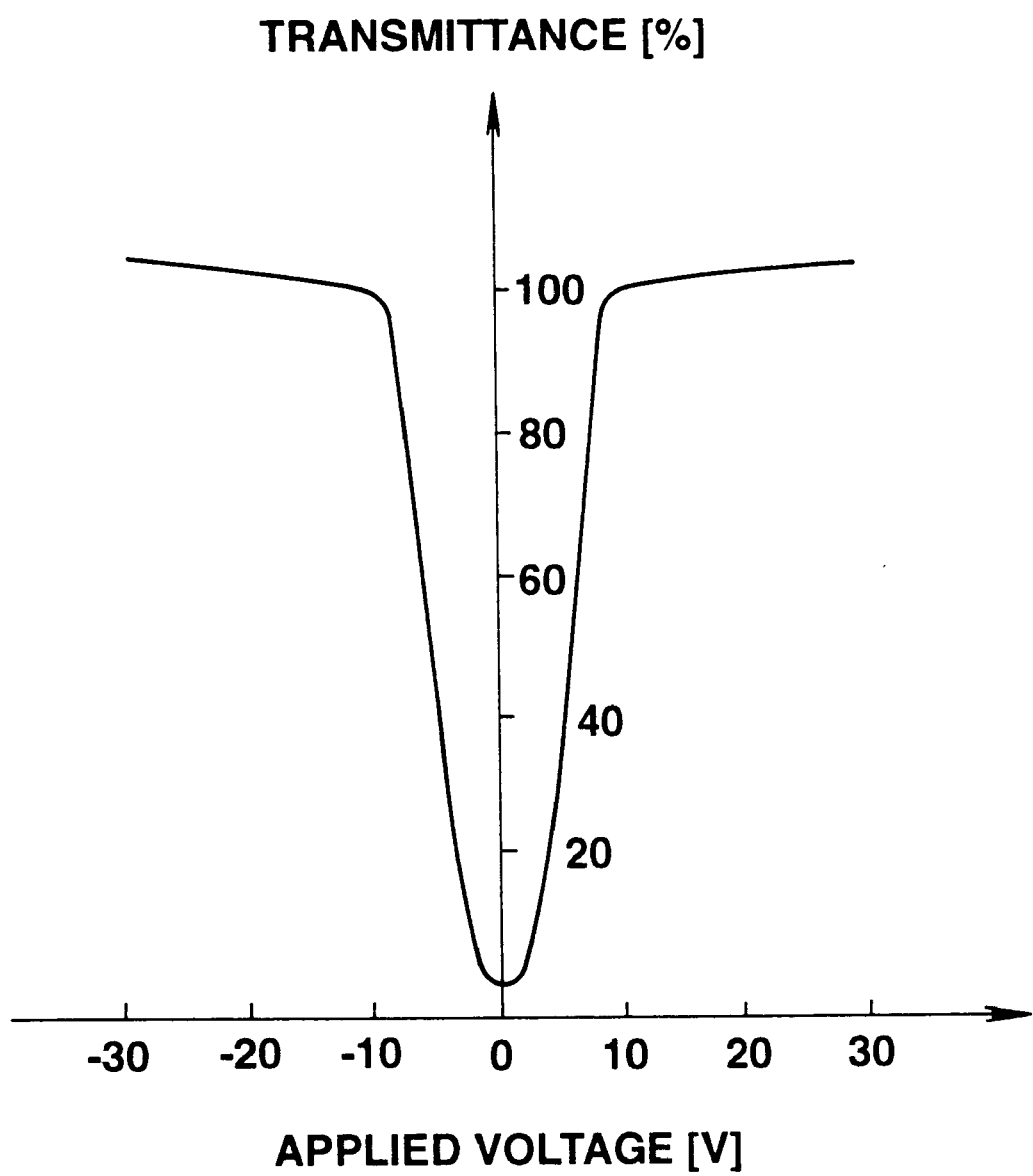
FIG. 22 is a graph showing an applied voltage v.s. transmittance characteristic when a triangular-wave voltage of a low frequency is applied to the AFLC display device of the fifth embodiment.

As shown in FIG. 22, therefore, the optical characteristic, which can be acquired by applying a triangular-wave voltage with a sufficiently low frequency of about 0.1 Hz between the electrodes 13 and 17 of the LCD device using the AFLC of this embodiment, is such that no flat portion exists in the vicinity of the applied voltage of 0 V, and the transmittance continuously changes as the applied voltage changes, showing no threshold value. Further, the curves of the transmittances become symmetrical with respect to the polarity of the applied voltage. When a voltage equal to or greater than the saturated voltage Ec is applied, nearly all the LC molecules are aligned to either the first alignment state or the second alignment state and the transmittance is substantially saturated. Due to the inclination of the LC molecules caused by the suppressed rotation of the LC molecules, the alignment state slightly changes as the applied voltage increases. This results in a slight increase in the transmittance. Furthermore, the hysteresis is very small.

According to the LCD device having such optical characteristic, the display gradation is specifically determined in accordance with the applied voltage and, what is more, arbitrary gradation can be acquired. As discussed above, therefore, arbitrary gradation can be displayed by using an active matrix type LCD device and keeping the applied voltage substantially to a specific value corresponding to the display gradation in the non-selection period of each pixel.

The AFLC display device of this embodiment can also be driven by the driving method shown in FIGS. 10A and 10B.

Figure 23:
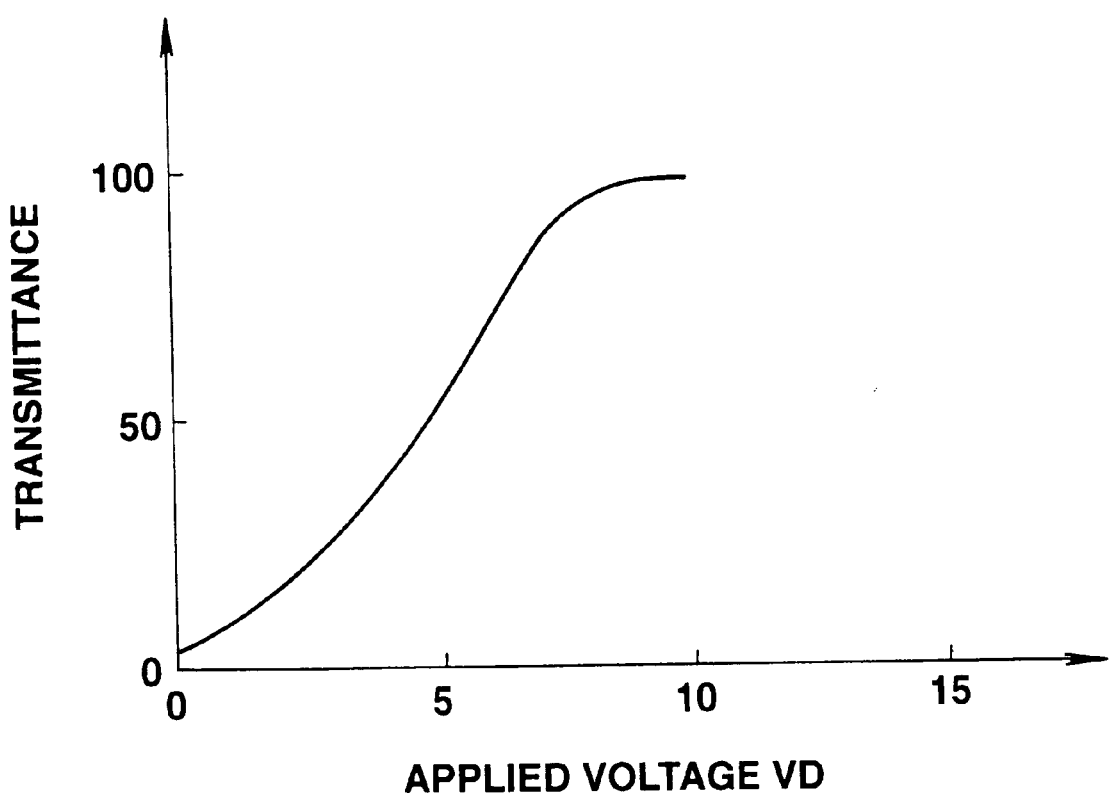
FIG. 23 is a diagram showing an applied voltage v.s. transmittance characteristic when the LCD device of the fifth embodiment is driven by the method illustrated in FIGS. 10A–10C.

FIG. 23 shows the relationship between the transmittance and the write voltage in the case where the LCD device using, as the AFLC 21, an AFLC which has the above-discussed characteristics and has an I-SA transition temperature of 71° C., an SA-SC* transition temperature of 57° C., and spontaneous polarization of 176 nc/cm$^2$, is driven by the driving method illustrated in FIGS. 10A and 10B, with the direction of the aligning treatment and the direction of the transmission axis of the polarization plate being set as illustrated in FIG. 3 and with the selection period TS set to 60 μs.

It is apparent from FIG. 23 that this LCD device and this driving method can continuously change the transmittance by altering the write voltage and further allows the display gradation to be specifically determined in accordance with the write voltage, thus ensuring gradation display.

Sixth Embodiment

A description will be given of an AFLC according to the sixth embodiment, which provides an intermediate alignment state by (2) the behavior of the LC molecules along the cones by the phase transition precursor, and (3) the movement of the LC molecules off the cones to tilt in the direction perpendicular to the electric field in accordance with the applied voltage, and an AFLC display device which uses this AFLC.

The structure of the LCD device according to this embodiment is the same as that illustrated in FIGS. 1 through 3.

This AFLC 21 is comprised of, for example, a liquid crystal which has a large cone angle of 30 degrees to 45 degrees (desirably 35 degrees or greater), and an SmCA* phase that changes in the sequence of isotropic, SmA and SmCA*. As shown in FIG. 4, the AFLC 21 has a layer structure of aligned molecules and a double helical structure in a bulk state. The AFLC 21 is sealed between the substrates 11 and 12 with the double helical structure nullified vanished, as shown in FIG. 5. Those points are basically the same as those of the AFLCs of the first to fifth embodiments.

The AFLC 21 according to this embodiment is comprised of a liquid crystal composition which has characteristics such as a strong antiferroelectric interaction and a weak ferroelectric interaction. That is, this liquid crystal has a relatively weak tendency to align the individual molecules in parallel. Further, the liquid crystal material has molecules whose free rotational force is strong.

When this type of AFLC is used as the AFLC 21, with no voltage applied, the LC molecules are alternately aligned to the first and second aligning directions 21A and 21B, as shown in FIG. 24A. In this state, spontaneous polarization occurs in each layer but the permanent dipoles of adjoining layers face in the opposite directions. The dipole moments are therefore canceled out, so that no spontaneous polarization exists as a whole and the antiferroelectric phase is set. The spatially-averaged optical axis of the AFLC 21 is directed to the average aligning direction of the LC molecules or the normal line direction of the smectic layer which is the direction of the director.

As mentioned earlier, the AFLC 21 of this embodiment has a strong ferroelectric interaction. That is, the LC molecules are apt to be alternately aligned to the first aligning direction 21A and the second aligning direction 21B layer by layer. When a voltage E smaller than the saturated voltage Ec is applied to the AFLC 21, therefore, the movement (phase transition precursor) of the individual LC molecules on the cones corresponding to the applied voltage and the suppression of the free rotation cause the inclination of the LC molecules in the first alignment state and the inclination of the LC molecules in the second alignment state to vary while keeping the sequentially inverting alignment state layer by layer as shown by broken lines in FIG. 24B or 24C. Therefore, the direction of the director of the AFLC 21 continuously change between the first and second aligning directions 21A and 21B.

Intermediate gradation can be displayed using this intermediate alignment state as per the first to fifth embodiments.

Seventh Embodiment

A description will be given of an AFLC display device using an AFLC which provides an intermediate alignment state by the combination of (1) the transition of some of the LC molecules in the first or second alignment state to the second or first alignment state, (2) the behavior of the LC molecules along the cones by the phase transition precursor, and (3) the movement of the LC molecules off the cones to tilt in the direction perpendicular to the electric field in accordance with the applied voltage.

The structure of the LCD device according to this embodiment is the same as that illustrated in FIGS. 1 through 3.

This AFLC 21 of this embodiment is comprised of, for example, a liquid crystal which has a large cone angle of 30 degrees to 45 degrees (desirably 35 degrees or greater), and an SmCA* phase that changes in the sequence of isotropic, SmA and SmCA*. As shown in FIG. 4, the AFLC 21 has a layer structure of aligned molecules and a double helical structure in a bulk state. The AFLC 21 is sealed between the substrates 11 and 12 with the double helical structure nullified vanished, as explanatorily shown in FIG. 5. Those points are basically the same as those of the AFLCs of the first to fifth embodiments.

The AFLC 21 according to this embodiment has a relatively weak antiferroelectric interaction to keep the antiferroelectric phase and a relatively strong ferroelectric interaction to be likely to be in the ferroelectric phase. The AFLC 21 also has a strong rotational force about the molecular long axis.

The AFLC 21 having such characteristics can be obtained by, for example, mixing a liquid crystal having the essential structure shown in (I) in Table 4 and a liquid crystal having the essential structure shown in (II) in Table 4 at the mixing ratio of 60 weight % of and 40 weight %, respectively. This AFLC 21 has a cone angle of approximately 30 degrees.

TABLE 4

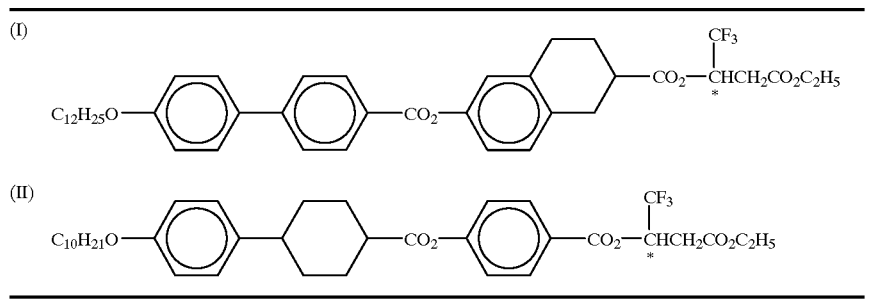

According to the liquid crystal having the above composition, some of the LC molecules in the first or second alignment state change to the second or first alignment state in accordance with the applied voltage, the LC molecules in the first or second alignment state move along the cones by the phase transition precursor, and the LC molecules tilt in a direction perpendicular to the electric field by the suppression of the molecular rotation. Accordingly, the direction of the director of the AFLC 21 varies in accordance with the applied voltage.

A change in the alignment state of the LC molecules of this AFLC in accordance with the applied voltage will now be discussed with reference to a model shown in FIG. 25.

With no voltage applied, the LC molecules are alternately aligned to the first and second aligning directions 21A and 21B, as shown in FIG. 25A. That is, the first alignment state and the second alignment state are repeated layer by layer. Under this situation, spontaneous polarization occurs in each layer but the permanent dipoles of adjoining layers face in the opposite directions so that the dipole moments are canceled out. As a result, from the systematic point of view, no spontaneous polarization exists so that the antiferroelectric phase is set. The optical axis of the AFLC 21, which is spatially averaged, is set to the average aligning direction of the LC molecules, i.e., the normal line direction of the smectic layer or the direction of the director.

Under this situation, the LC molecules are rotating about their long axes while being suppressed by the antiferroelectric effect.

The AFLC 21 according to this embodiment is comprised of a liquid crystal composition which has characteristics such as a relatively strong ferroelectric interaction to be likely to be in the ferroelectric phase. That is, the AFLC 21 consists of a liquid crystal composition which has such a strong tendency that the individual molecules are apt to be aligned in parallel.

When a positive voltage E smaller than the saturated voltage Ec is applied to the AFLC 21, therefore, some of the LC molecules in the second alignment state are changed to the first alignment state in accordance with the level of the applied voltage E, as shown in FIGS. 25B and 25C. The number (ratio) of molecules whose alignment state is changed increases as the applied voltage E becomes greater.

The AFLC 21 of this embodiment has a weak antiferroelectric interaction. That is, the interaction to keep the alignment state of the antiferroelectric phase is weak. When a positive voltage E is applied to the AFLC 21, therefore, the LC molecules in the second alignment state move (tilt) by a predetermined amount (predetermined angle) by the interaction of the electric field E and the permanent dipoles. The LC molecules which have already been set to the first aligning direction do not move because of the large interaction with the spontaneous polarization.

Further, the rotation of the LC molecules about the long axes is suppressed by the applied voltage, causing spontaneous polarization to occur. The interaction of the spontaneous polarization with the electric field E causes the LC molecules to tilt on the plane perpendicular to the electric field E. This behavior is the movement of the LC molecules off the cones.

Because of the combined effect of the above phenomena, as indicated by the broken lines in FIGS. 25B and 25C, the aligning direction of the LC molecules is shifted from the alignment state in the first aligning direction 21A or the second aligning direction 21B which is set when no electric field is applied. The inclination angle $\theta2$ of the LC molecules in the second alignment state is determined by the total effect of the movement on the cones caused by the electric field and the movement off the cones caused by the suppressed rotation, and the inclination angle $\delta1$ of the LC molecules in the first alignment state is determined by the degree of the suppression of the rotation. The inclination angles $\delta1$ and $\delta2$ vary in accordance with the intensity of the applied electric field E.

As the applied voltage increase, the director of the AFLC 21 continuously changes toward the first aligning direction 21A from the normal line direction of the smectic layer by the combined effect of the increase in the LC molecules in the first alignment state caused by the increased positive applied voltage E and the increase in the inclination of the individual LC molecules.

When a negative voltage E smaller than the saturated voltage Ec is applied, some of the LC molecules in the first alignment state change to the second alignment state in accordance with the level of the applied voltage E, as shown in FIGS. 25E and 25F. The number (ratio) of the molecules whose alignment state change increases with an increase in the applied voltage E.

The LC molecules move along the cones toward the second aligning direction 21B in accordance with the applied voltage E by the phase transition precursor. The LC molecules which have already been set to the second aligning direction 21B do not however move because of the large interaction with the spontaneous polarization.

Further, the rotation of the LC molecules about the long axes is suppressed in accordance with the level of the applied voltage E, causing spontaneous polarization to occur. The interaction of the spontaneous polarization with the electric field causes the LC molecules to tilt in a direction perpendicular to the electric field.

The movement of the LC molecules along the cones and the suppression of the molecular rotation shift the individual LC molecules from the first or second aligning direction 21A or 21B as indicated, for example, by the broken lines in FIGS. 25E and 25F. The inclination angle (shift angle) δ3 of the LC molecules in the first alignment state is determined by the inclination of the LC molecules on the cones and the suppression of the molecular rotation, and the inclination angle δ4 of the LC molecules in the second alignment state is determined by the suppression of the molecular rotation. The inclination angles δ3 and δ4 both vary in accordance with the intensity of the applied electric field.

As the negative applied voltage E increases, the number of the LC molecules in the second alignment state increases and the inclination of the LC molecules also increases. As the negative applied voltage E increases, therefore, the director of the AFLC 21 continuously changes toward the second aligning direction 21B from the normal line direction of the smectic layer.

When a voltage equal to or greater than the saturated voltage Ec is applied to the AFLC 21, the LC molecules become the second alignment state in accordance with the polarity of the applied voltage, as shown in FIGS. 25D and 25G. In this state, the permanent dipoles of the adjoining layers face in the same direction, causing spontaneous polarization to appear, and the first or second ferroelectric phase is set. Under this situation, the rotation of the LC molecules is suppressed hard by the applied electric field, so that large polarization appears.

As a result of the aforementioned combined actions of the LC molecules, as shown in FIG. 7, multiple minute regions where the LC molecules are aligned to the first alignment state and multiple minute regions where the LC molecules are aligned to the second alignment state are formed in the AFLC 21 within a distance shorter than the wavelength of light in the visible light band, and the area of those minute regions or the ratio of the number thereof varies in accordance with the applied voltage. The director of the AFLC 21 in each minute region tilts by the inclination of the LC molecules along the cones caused by the phase transition precursor and the movement of the LC molecules off the cones caused by the suppression of the molecular rotation.

Because the size of each minute region is smaller than the wavelength of light in the visible tight band, the optical characteristics of those minute regions are optically averaged so that the average direction of the directors of the AFLC 21 becomes the substantial optical axis of the AFLC 21. This optical axis continuously changes between the first aligning direction and the second aligning direction as the applied voltage changes.

Figure 26:
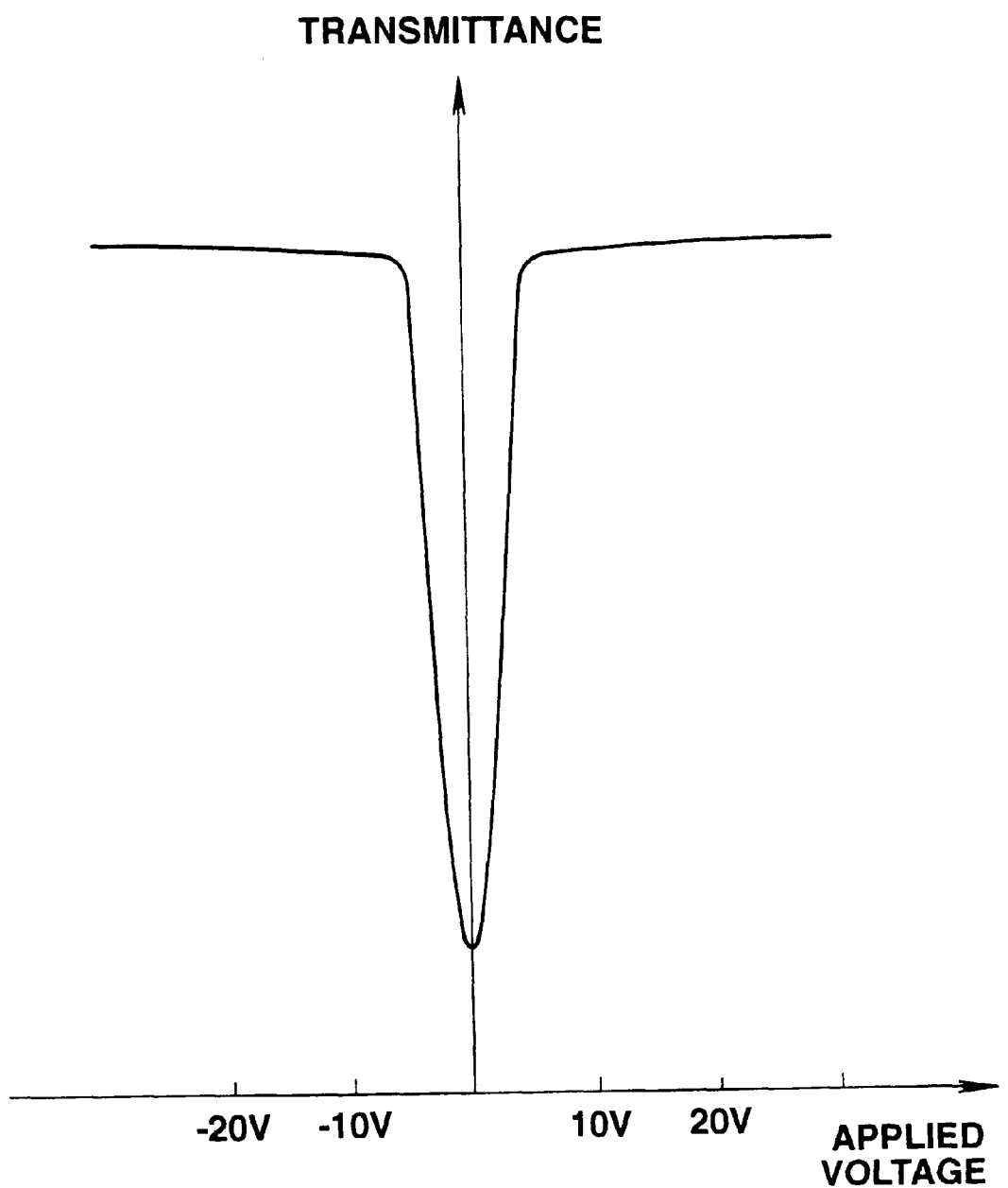
FIGS. 26 and 27 are graphs showing applied voltage v.s. transmittance characteristics when a triangular-wave voltage of a low frequency is applied to the AFLC display device of the seventh embodiment.
Figure 27:
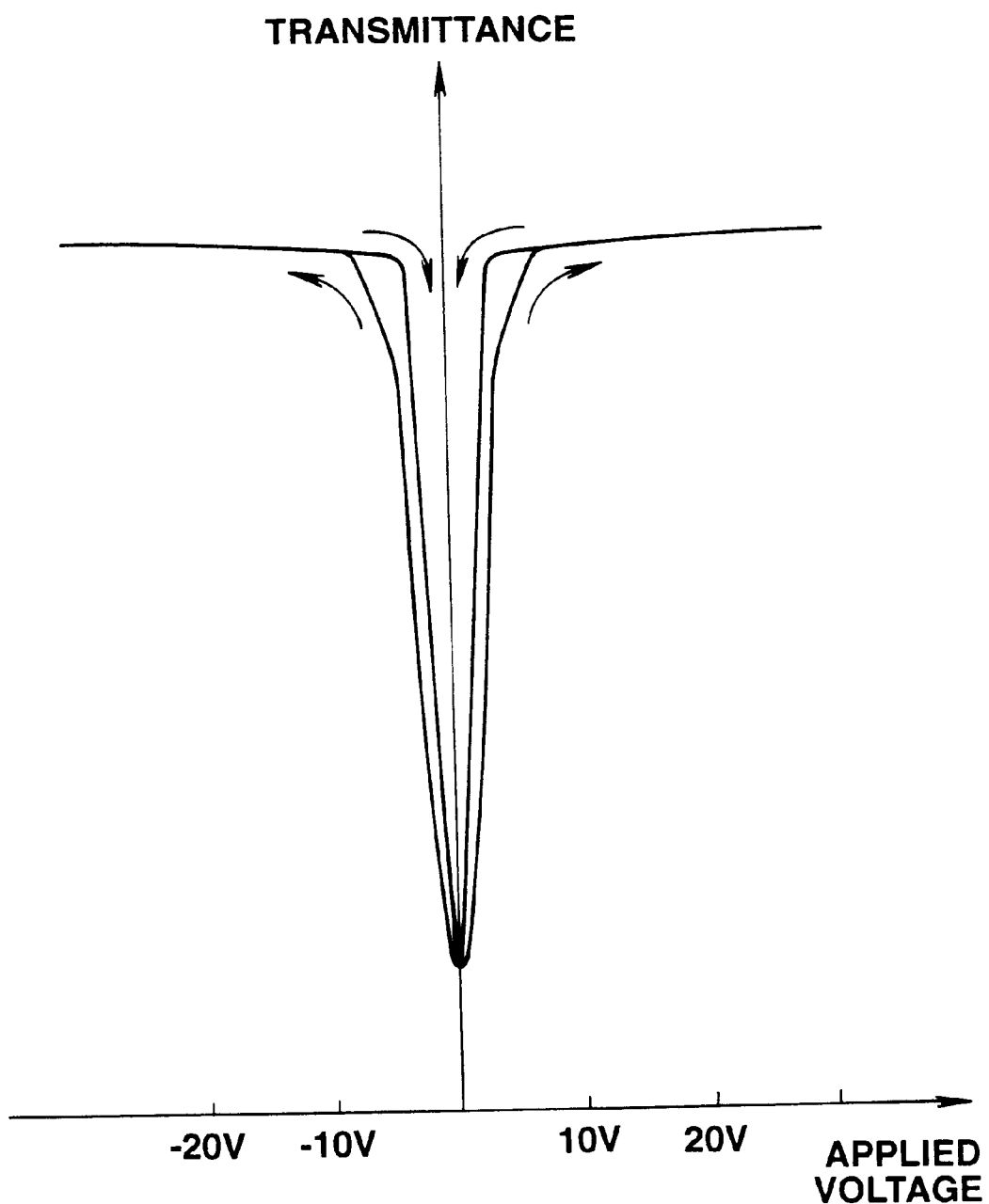

Therefore, the optical characteristic, which can be acquired by applying a triangular-wave voltage with a sufficiently low frequency of about 0.1 Hz between the electrodes 13 and 17 of the LCD device using the AFLC as shown in Table 4, and has no flat portion in the vicinity of the applied voltage of 0 V, continuously and smoothly changes with an increase in the absolute value of the applied voltage, showing no threshold value, as shown in FIG. 26 or 27. Further, the curves of the transmittances become symmetrical with respect to the polarity of the applied voltage.

When a voltage whose absolute value is equal to or greater than the saturated voltage Ec is applied to this AFLC, nearly all the LC molecules are aligned to the first or second alignment state and the transmittance is substantially saturated. But, the transmittance slightly increases due to the inclination of the LC molecules caused by the suppression of the rotation of the LC molecules even after the applied voltage E becomes greater than the saturated voltage Ec. Furthermore, the hysteresis is small.

According to the LCD device of this embodiment, as discussed above, the display gradation is specifically determined with respect to the applied voltage, and arbitrary gradation can be acquired. Therefore, arbitrary gradation can be displayed by using an active matrix type LCD device and keeping the applied voltage substantially to a specific value corresponding to the display gradation in the non-selection period of each pixel, as mentioned earlier.

The driving method illustrated in FIGS. 10A and 10B can be used as a practical driving method for allowing the LCD device of this embodiment to perform gradation display.

Figure 28:
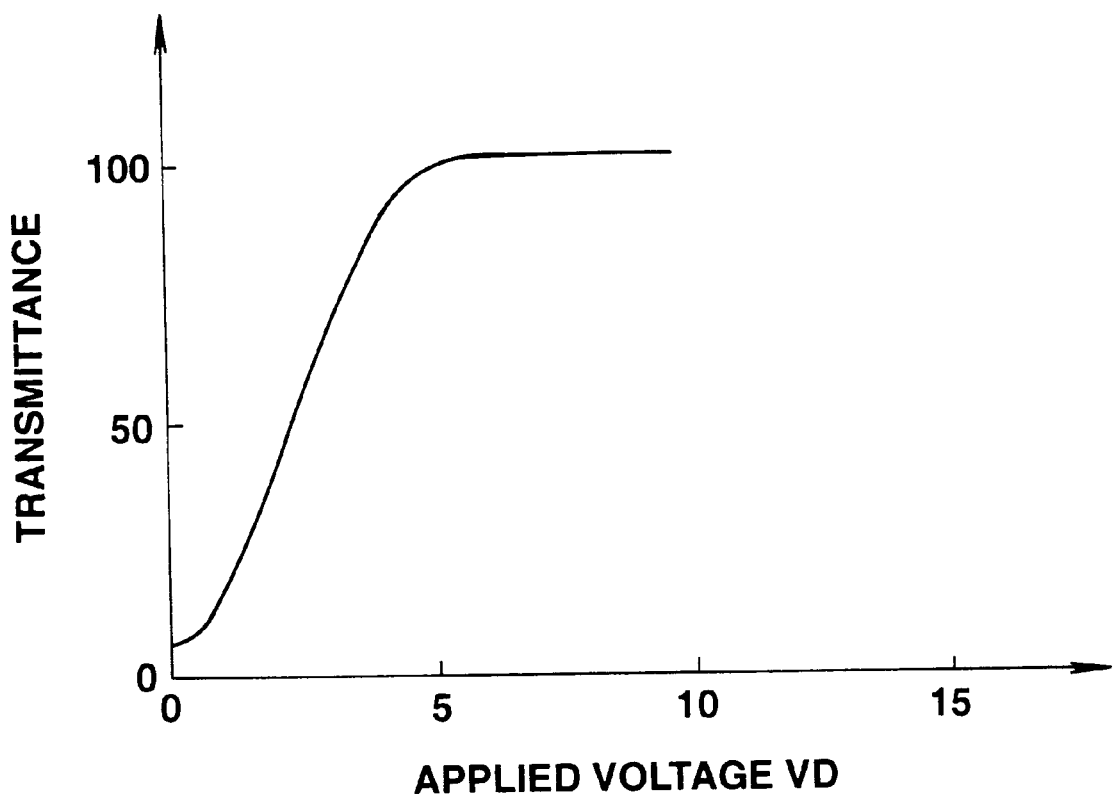
FIG. 28 is a diagram showing an applied voltage v.s. transmittance characteristic when the LCD device of the seventh embodiment is driven by the method illustrated in FIGS. 10A–10C.

FIG. 28 shows the relationship between the write voltage and the transmittance in the case where the liquid crystal composition, which has an I-SA transition temperature of 68° C., an SA-SCA* transition temperature of 54° C., and spontaneous polarization of 138 nc/cm$^2$ and a tilt angle of 30.4 degrees (cone angle of 30.8 degrees), is adjusted using the liquid crystal compound as shown in Table 4, this liquid crystal composition is used as an AFLC with the helical structure nullified, and the driving method illustrated in FIGS. 10A and 10B is employed with the selection period TS set to 60 μs.

It is apparent from this graph that this LCD device and this driving method can continuously change the transmittance by altering the write voltage and further allows the display gradation to be specifically determined in accordance with the write voltage. This can ensure the gradation display. It is therefore possible to stably display gradation images.

Eighth Embodiment

Although the liquid crystal 21 is placed between both substrates 11 and 12 with the helical structure nullified in the first to seventh embodiments, the liquid crystal may be sealed with the helical structure maintained. The following will discuss an AFLC display device which has the AFLC 21 sealed between both substrates 11 and 12 with the double helical structure maintained, and can provide an intermediate alignment state by the deformation of the helical structure traced by the LC molecules.

The structure of the LCD device according to this embodiment is the same as that illustrated in FIGS. 1 through 3.

This AFLC 21 of this embodiment is comprised of, for example, a liquid crystal which has a large cone angle of 30 degrees to 45 degrees (desirably 35 degrees or greater), and an SmCA* phase that changes in the sequence of isotropic, SmA and SmCA*, and the AFLC 21 has a layer structure of aligned molecules and a double helical structure in a bulk state. Those points are basically the same as those of the AFLCs of the first to fifth embodiments.

Figure 29:
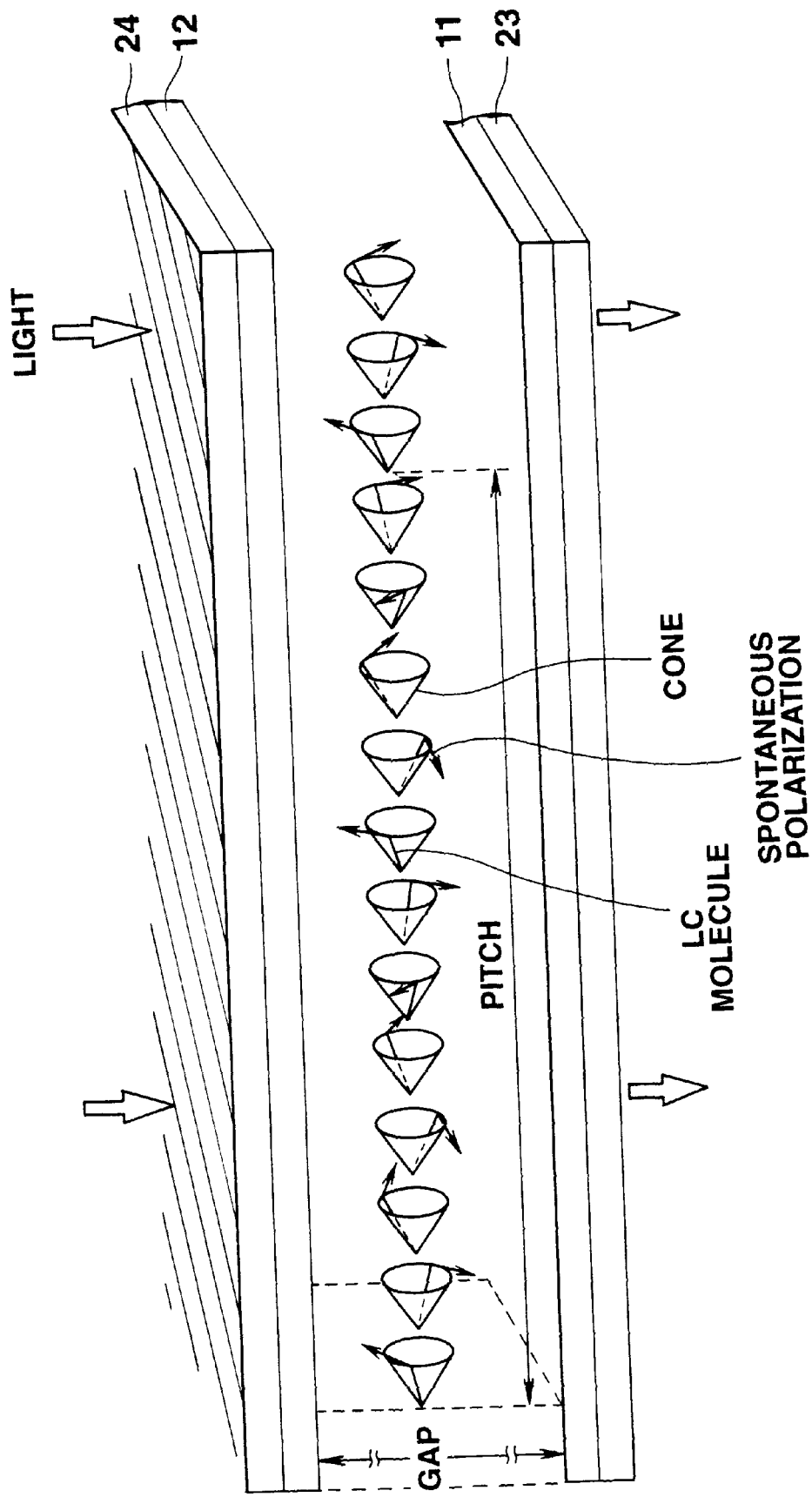
FIG. 29 is a diagram illustrating the alignment of molecules of the AFLC with the double helical structure maintained.

One pitch of the helical structure of the AFLC 21 is set smaller than the layer thickness of the AFLC 21 (cell gap), and has a weak interaction with the aligning films 18 and 19. The AFLC 21 is thus sealed between the substrates 11 and 12 with the double helical structure maintained as shown in FIG. 29.

FIGS. 30A through 30E are diagrams used for explaining the deformation of the double helical structure of the LC molecules caused by the applied voltage. Those diagrams show the projection of the individual LC molecules on the z-y plane where z is the axis of the cone traced by each LC molecule and y is the direction of the major surface of the substrate, with the x axis being the direction perpendicular to the major surface of the substrate, as shown in FIG. 12.

Figures 30A, 30B, 30C, 30D, 30E:
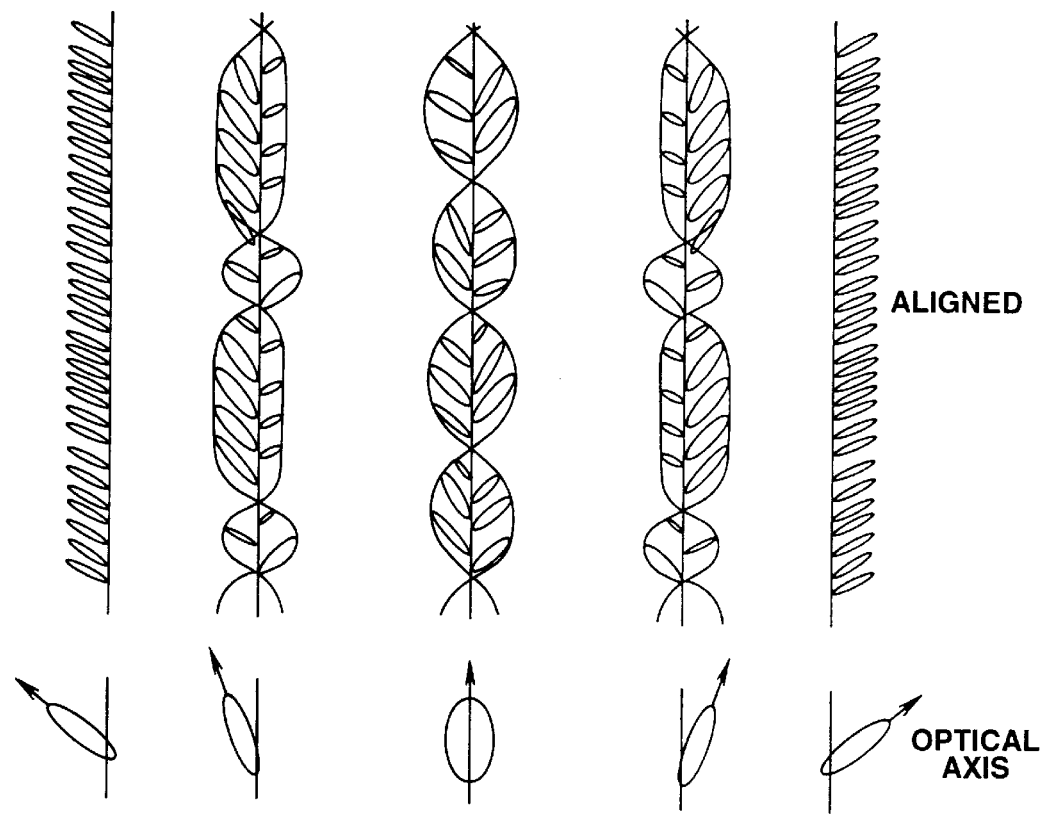

With no voltage applied, the LC molecules trace two helixes shifted by 180 degrees, as shown in FIG. 30A. In this state, the permanent dipoles of adjoining layers face in the opposite directions so that the dipole moments are canceled out. As a result, no spontaneous polarization appears so that the antiferroelectric phase is set. The spatially-averaged optical axis of the AFLC 21 is set to the normal line direction of the smectic layer (the layer having the smectic phase) which is the average aligning direction of the LC molecules, i.e., this optical axis is directed substantially to the direction 21C of the aligning treatment.

When a voltage is applied to the AFLC 21, the interaction of the permanent dipoles of the LC molecules with the electric field deforms the double helical structure traced by the LC molecules as shown in FIGS. 30B and 30D in accordance with the polarity and the absolute value of the applied voltage. This deformation causes the average optical axis to tilt.

When a voltage equal to or greater than the saturated applied voltage Ec is applied to the AFLC 21, the helical structure disappears and the LC molecules have the first or second ferroelectric phase where the LC molecules are aligned to the first or second aligning direction 21A or 21B in accordance with the polarity of the applied voltage.

According to the AFLC 21 having such a structure and operation characteristic, as the double helical structure traced by the LC molecules deforms in accordance with the applied voltage, the average optical axis of the AFLC 21 continuously varies. Changes in the optical axis with respect to applied voltages which have different polarities but have the same absolute value become substantially the same.

Figure 31:
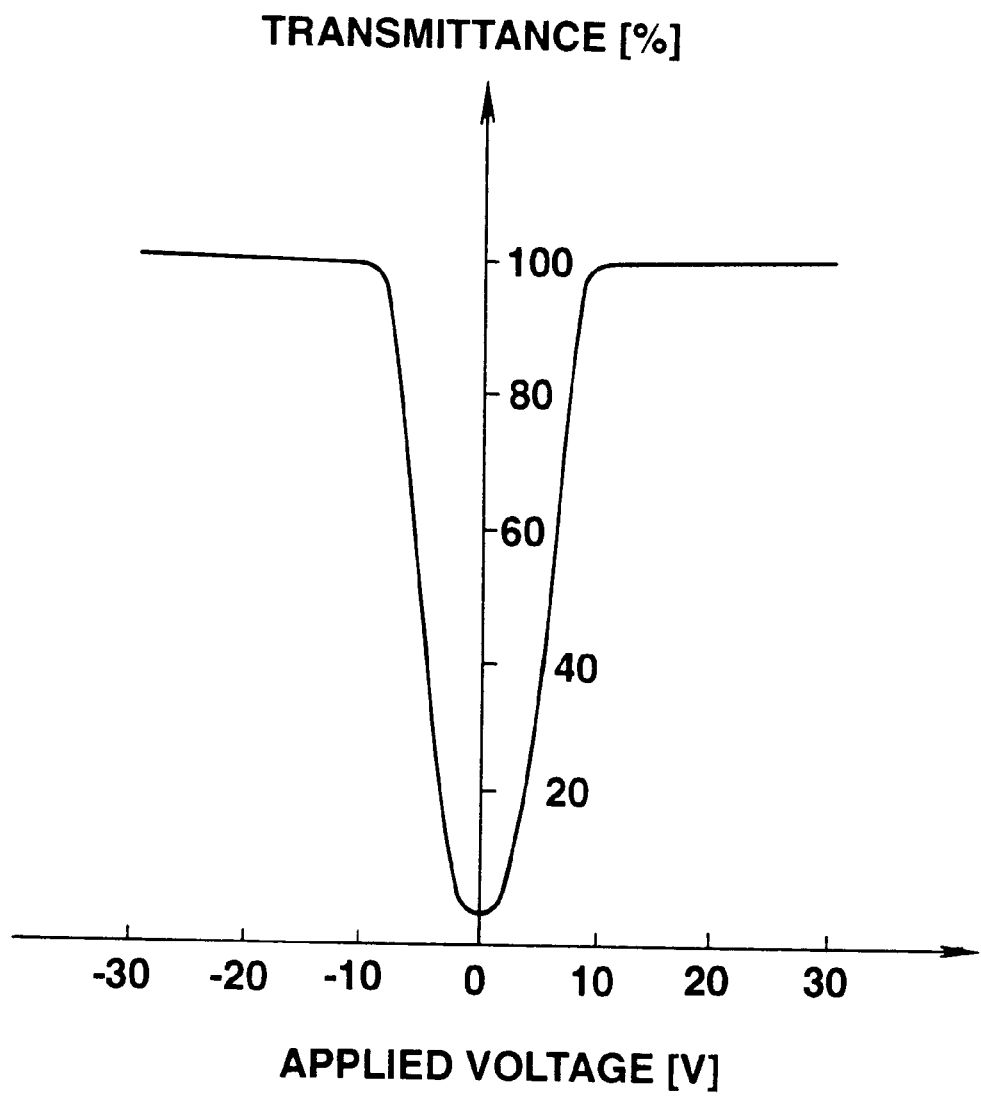
FIG. 31 is a graph showing an applied voltage v.s. transmittance characteristic when a triangular-wave voltage of a low frequency is applied to the AFLC display device of the eighth embodiment.

Therefore, the optical characteristic, which can be acquired by arranging the polarization plates 23 and 24 as shown in FIG. 3 and applying a triangular-wave voltage with a sufficiently low frequency of about 0.1 Hz between the pixel electrodes 13 and the common electrode 17, is such that no flat portion exists in the vicinity of the applied voltage of 0 V, and the transmittance continuously changes with an increase in the absolute value of the applied voltage, showing no threshold value, as shown in FIG. 31. Further, the curves of the transmittances become symmetrical with respect to the polarity of the applied voltage. When a voltage whose absolute value is equal to or greater than the saturated voltage Ec is applied to this AFLC 21, the helixes disappear and the transmittance is saturated. Furthermore, the hysteresis is very small.

According to the LCD device having such an optical characteristic, the display gradation is specifically determined with respect to the applied voltage. Arbitrary gradation can therefore be displayed by using an active matrix type LCD device and keeping the applied voltage substantially to a specific value corresponding to the display gradation in the non-selection period of each pixel, as mentioned earlier.

The driving method illustrated in FIGS. 10A and 10B can be used as a practical driving method for allowing the LCD device of this embodiment to perform gradation display.

Figure 32:
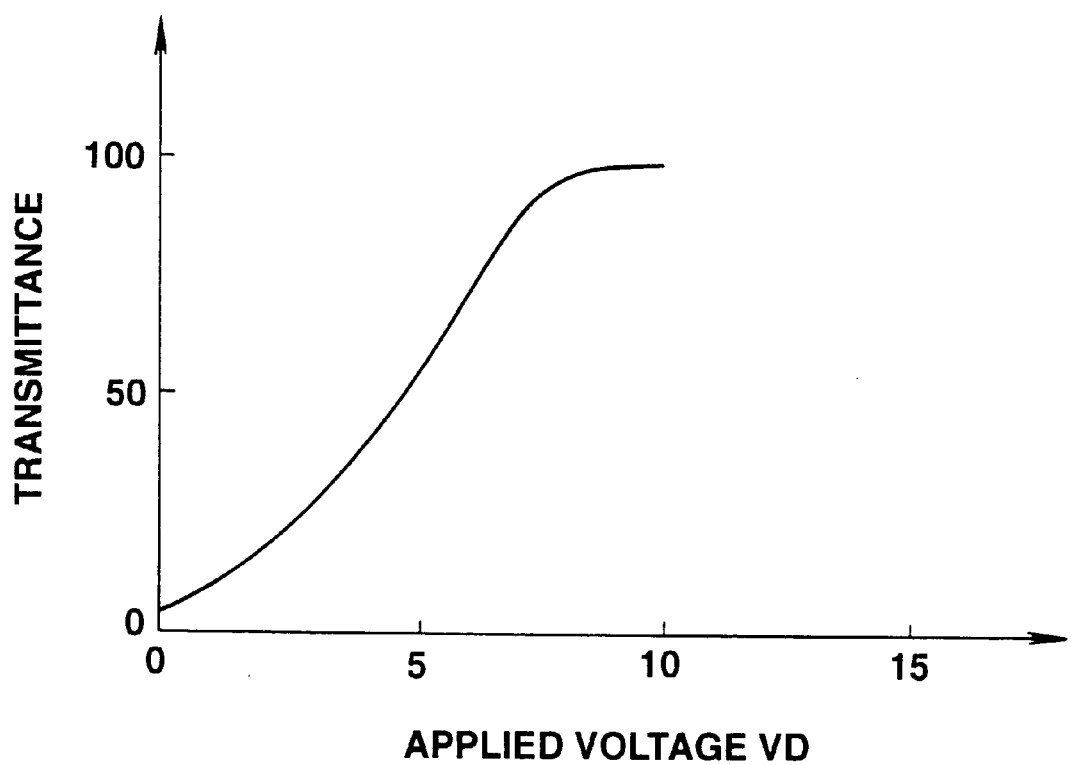
FIG. 32 is a diagram showing an applied voltage v.s. transmittance characteristic when the LCD device of the eighth embodiment is driven by the method illustrated in FIGS. 10A–10C.

FIG. 32 shows the relationship between the write voltage and the transmittance in the case where an AFLC, which has an I-SA transition temperature of 92° C., an SA-SCA* transition temperature of 68° C., and spontaneous polarization of 130 nc/cm² and a tilt angle of 27 degrees (cone angle of 54 degrees) and has a deformable double helical structure, is used, the direction of the aligning treatment and the directions of the transmission axes of the polarization plates are set as shown in FIG. 3, and the driving method illustrated in FIGS. 10A and 10B is employed with the selection period TS set to 60 μs.

It is apparent from this graph that this LCD device and this driving method can continuously change the transmittance by altering the write voltage and further allows the display gradation to be specifically determined in accordance with the write voltage. This can ensure the gradation display.

Ninth Embodiment

There is an AFLC which can provide an intermediate alignment state by the combined occurrence of the deformation of the double helical structure as described in the foregoing description of the eighth embodiment and the behavior of the LC molecules as explained in the foregoing descriptions of the first to seventh embodiments.

The following will discuss an AFLC capable of providing an intermediate alignment state by (a) the deformation of the double helical structure caused by the applied voltage and (b) the movement of the LC molecules off the cones to tilt in the direction perpendicular to the electric field in accordance with the applied voltage, and an AFLC display device which uses this AFLC.

The structure of the LCD device according to this embodiment is the same as that illustrated in FIGS. 1 through 3.

This AFLC 21 of this embodiment is comprised of, for example, a liquid crystal having a large cone angle of 30 degrees to 45 degrees (desirably 35 degrees or greater), and an SmCA* phase that changes in the sequence of isotropic, SmA and SmCA*, and has a layer structure of aligned molecules and a double helical structure in a bulk state. One pitch of the helical structure of the AFLC 21 is set smaller than the layer thickness of the AFLC 21 (cell gap), and the AFLC 21 is sealed between the substrates 11 and 12 with the double helical structure maintained as exemplarily shown in FIG. 30. Those points are basically the same as those of the AFLC of the ninth embodiment.

The AFLC 21 has a weak interaction with the aligning films 18 and 19 and has a strong rotational force about the long axis of each molecule.

The AFLC of this embodiment, like that of the eighth embodiment, has the double helical structure of the LC molecules which deforms in accordance with the applied voltage, as shown in FIGS. 30A to 30E.

When no electric field is applied to the AFLC 21, the individual LC molecules are rotating about their long axes while being suppressed by the antiferroelectric effect. When an electric field E is applied in the direction perpendicular to the major surfaces of the substrates 11 and 12, the rotation of the LC molecules is suppressed, causing polarization to occur, and the LC molecules tilt in the direction perpendicular to the electric field by the interaction of the polarization and the electric field. When the electric field E is applied to the LC molecules in the alignment state as indicated by the solid line in FIG. 33A, for example, the molecules tilt on a plane perpendicular to the electric field as indicated by the broken line. The inclination angle δ corresponds to the intensity of the applied electric field. When the direction of the electric field is inverted, the direction of inclination is inverted as shown in FIG. 33B. In other words, the inclination angle 6 of the LC molecules is brought about by the application of an electric field.

The inclination of the LC molecules by the applied electric field E can be considered as the inclination of the axis of the cone traced by each LC molecule (inclination on the z-y plane in FIG. 12).

According to the AFLC 21 of this embodiment, the deformation of the double helical structure and the inclination of the axis of the cone occurs together in accordance with the applied voltage, the average aligning direction of the LC molecules continuously changes in an intermediate state between the antiferroelectric phase and the ferroelectric phase. Because the pitch of the helical structure of the AFLC 21 is shorter than the wavelength of light in the visible light band, the average optical axis continuously varies between the first aligning direction 21A and the third direction and between the second aligning direction 21A and the third direction. Changes in the optical axis with respect to applied voltages which have different polarities but have the same absolute value become substantially the same.

Figure 34:
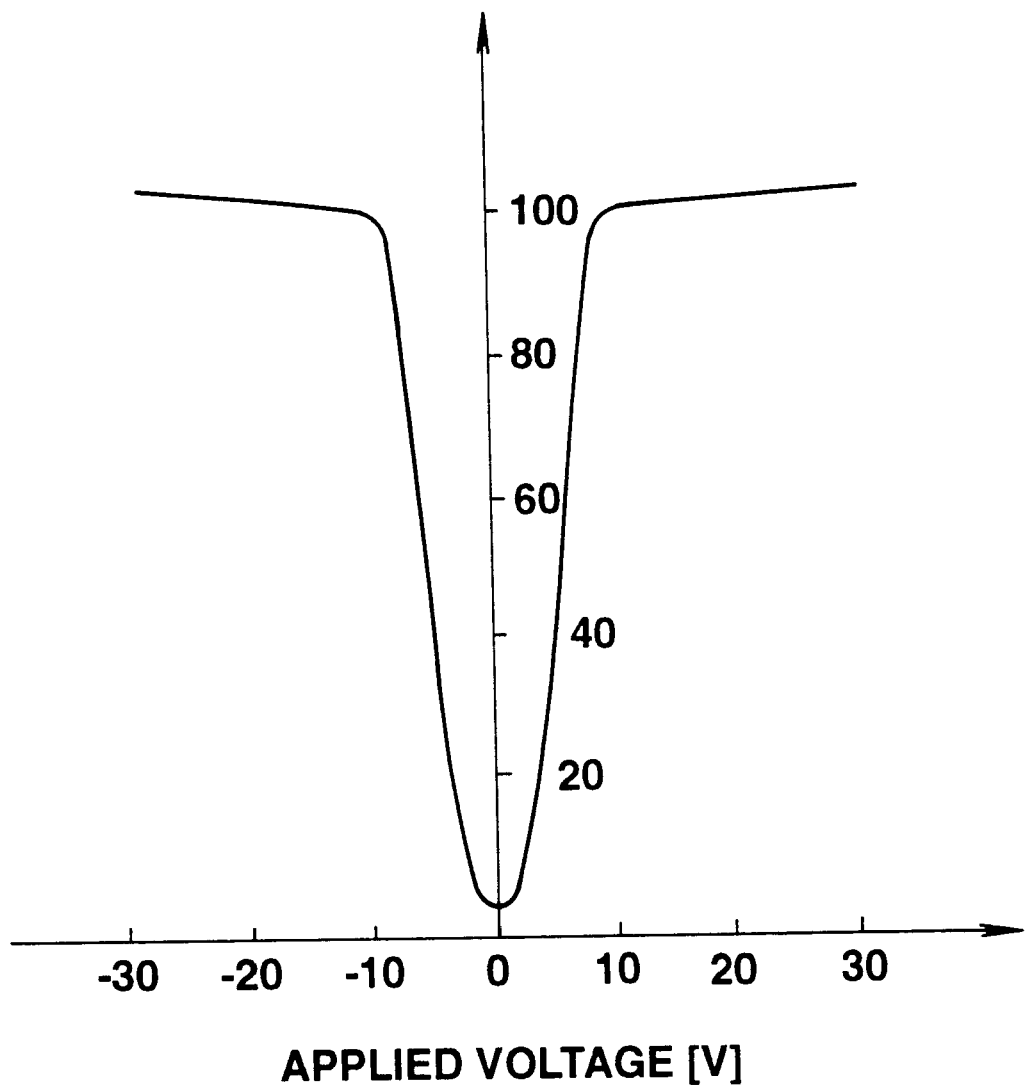
FIG. 34 is a graph showing an applied voltage v.s. transmittance characteristic when a triangular-wave voltage of a low frequency is applied to the AFLC display device of the ninth embodiment.

Therefore, the optical characteristic, which can be acquired by arranging the polarization plates 23 and 24 as shown in FIG. 3 and applying a triangular-wave voltage with a sufficiently low frequency of about 0.1 Hz between the pixel electrodes 13 and the common electrode 17, is such that no flat portion exists in the vicinity of the applied voltage of 0 V, and the transmittance continuously and smoothly changes with an increase in the absolute value of the applied voltage, as shown in FIG. 34. Further, as the applied voltage becomes sufficiently high, the helical structure disappears and the transmittance is substantially saturated. As the LC molecules tilt further by the suppression of the rotation of the LC molecules, however, the transmittance slightly increases even when the applied voltage is sufficiently high. Moreover, the curves of the transmittances become symmetrical with respect to the polarity of the applied voltage. Furthermore, the hysteresis is very small.

According to the LCD device having such an optical characteristic, the display gradation is specifically determined with respect to the applied voltage. Arbitrary gradation can therefore be displayed by using an active matrix type LCD device and keeping the applied voltage substantially to a specific value corresponding to the display gradation in the non-selection period of each pixel, as mentioned earlier.

The driving method illustrated in FIGS. 10A and 10B can be used as a practical driving method for allowing the LCD device of this embodiment to perform gradation display.

Figure 35:
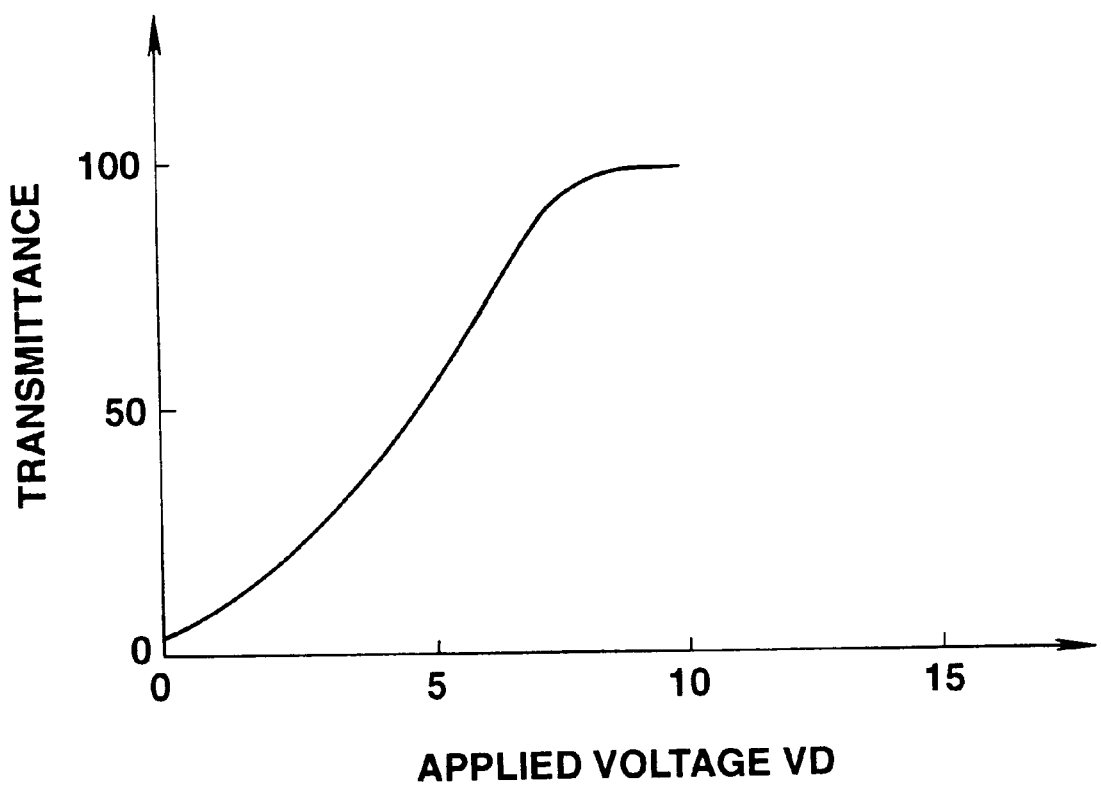
FIG. 35 is a diagram showing an applied voltage v.s. transmittance characteristic when the LCD device of the ninth embodiment is driven by the method illustrated in FIGS. 10A–10C.

FIG. 35 shows the relationship between the write voltage and the transmittance in the case where an AFLC, which has an I-SA transition temperature of 83° C., an SA-SCA* transition temperature of 74° C., and spontaneous polarization of 261 nc/cm² and a tilt angle of 32.3 degrees (cone angle of 64.6 degrees) and behaves in such a way that the double helical structure deforms by the applied voltage and the long axes of the LC molecules tilt by the suppressed rotation of the LC molecules, is used, the direction of the aligning treatment and the directions of the transmission axes of the polarization plates are set as shown in FIG. 3, and the driving method illustrated in FIGS. 10A and 10B is employed with the selection period TS set to 60 μs.

It is apparent from this graph that this LCD device and this driving method can continuously change the transmittance by altering the write voltage and further allows the display gradation to be specifically determined in accordance with the write voltage, thus ensuring the gradation display.

The above-described behavior of the LC molecules of this AFLC can be seen from conoscope images of this LCD device.

Figure 36A:
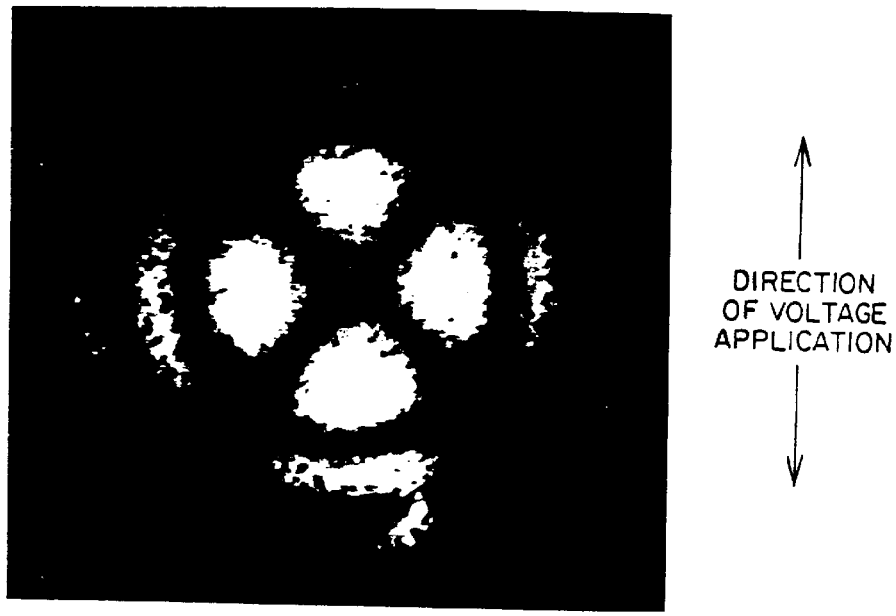
Figure 36B:
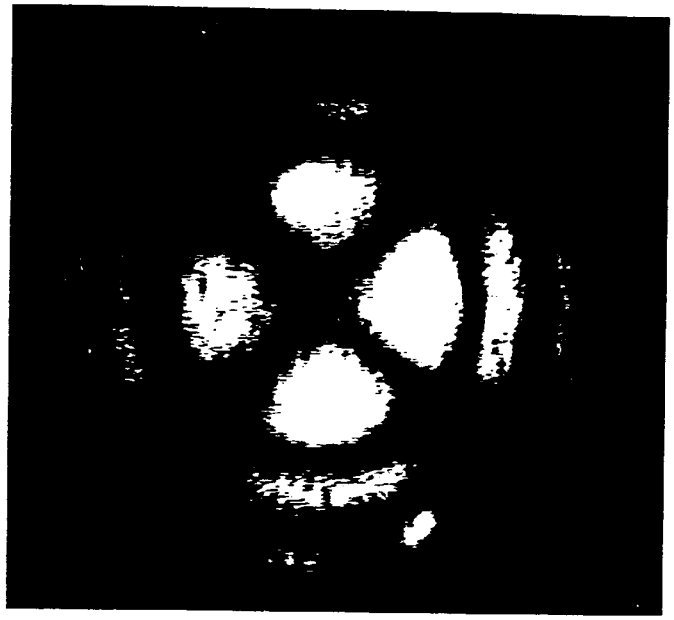
Figure 36C:
Figure 36D:
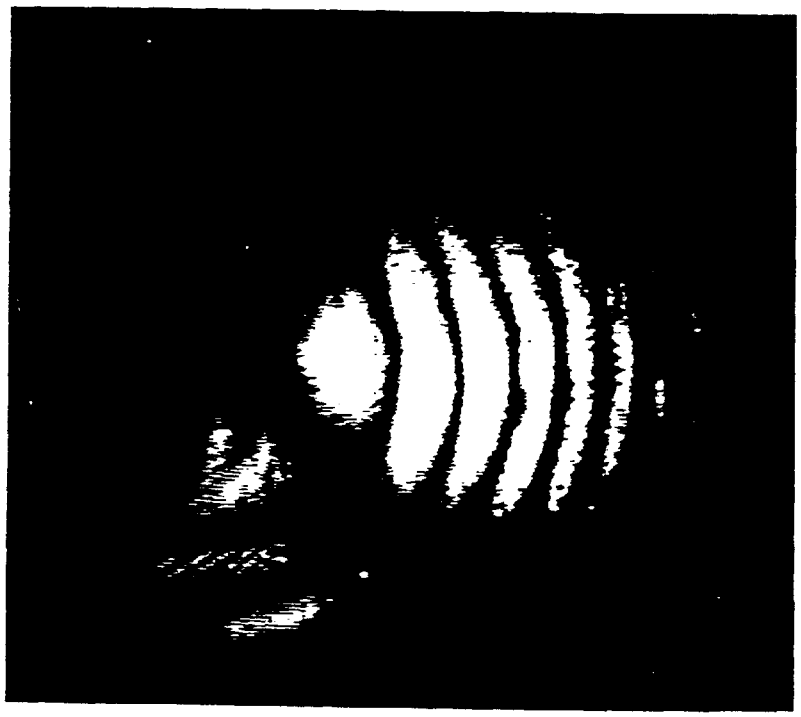

FIGS. 36A through 36D illustrate the relationship between the applied voltage and the conoscope images of this LCD device. FIG. 36A shows a conoscope image when no voltage is applied, FIGS. 36B and 36C show conoscope images when a positive applied voltage is gradually increased, and FIG. 36D shows a conoscope image when a positive and sufficiently high voltage is applied.

In FIG. 36A, bright portions evenly appear on the upper and lower and right and left sides. This state indicates that the liquid crystal has a helical structure.

When a positive applied voltage is gradually increased, the right side becomes brighter and the left side darker even though the symmetrical structure is maintained, as shown in FIGS. 36B and 36C. This indicates that the LC molecules are tilting rightward (toward the first aligning direction 21A in FIG. 3) even if the optical uniaxial is maintained.

When a positive and sufficiently high voltage is applied, the symmetrical structure is lost and only the right side becomes bright, as shown in FIG. 36D. This indicates that the helix is lost and nearly all the LC molecules are aligned to the first aligning direction 21A to be in the ferroelectric phase.

As a negative applied voltage increases, an image approximately line symmetrical to the Y axis is obtained as compared with the images in FIGS. 36B–36D. This proves that when a negative voltage is applied, the LC molecules initially tilt leftward (toward the second aligning direction 21B in FIG. 3) while keeping the helical structure and when a sufficiently high negative voltage is applied, the helix is lost, causing nearly all the LC molecules to be aligned to the second aligning direction 21B to be in the ferroelectric phase.

According to the AFLC display device of this embodiment, as described above, the double helical structure traced by the LC molecules deforms in accordance with the applied voltage and the rotation of the LC molecules about the molecular long axes is suppressed, so that the director of the liquid crystal continuously varies, thus permitting arbitrary gradation to be displayed.

Tenth Embodiment

The following will discuss an AFLC according to another embodiment, which provides an intermediate alignment state by the combined effect of the deformation of the helix and the switching of the alignment of the LC molecules between the first and second alignment states, and an LCD device which uses this AFLC.

As the liquid crystal of this embodiment, an AFLC with the structure shown in, for example, Table 1 can be used directly. It is to be however noted that the AFLC is sealed between the substrates 11 and 12 with the double helical structure maintained.

When the AFLC shown in, for example, Table 1 is used, with no voltage applied, the LC molecules trace two helixes shifted by 180 degrees, as shown in FIG. 30A. The spatially-averaged optical axis of the AFLC 21 becomes parallel to the normal line direction of the smectic layer which is the average aligning direction of the LC molecules.

When a voltage equal to or greater than the saturated voltage Ec is applied to the AFLC 21, the helical structure is gone and the LC molecules is set to have the first or second ferroelectric phase where the LC molecules are aligned to the first or second aligning direction 21A or 21B in accordance with the polarity of the applied voltage.

When a voltage with an intermediate level is applied to the AFLC 21, the interaction of the permanent dipoles of the LC molecules with the electric field deforms the double helical structure traced by the LC molecules as explanatorily shown in FIGS. 30A to 30E in accordance with the polarity and the absolute value of the applied voltage. This deformation causes the average optical axis to tilt.

Some of the LC molecules in the first or second alignment state are changed to the second or first alignment state in accordance with the polarity and the level of the applied voltage E. The number (ratio) of the molecules whose alignment state is changed increases as the applied voltage E becomes larger.

That is, the deformation of the double helical structure and the switching of the alignment of the LC molecules, both caused by the applied voltage, causes the average aligning direction of the LC molecules to continuously vary in accordance with the applied voltage.

This is substantially equivalent to the deformation of the double helical structure according to the applied voltage and the inclination of the helical axis according to applied voltage (with respect to the normal line of the smectic layer).

It is therefore possible to display arbitrary intermediate gradation by continuously altering the average aligning direction of the LC molecules.

Eleventh Embodiment

The AFLC used in the seventh embodiment may be used with its helical structure maintained.

An AFLC with the structure shown in, for example, Table 4 can be used as the liquid crystal of this embodiment. It is to be however noted that the AFLC is sealed between the substrates 11 and 12 with the double helical structure maintained.

When the AFLC shown in, for example, Table 4 is used, with no voltage applied, the LC molecules trace two helixes shifted by 180 degrees, as shown in FIG. 30A. The spatially-averaged optical axis of the AFLC 21 becomes parallel to the normal line direction of the smectic layer which is the average aligning direction of the LC molecules.

When a voltage equal to or greater than the saturated voltage Ec is applied to the AFLC 21, the helical structure is gone and the LC molecules is set to have the first or second ferroelectric phase where the LC molecules are aligned to the first or second aligning direction 21A or 21B in accordance with the polarity of the applied voltage.

When a voltage with an intermediate level is applied to the AFLC 21, the interaction of the permanent dipoles of the LC molecules with the electric field deforms the double helical structure traced by the LC molecules as explanatorily shown in FIGS. 30A to 30E in accordance with the polarity and the absolute value of the applied voltage. This deformation causes the average optical axis to tilt.

Some of the LC molecules in the first or second alignment state are changed to the second or first alignment state in accordance with the polarity and the level of the applied voltage E. The number (ratio) of the molecules whose alignment state is changed increases as the applied voltage E becomes larger.

Because those phenomena occur together, the director of the AFLC 21 continuously varies in accordance with the applied voltage. It is thus possible to control the applied voltage to continuously change the average aligning direction of the LC molecules, thereby permitting gradation images to be displayed.

Figure 37:
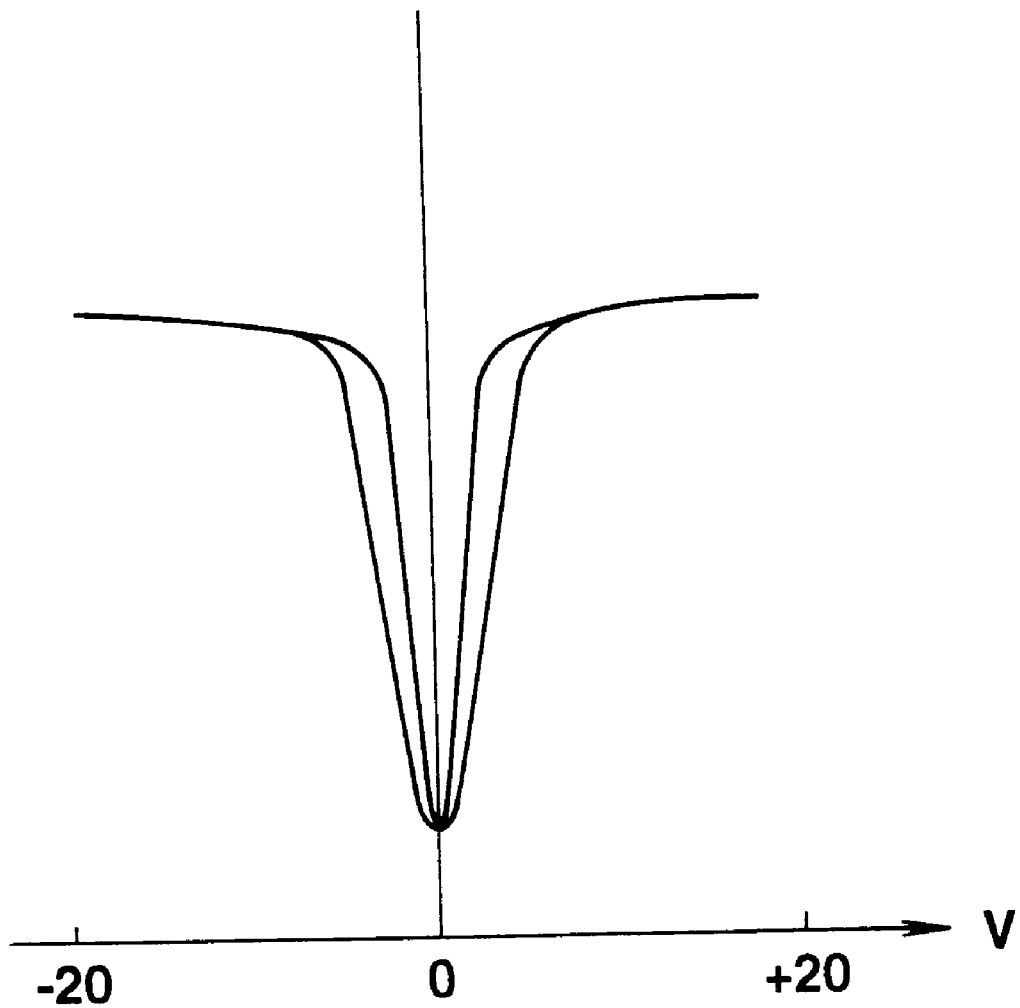
FIG. 37 is a graph showing an applied voltage v.s. transmittance characteristic when a triangular-wave voltage of a low frequency is applied to an AFLC display device of the tenth embodiment of this invention.

FIG. 37 shows the relationship between the applied voltage and the transmittance in the case where the AFLC having the composition shown in Table 4 is used as the AFLC 21 with the helical structure maintained, the direction of the aligning treatment and the transmission axes of the polarization plates are set as illustrated in FIG. 3 and a triangular-wave voltage with a sufficiently low frequency of about 0.1 Hz is applied between the electrodes 17 and 13.

This optical characteristic has no flat portion in the vicinity of the applied voltage of 0 V and shows a continuous and smooth change in the transmittance as the absolute value of the applied voltage increases. When the applied voltage becomes sufficiently high, the helical structure disappears and the transmittance is substantially saturated. As the LC molecules tilt further by the suppression of the molecular rotation, however, the transmittance slightly increases even when the applied voltage is sufficiently high. Moreover, the curves of the transmittances become symmetrical with respect to the polarity of the applied voltage. Furthermore, the hysteresis is very small. According to the LCD device of this embodiment, therefore, arbitrary gradation images can be displayed by controlling the applied voltage.

The driving method illustrated in FIGS. 10A and 10B can be used as a practical driving method for allowing the LCD device of this embodiment to perform gradation display.

The above-described behavior of the LC molecules of this AFLC according to this embodiment can be seen from, for example, conoscope images of this liquid crystal.

Figure 38A:
Figure 38B:
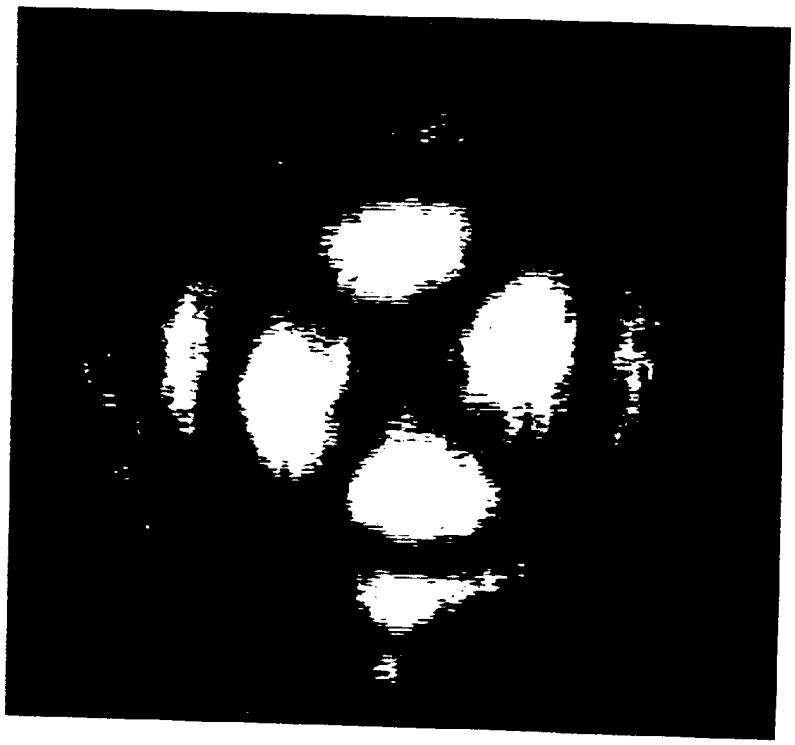

For example, FIG. 38B shows a conoscope image when no voltage is applied. This image has bright portions separated in four directions, up and down and right and left. This means that the helical structure exists when no voltage is applied.

Figure 38C:
Figure 39:
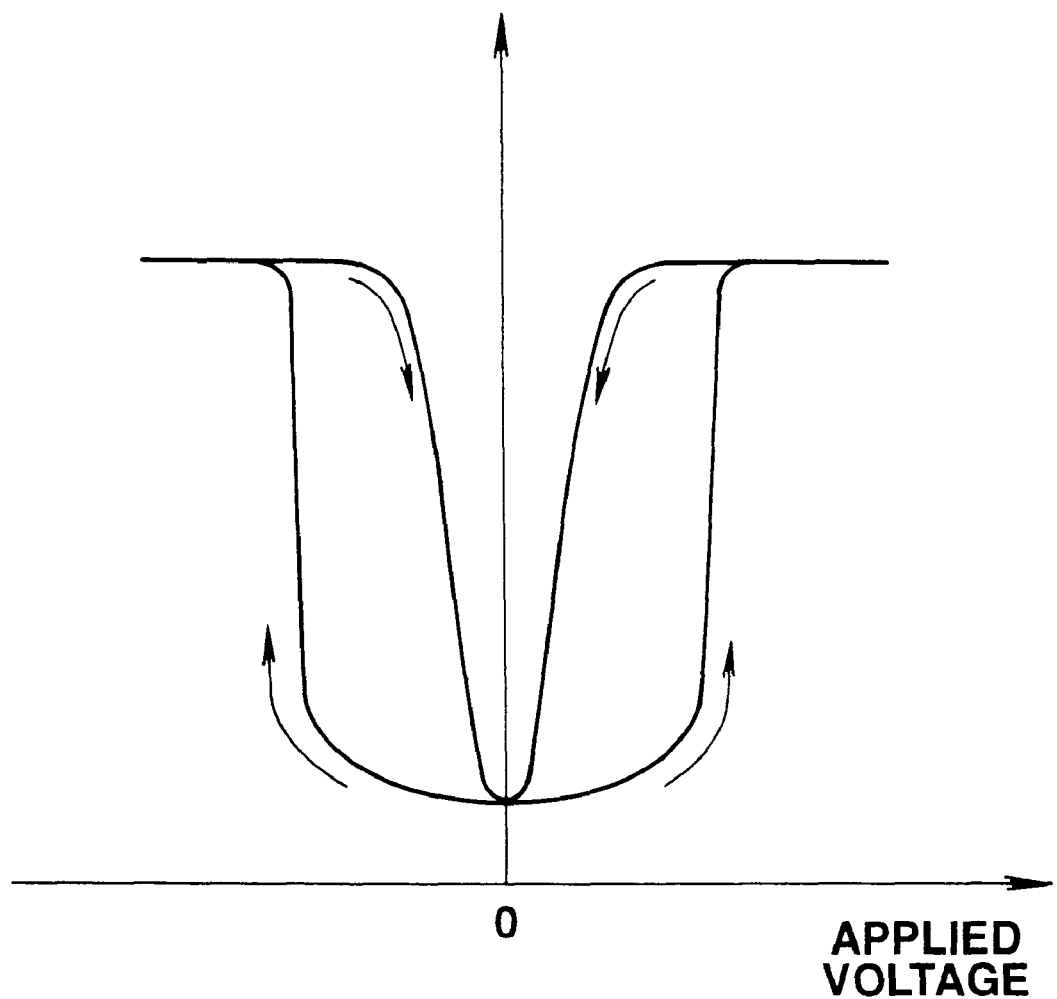
FIG. 39 is a diagram showing an applied voltage v.s. transmittance characteristic of a conventional AFLC display device.

When a positive voltage is applied, the right and left bright portions shown in FIG. 38B are linked while the upper and lower bright portions are still separated, as shown in FIG. 38A. This means that the LC molecules move along the cones so that the helical structure is lost to some degree. What is more, the conoscope image is inverted in a nearly point symmetric fashion as shown in FIG. 38C by inverting the polarity of the applied voltage (to the negative polarity).

It is apparent from the above that the molecules of the liquid crystal tilt on the cones in accordance with the applied voltage, and move off the cones to tilt by the suppressed rotation.

By using this liquid crystal as the AFLC 21, therefore, arbitrary gradation can be displayed due to the characteristic shown in FIG. 38.

Although the first to eleventh embodiments of this invention have been described, this invention is not limited to those embodiments but may be modified in various other forms.

For example, the waveforms of the drive signal to be applied to the LCD device are not to limited to those shown in FIGS. 10A and 10B, but may be changed as desired. For instance, while two pulses of the opposite polarities are applied to the liquid crystal in two consecutive frames for a single piece of display data according to the driving method illustrated in FIGS. 10A and 10B, one write pulse may be applied to the liquid crystal for a single piece of display data.

The transmission axis 23A of the polarization plate 23 and the transmission axis 24A of the polarization plate 24 may be set parallel to each other. The optical axes of the polarization plates may be absorption axes. Further, the optical axis of one of the polarization plates may be set parallel or perpendicular to the first or second aligning direction 21A or 21B, while the optical axis of the other polarization plate may be set parallel or perpendicular to the optical axis of the former polarization plate.

The present invention is not limited to an AFLC display device which uses TFTs as active elements, but may also be adapted to an AFLC display device which uses MIMs as active elements.

What is claimed is:

1. An antiferroelectric liquid crystal display device comprising:

a first substrate on which a plurality of pixel electrodes and a plurality of active elements connected to said pixel electrodes are arranged;

a second substrate on which a common electrode opposing said pixel electrodes is formed; and an antiferroelectric liquid crystal, sealed between said first and second substrates and having first and second ferroelectric phases where alignment states of liquid crystal molecules differ from each other, and an antiferroelectric phase, said antiferroelectric liquid crystal having an intermediate alignment state which lies between said ferroelectric phases and said antiferroelectric phase and to which directors are changed by movement of said liquid crystal molecules caused by a phase transition precursor in accordance with an applied voltage.

2. The antiferroelectric liquid crystal display device according to claim 1 wherein said antiferroelectric liquid crystal is sealed between said substrates with a double helical structure in a smectic CA* phase nullified, and has liquid crystal molecules which are caused to tilt on a surface perpendicular to an electric field by said phase transition precursor caused by application of said voltage.

3. The antiferroelectric liquid crystal display device according to claim 1, wherein said antiferroelectric liquid crystal is sealed between said substrates with a double helical structure in a smectic CA* phase maintained, and has liquid crystal molecules which are caused by application of said voltage to tilt along an imaginary cone drawn by a locus of said liquid crystal molecules at a time sufficiently large voltages of opposite polarities are alternately applied.

4. The antiferroelectric liquid crystal display device according to claim 1, wherein said antiferroelectric liquid crystal has liquid crystal molecules which, in accordance with an applied voltage, caused to move along an imaginary cone drawn by a locus of said liquid crystal molecules at a time sufficiently large voltage of opposite polarities are alternately applied, thereby tilting in accordance with said applied voltage.

5. The antiferroelectric liquid crystal display device according to claim 1, wherein said antiferroelectric liquid crystal has liquid crystal molecules which tilt in a direction perpendicular to an electric field in accordance with an applied voltage.

6. The antiferroelectric liquid crystal display device according to claim 5, wherein said antiferroelectric liquid crystal is sealed with a double helical structure between said substrates, and has a chiral smectic phase in which said double helical structure is deformed in accordance with an applied voltage.

7. The antiferroelectric liquid crystal display device according to claim 1, wherein said antiferroelectric liquid crystal is sealed with a double helical structure between said substrates, and has a chiral smectic phase in which said double helical structure is deformed in accordance with an applied voltage.

8. The antiferroelectric liquid crystal display device according to claim 1, further comprising:

a first polarization plate having an optical axis arranged in a direction substantially in parallel to or perpendicular to a direction of a normal line of a layer in a smectic CA* phase; and a second polarization plate facing said first polarization plate via said liquid crystal and having an optical axis perpendicular to said optical axis of said first polarization plate.

9. An antiferroelectric liquid crystal display device comprising:

a first substrate;

a second substrate facing said first substrate;

an antiferromagnetic liquid crystal, sealed between said first and second substrates and having first and second ferroelectric phases where alignment states of liquid crystal molecules differ from each other, and an antiferromagnetic phase, said antiferromagnetic liquid crystal having an intermediate alignment state which lies between said ferroelectric phases and said antiferroelectric phase and to which directors are changed by movement of said liquid crystal molecules caused by a phase transition precursor in accordance with an applied voltage; and control means for applying a voltage to said antiferroelectric liquid crystal and changing said applied voltage to control said phase transition precursor of said antiferroelectric liquid crystal, thereby setting directions of said directors of said antiferroelectric liquid crystal to an arbitrary direction between said first and second aligning directions.

* * * * *